US010176748B2

(12) United States Patent
Akimoto et al.

(10) Patent No.: US 10,176,748 B2
(45) Date of Patent: Jan. 8, 2019

(54) INFORMATION PROCESSING DEVICE

(71) Applicant: Semiconductor Energy Laboratory Co., Ltd., Atsugi-shi, Kanagawa-ken (JP)

(72) Inventors: Kengo Akimoto, Kanagawa (JP); Isamu Shigemori, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 15/416,317

(22) Filed: Jan. 26, 2017

(65) Prior Publication Data

US 2017/0221410 A1 Aug. 3, 2017

(30) Foreign Application Priority Data

Feb. 3, 2016 (JP) .................. 2016-018553

(51) Int. Cl.
*G09G 3/34* (2006.01)
*G09G 3/3208* (2016.01)
(Continued)

(52) U.S. Cl.
CPC ......... *G09G 3/2096* (2013.01); *G06F 1/1643* (2013.01); *G06F 1/1684* (2013.01);
(Continued)

(58) Field of Classification Search
CPC ............. G09G 2300/0456; G09G 3/20; G09G 3/2096; G09G 3/30; G09G 3/3225;
(Continued)

(56) References Cited

U.S. PATENT DOCUMENTS 6,714,268 B2 3/2004 Wang et al.
7,038,641 B2 5/2006 Hirota et al.
(Continued)

FOREIGN PATENT DOCUMENTS

EP 2733578 A 5/2014
JP 2001-066593 A 3/2001
(Continued)

OTHER PUBLICATIONS

Casio no Toughness Android Wear 'WSD-F10', Sono Dokujikinou to Kaihatsuhiwa, http://k-tai.watch.impress.co.jp/docs/event/ces2016/738303.html, Jan. 8, 2016.
(Continued)

*Primary Examiner* — Julie Anne Watko
(74) *Attorney, Agent, or Firm* — Fish & Richardson P.C.

(57) ABSTRACT

A novel information processing device that is highly convenient is provided. The information processing device includes a selection circuit having a function of supplying image data to a reflective display element, a light-emitting element, or both of them on the basis of input position coordinate data, sensing data about the illuminance of the usage environment, and the image data. An icon with high selection frequency is displayed by both the reflective display element and the light-emitting element on the basis of icon coordinate data and the input position coordinate data, so that the icon can be displayed brightly with improved visibility.

18 Claims, 20 Drawing Sheets

(51) Int. Cl.

| | | |
|---|---|---|
| *G06F 3/0354* | (2013.01) | |
| *G06F 3/0488* | (2013.01) | |
| *G09G 3/3275* | (2016.01) | |
| *G06F 3/0484* | (2013.01) | |
| *G06F 3/0481* | (2013.01) | |
| *G09G 3/22* | (2006.01) | |
| *G09G 3/36* | (2006.01) | |
| *G06F 1/32* | (2006.01) | |
| *G06F 1/16* | (2006.01) | |
| *G09G 3/20* | (2006.01) | |
| *G09G 3/30* | (2006.01) | |
| *G06F 3/03* | (2006.01) | |

(52) U.S. Cl.
CPC .............. *G06F 1/3265* (2013.01); *G06F 3/03* (2013.01); *G06F 3/0481* (2013.01); *G06F 3/04842* (2013.01); *G09G 3/22* (2013.01); *G09G 3/30* (2013.01); *G09G 3/3275* (2013.01); *G09G 3/3688* (2013.01); *G06F 1/1613* (2013.01); *G06F 1/1686* (2013.01); *G06F 3/03547* (2013.01); *G06F 3/0488* (2013.01); *G09G 3/3208* (2013.01); *G09G 3/3406* (2013.01); *G09G 3/3611* (2013.01); *G09G 2300/0439* (2013.01); *G09G 2300/0456* (2013.01); *G09G 2360/145* (2013.01); *Y02D 10/153* (2018.01)

(58) Field of Classification Search
CPC .... G09G 3/3406; G09G 3/34; G09G 3/04817; G09G 3/04812; G09G 3/3275; G09G 2300/0439; G09G 3/32; G09G 3/3208; G09G 3/3688; G09G 3/3685; G09G 3/3648; G09G 3/3611; G09G 3/36; G09G 3/22; G09G 3/2092; G09G 3/2088; G09G 3/00; G09G 2360/145; G06F 1/1643; G06F 1/1647; G06F 1/1637; G06F 1/1633; G06F 1/1613; G06F 1/16; G06F 1/00; G06F 1/1684; G06F 1/1692; G06F 1/169; G06F 1/1686; G06F 1/3265; G06F 1/325; G06F 1/3234; G06F 1/3203; G06F 1/32; G06F 1/26; G06F 3/03; G06F 3/01; G06F 3/00; G06F 3/0488; G06F 3/03547; G06F 3/0354; G06F 3/0481; Y02D 10/153; Y02D 10/15; Y02D 10/00
See application file for complete search history.

(56) References Cited

U.S. PATENT DOCUMENTS

| | | |
|---|---|---|
| 7,084,936 B2 | 8/2006 | Kato |
| 7,102,704 B2 | 9/2006 | Mitsui et al. |
| 7,176,991 B2 | 2/2007 | Mitsui et al. |
| 7,239,361 B2 | 7/2007 | Kato |
| 7,248,235 B2 | 7/2007 | Fujii et al. |
| 7,385,654 B2 | 6/2008 | Mitsui et al. |
| 8,830,424 B2 | 9/2014 | Hirakata et al. |
| 8,994,827 B2 | 3/2015 | Mistry et al. |
| 9,030,446 B2 | 5/2015 | Mistry et al. |
| D763,288 S | 8/2016 | Mistry et al. |
| D763,289 S | 8/2016 | Mistry et al. |
| 9,477,313 B2 | 10/2016 | Mistry et al. |
| 2003/0201960 A1 | 10/2003 | Fujieda |
| 2006/0072047 A1 | 4/2006 | Sekiguchi |
| 2007/0002225 A1* | 1/2007 | Baek, II ............... G09G 3/3648 349/114 |
| 2007/0176847 A1* | 8/2007 | Shah .................... G06F 1/1616 345/1.1 |
| 2008/0180618 A1 | 7/2008 | Fujieda |
| 2010/0171905 A1 | 7/2010 | Huang et al. |
| 2010/0225640 A1* | 9/2010 | Vieri .................... G06F 1/3218 345/214 |
| 2013/0021230 A1* | 1/2013 | Bergquist ............ G09G 3/3406 345/90 |
| 2013/0033476 A1* | 2/2013 | Dean .................... G09G 3/344 345/211 |
| 2013/0176263 A1* | 7/2013 | Abbate .................. G06F 3/045 345/174 |
| 2014/0139454 A1 | 5/2014 | Mistry et al. |
| 2014/0143678 A1 | 5/2014 | Mistry et al. |
| 2014/0143737 A1 | 5/2014 | Mistry et al. |
| 2014/0143784 A1 | 5/2014 | Mistry et al. |
| 2014/0143785 A1 | 5/2014 | Mistry et al. |
| 2015/0181087 A1 | 6/2015 | Mistry et al. |
| 2015/0332031 A1 | 11/2015 | Mistry et al. |
| 2016/0328023 A1 | 11/2016 | Mistry et al. |
| 2017/0061863 A1 | 3/2017 | Eguchi |

FOREIGN PATENT DOCUMENTS

| | | | |
|---|---|---|---|
| JP | 2002-196702 A | 7/2002 | |
| JP | 2002-328630 A | 11/2002 | |
| JP | 2003-076302 A | 3/2003 | |
| JP | 2003-157026 A | 5/2003 | |
| JP | 2003-157029 A | 5/2003 | |
| JP | 2003-228304 A | 8/2003 | |
| JP | 2003-316295 A | 11/2003 | |
| JP | 2003-322850 A | 11/2003 | |
| JP | 2004-296162 A | 10/2004 | |
| JP | 2007-164767 A | 6/2007 | |
| JP | 2007-232882 A | 9/2007 | |
| JP | 4161574 | 10/2008 | |
| JP | 2011-191750 A | 9/2011 | |
| JP | 2013-221965 A | 10/2013 | |
| JP | 2014-102837 A | 6/2014 | |
| JP | 2014-102843 A | 6/2014 | |
| JP | 2014209239 A * | 11/2014 | .......... G09G 3/3413 |
| WO | WO-2004/053819 | 6/2004 | |
| WO | WO 2004057562 A1 * | 7/2004 | .......... G09G 3/3611 |

OTHER PUBLICATIONS

International Search Report (Application No. PCT/IB2017/050351) dated May 16, 2017.
Written Opinion (Application No. PCT/IB2017/050351) dated May 16, 2017.
Shieh.H, "Transflective display by Hybrid OLED and LCD", LEOS 2005 (IEEE Lasers and Electro-Optics Society Annual Meeting), Oct. 22, 2005, pp. 650-651, IEEE.
Lee.J et al., "High ambient-contrast-ratio display using tandem reflective liquid crystal display and organic light-emitting device", Optics Express, Nov. 14, 2005, vol. 13, No. 23, pp. 9431-9438.

* cited by examiner

FIG. 3A
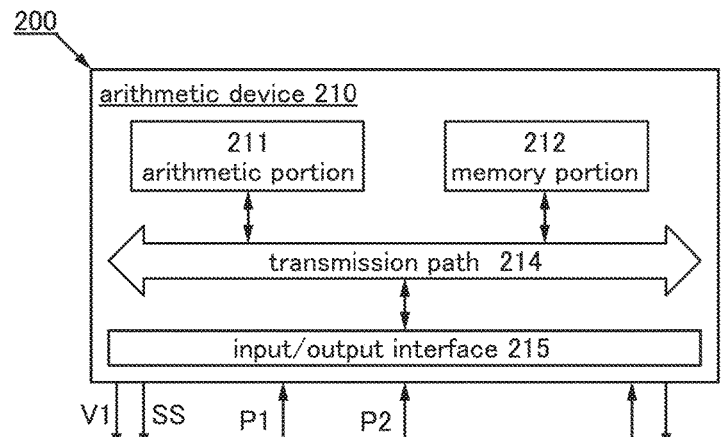
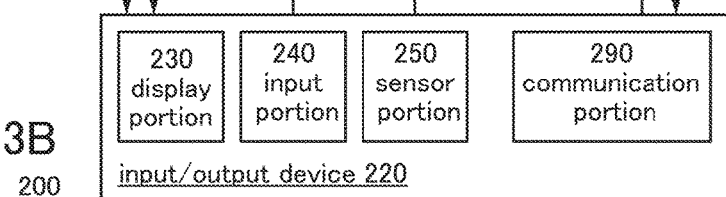
FIG. 3B
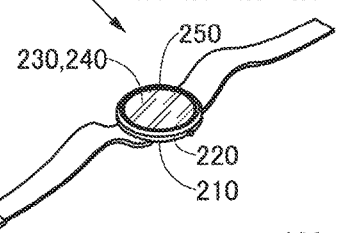
FIG. 3C
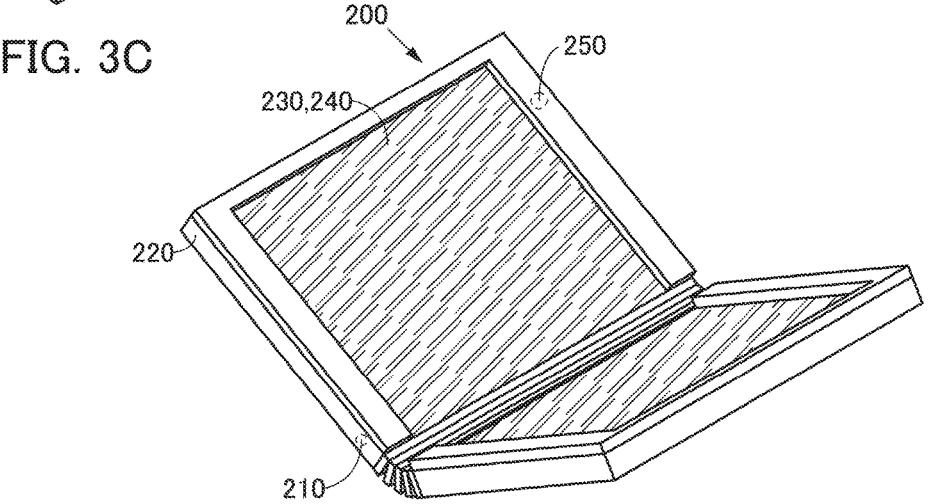

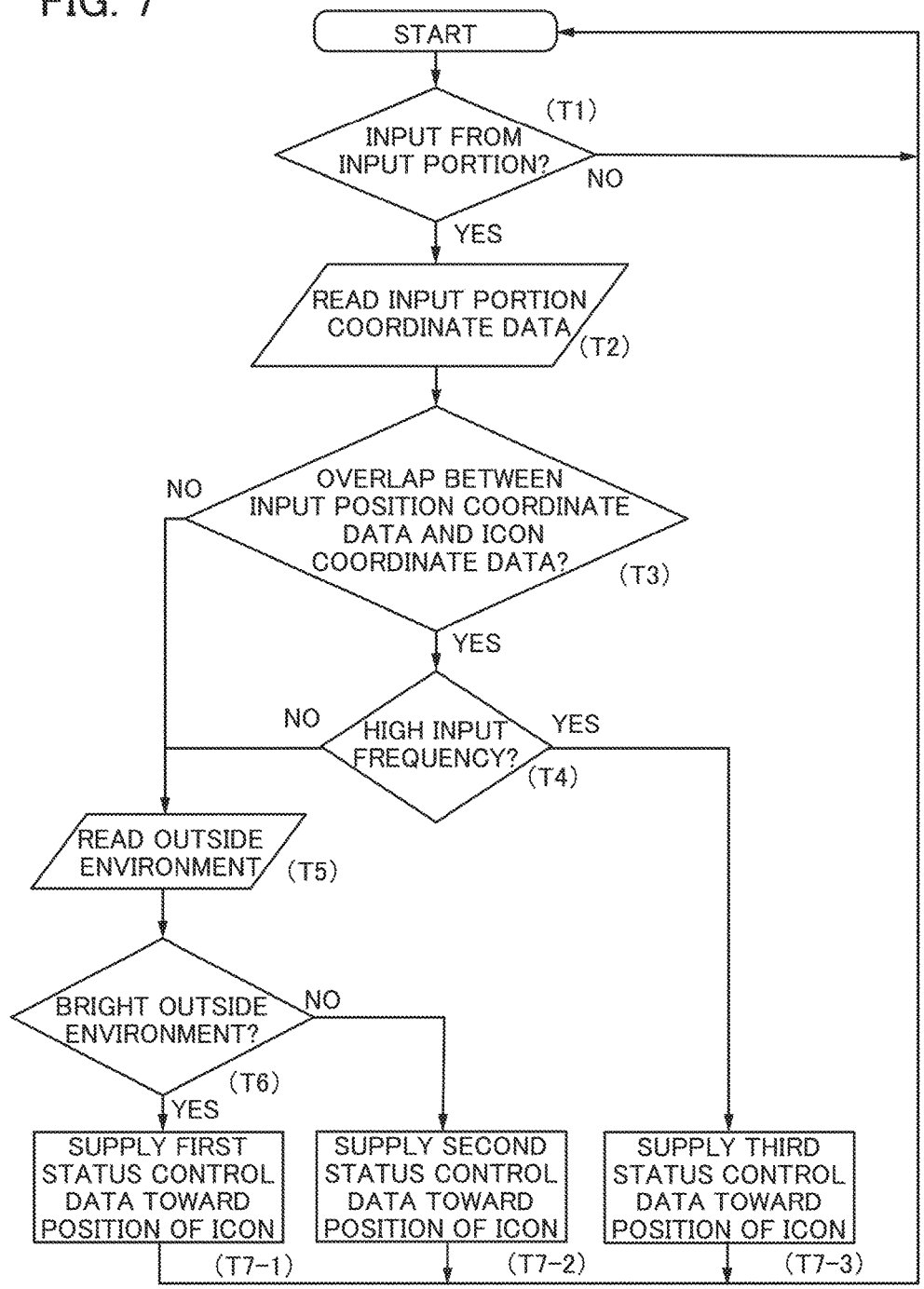

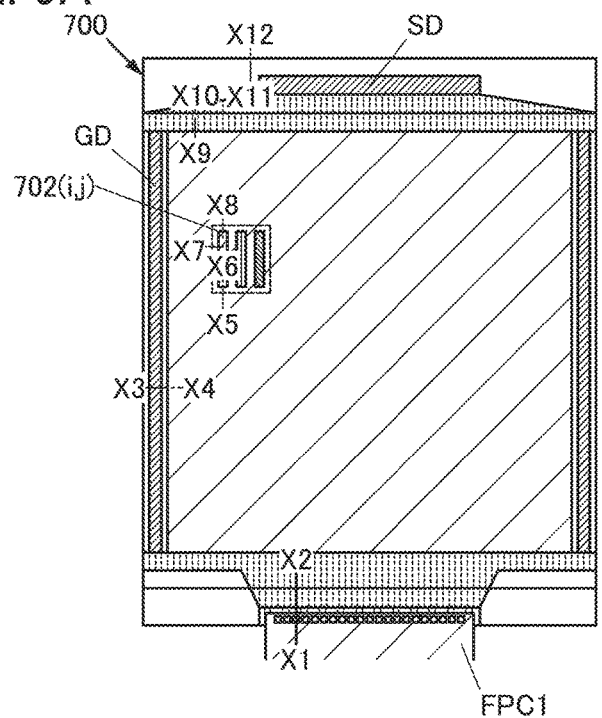
FIG. 9A
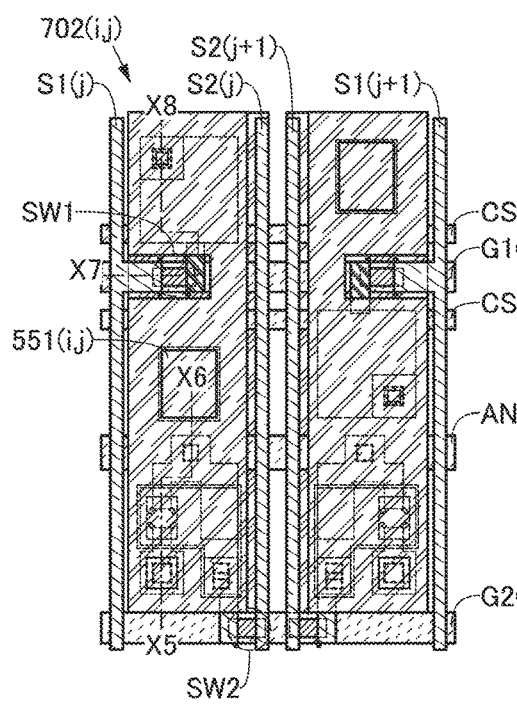
FIG. 9B1
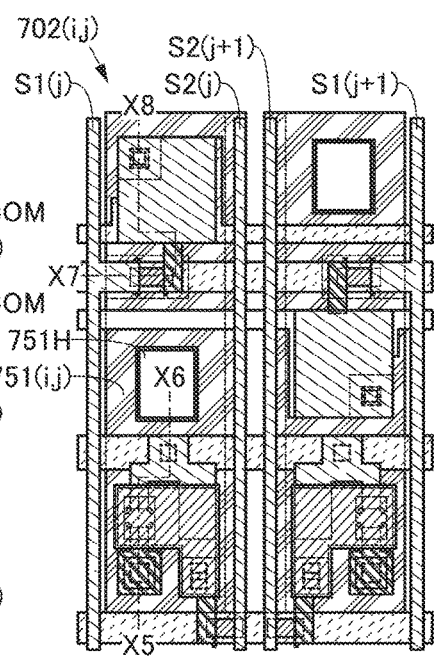
FIG. 9B2

FIG. 11A
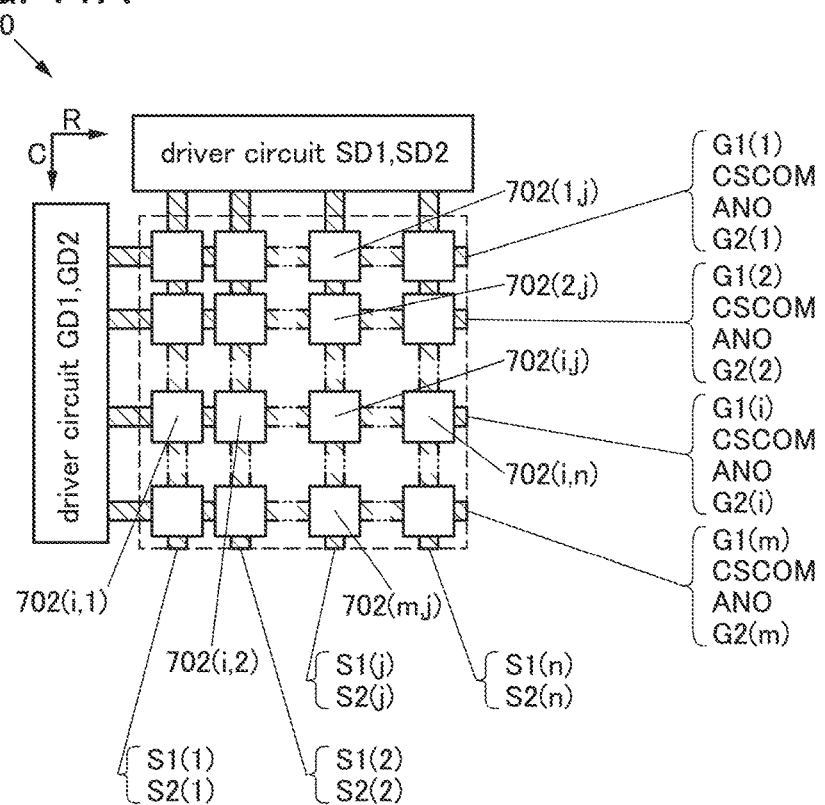
FIG. 11B1
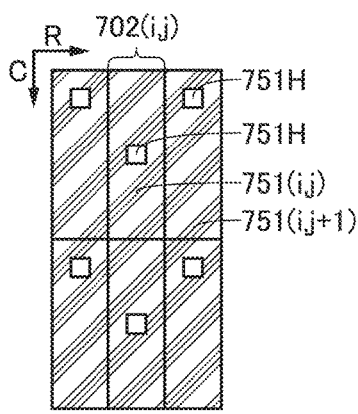
FIG. 11B2
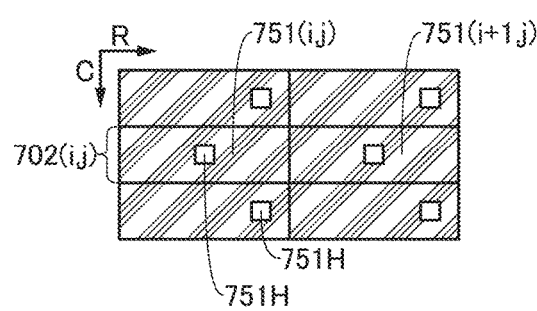

FIG. 18A
FIG. 18B
FIG. 18C
FIG. 18D
FIG. 18E
FIG. 18F
FIG. 18G
FIG. 18H
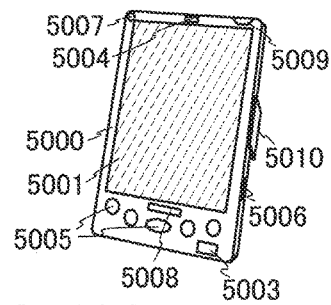
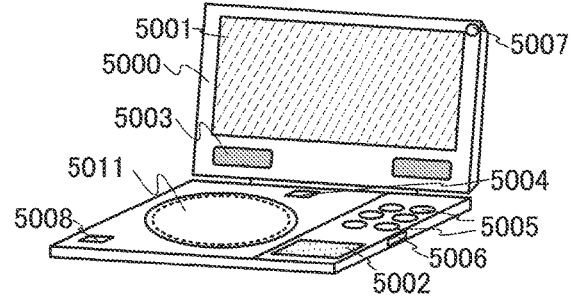
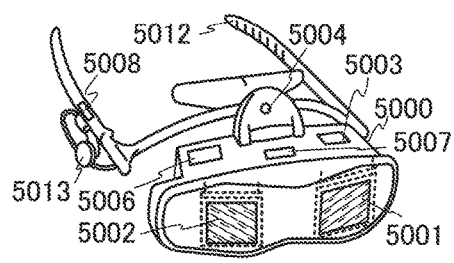
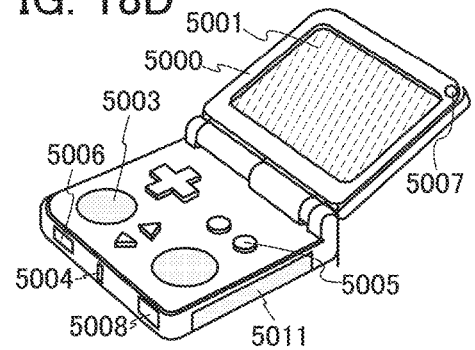
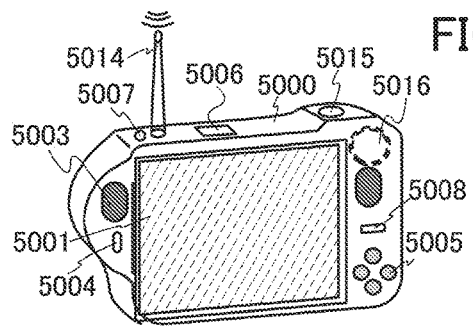
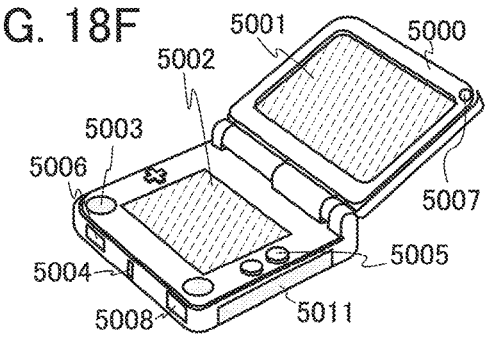
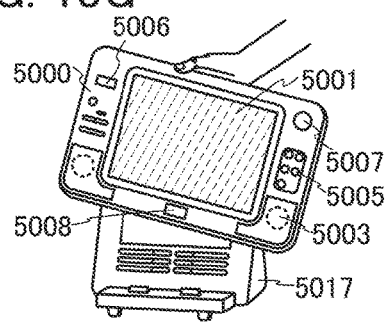
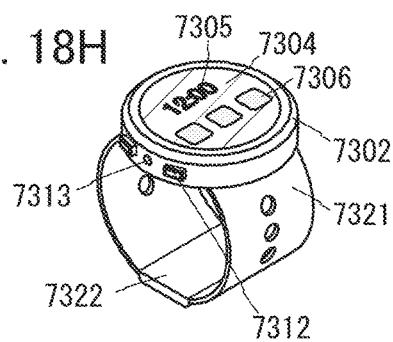

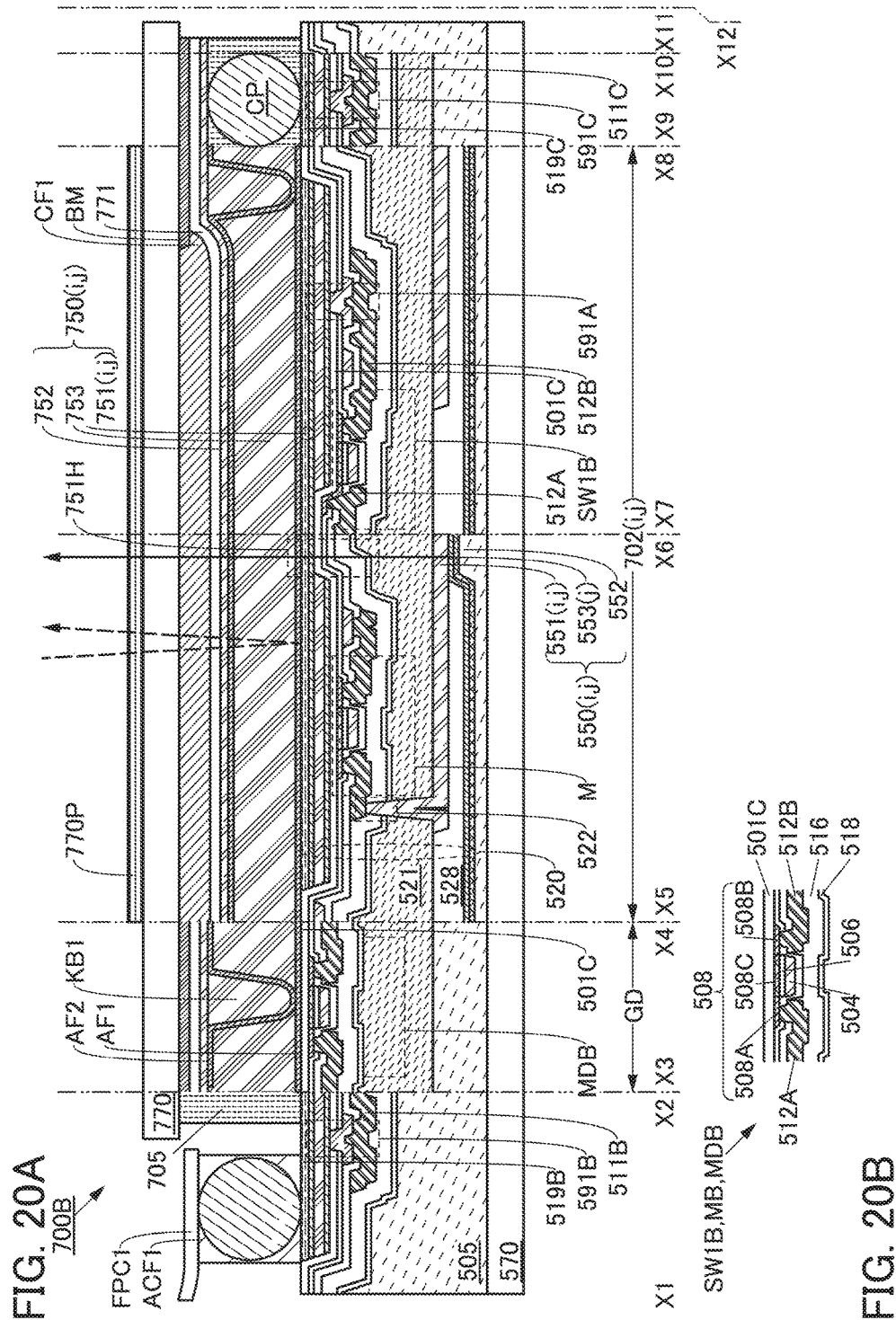

INFORMATION PROCESSING DEVICE

TECHNICAL FIELD

One embodiment of the present invention relates to an information processing device or a semiconductor device.

Note that one embodiment of the present invention is not limited to the above technical field. The technical field of one embodiment of the invention disclosed in this specification and the like relates to an object, a method, or a manufacturing method. Furthermore, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

BACKGROUND ART

A liquid crystal display device in which a light-condensing means and a pixel electrode are provided on the same surface side of a substrate and a region transmitting visible light in the pixel electrode is provided to overlap with an optical axis of the light-condensing means, and a liquid crystal display device which includes an anisotropic light-condensing means having a condensing direction X and a non-condensing direction Y that is along a longitudinal direction of a region transmitting visible light in the pixel electrode are known (Patent Document 1).

REFERENCE

Patent Document

[Patent Document 1] Japanese Published Patent Application No. 2011-191750

DISCLOSURE OF INVENTION

An object of one embodiment of the present invention is to provide a novel information processing device that is highly convenient. Another object is to provide a novel information processing device or a novel semiconductor device.

Note that the descriptions of these objects do not disturb the existence of other objects. In one embodiment of the present invention, there is no need to achieve all of these objects. Other objects will be apparent from and can be derived from the description of the specification, the drawings, the claims, and the like.

One embodiment of the present invention is an information processing device including an input/output device and an arithmetic device.

The input/output device is configured to supply input position coordinate data.

The arithmetic device is configured to receive the input position coordinate data. The arithmetic device is configured to supply image data and control data.

The input/output device includes a display portion and an input portion.

The input portion is configured to supply the input position coordinate data. The input position coordinate data is data on coordinates in one display portion.

The display portion is configured to display the image data.

The display portion includes a selection circuit, a first driver circuit, a second driver circuit, and a display panel.

The arithmetic device includes a memory portion and is configured to store icon coordinate data including data on coordinates where individual icons are displayed in the display portion and selection histories of the icons. In this specification, an icon refers to a figure or an image associated with a command for executing a program or the like. For example, a user of the information processing device can easily execute a predetermined command by selecting an icon with a pointer or the like. The icon may be dragged, moved, or placed on the display screen. The icon spreads over a certain range. In other words, each icon coordinate data includes data for all the area of this icon.

The arithmetic device is configured to determine whether there is an overlap between the input position coordinate data and the icon coordinate data. The occurrence of an overlap between the input position coordinate data and the icon coordinate data is described as "the selection of an icon", and this icon is described as "the selected icon".

Furthermore, the arithmetic device is configured to generate the image data.

Moreover, the arithmetic device is configured to generate the control data, which is the data varying depending on the coordinates in the display portion. The control data is set to be any of a first-status control data, a second-status control data, and a third-status control data.

The arithmetic device generates the third-status control data when a particular input position coordinate data is supplied.

The selection circuit is configured to supply the image data to the first driver circuit or the second driver circuit when the first-status or second-status control data is supplied from the arithmetic device. At this time, the image data is supplied to one of the first and second driver circuits, and background data is supplied to the other thereof. The background data is data for displaying a black image.

The selection circuit is configured to supply the image data to both of the first and second driver circuits when the third-status control data is supplied from the arithmetic device.

Here, when a certain image data is generated by the arithmetic device and displayed in the display portion, the luminance of the display portion when the third-status control data is supplied is higher than that of the display portion when the first or second status control data is supplied. In this manner, the luminance can be increased and visual emphasis is possible in the display mode selected on the basis of the input position coordinate data obtained from the input/output device. Thus, a novel information processing device that is highly convenient can be provided.

The information processing device of one embodiment of the present invention is configured to store the number of times the icons are selected in the arithmetic device on the basis of the input position coordinate data obtained from the input/output device. A threshold value is set, and the third-status control data is supplied for the icon which is selected more than (i.e., with a higher frequency than) the threshold value. Thus, the icon with high selection frequency can be visually emphasized in the information processing device.

In one embodiment of the present invention, the input/output device includes a sensor portion configured to supply sensing data. The arithmetic device is configured to receive the sensing data. The sensor portion includes an illuminance sensor in the information processing device.

The illuminance sensor is configured to supply the sensing data including illuminance data on an environment where the information processing device is used.

The information processing device of one embodiment of the present invention includes the arithmetic device which is configured to determine the status on the basis of the sensing data and the image data and supply the control data in the determined status. In other words, the arithmetic device is configured to determine the luminance of the display when the image data is supplied to the first driver circuit and the display when the image data is supplied to the second driver circuit, on the basis of the supplied sensing data. Thus, a reflective display element or a light-emitting element is selected on the basis of the sensing data on illuminance or the like and the image data, and the image data can be displayed using the selected reflective display element or light-emitting element. As a result, a novel information processing device that is highly convenient can be provided.

Although the block diagram attached to this specification shows components classified by their functions in independent blocks, it is difficult to classify actual components according to their functions completely and it is possible for one component to have a plurality of functions.

In this specification, the terms "source" and "drain" of a transistor interchange with each other depending on the polarity of the transistor or the levels of potentials applied to the terminals. In general, in an n-channel transistor, a terminal to which a lower potential is applied is called a source, and a terminal to which a higher potential is applied is called a drain. In a p-channel transistor, a terminal to which a lower potential is applied is called a drain, and a terminal to which a higher potential is applied is called a source. In this specification, although connection relation of the transistor is described assuming that the source and the drain are fixed for convenience in some cases, actually, the names of the source and the drain interchange with each other depending on the relation of the potentials.

Note that in this specification, a "source" of a transistor means a source region that is part of a semiconductor film functioning as an active layer or a source electrode connected to the semiconductor film. Similarly, a "drain" of a transistor means a drain region that is part of the semiconductor film or a drain electrode connected to the semiconductor film. A "gate" means a gate electrode.

Note that in this specification, a state in which transistors are connected to each other in series means, for example, a state in which only one of a source and a drain of a first transistor is connected to only one of a source and a drain of a second transistor. In addition, a state in which transistors are connected in parallel means a state in which one of a source and a drain of a first transistor is connected to one of a source and a drain of a second transistor and the other of the source and the drain of the first transistor is connected to the other of the source and the drain of the second transistor.

In this specification, the term "connection" means electrical connection and corresponds to a state where a current, a voltage, or a potential can be supplied or transmitted. Accordingly, connection means not only direct connection but also indirect connection through a circuit element such as a wiring, a resistor, a diode, or a transistor so that a current, a potential, or a voltage can be supplied or transmitted.

In this specification, even when different components are connected to each other in a circuit diagram, there is actually a case where one conductive film has functions of a plurality of components such as a case where part of a wiring serves as an electrode. The term "connection" in this specification also means such a case where one conductive film has functions of a plurality of components.

Further, in this specification, one of a first electrode and a second electrode of a transistor refers to a source electrode and the other refers to a drain electrode.

One embodiment of the present invention is an information processing device, in which the display panel includes a first signal line, a second signal line, and a group of pixels, the group of pixels are arranged in a column direction, the first signal line is electrically connected to the group of pixels arranged in the column direction, the first signal line is electrically connected to the first driver circuit, the second signal line is electrically connected to the group of pixels arranged in the column direction, and the second signal line is electrically connected to the second driver circuit.

One embodiment of the present invention is the information processing device, in which the group of pixels each include a first display element and a second display element, the first display element includes a reflective display element, the first display element is electrically connected to the first signal line, the second display element includes a light-emitting element, and the second display element is electrically connected to the second signal line.

One embodiment of the present invention is the information processing device, in which the first display element includes a reflective film that reflects external light in a display direction and is configured to control the intensity of the reflected light, the reflective film includes an opening, and the second display element includes a region overlapping with the opening and a layer containing a light-emitting organic compound and is configured to emit light toward the opening.

One embodiment of the present invention is the information processing device, in which the arithmetic device is configured to, when an icon is selected, supply the third-status control data to the input/output device in accordance with coordinates of a region where the icon is displayed.

One embodiment of the present invention is the information processing device, in which the arithmetic device is configured to determine a particular icon on the basis of a selection history of the icon and supply the third-status control data toward coordinates of a region where the particular icon is displayed.

One embodiment of the present invention is the information processing device, in which the arithmetic device is configured to supply the control data in the third status toward a pointer display region until a certain period of time has passed from the last input from the input portion, and the arithmetic device is configured to supply the first-status control data or the second-status control data toward the pointer display region after the certain period of time has passed from the last input from the input portion.

One embodiment of the present invention is the information processing device, in which the sensor portion includes an illuminance sensor, and the illuminance sensor is configured to supply the sensing data including illuminance data on an environment where the information processing device is used.

One embodiment of the present invention is the information processing device, in which the input portion includes at least one of a keyboard, a hardware button, a pointing device, a touch sensor, an illuminance sensor, an imaging device, an audio input device, a viewpoint input device, and an attitude determination device.

One embodiment of the present invention can provide a novel information processing device that is highly convenient. One embodiment of the present invention can provide a novel information processing device or a novel semiconductor device.

Note that the descriptions of these effects do not disturb the existence of other effects. One embodiment of the present invention does not necessarily have all of these effects. Other effects will be apparent from and can be derived from the description of the specification, the drawings, the claims, and the like.

BRIEF DESCRIPTION OF DRAWINGS

In the accompanying drawings:

FIGS. 3A to 3C each illustrate an information processing device of an embodiment;

FIG. 7 is a flow chart showing a program that can be used in an information processing device of an embodiment;

FIGS. 9A, 9B1, and 9B2 are bottom views illustrating a structure of a display panel that can be used in a display device of an embodiment;

FIGS. 11A, 11B1, and 11B2 are schematic views for explaining the shape of a reflective film in pixels that can be used in a display device of an embodiment;

FIGS. 18A to 18H each illustrate a structure of an electronic device of an embodiment;

FIGS. 20A and 20B are cross-sectional views illustrating a structure of a display panel that can be used in a display device of an embodiment.

BEST MODE FOR CARRYING OUT THE INVENTION

Figure 1A:
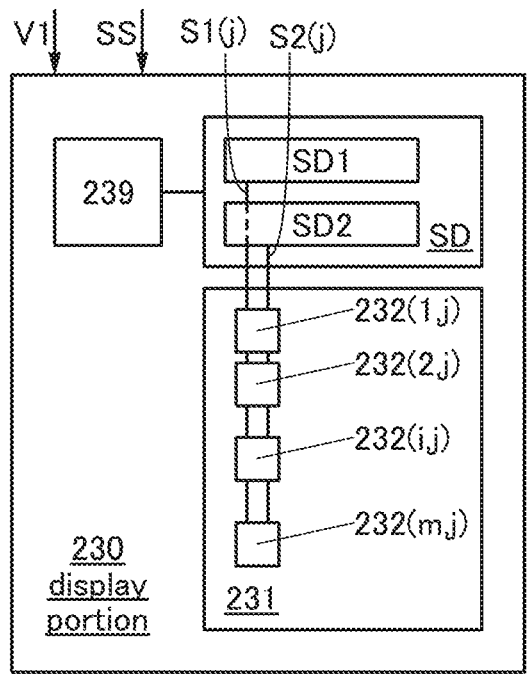
FIGS. 1A and 1B are drawings for explaining a structure of an information processing device of an embodiment.

An information processing device of one embodiment of the present invention supplies part of image data selected on the basis of input position coordinate data to a first driver circuit and a second driver circuit.

Thus, when the selected part of the image data is supplied from an arithmetic device, the selected image is displayed brightly. As a result, a novel information processing device that is highly convenient can be provided.

Embodiments will be described in detail with reference to the drawings. It will be readily appreciated by those skilled in the art that modes and details of the present invention can be modified in various ways without departing from the spirit and scope of the present invention. Thus, the present invention should not be construed as being limited to the description in the embodiments below. Note that in structures of the invention described below, the same portions or portions having similar functions are denoted by the same reference numerals in different drawings, and a description thereof is not repeated.

Embodiment 1

In this embodiment, a structure of an information processing device of one embodiment of the present invention will be described with reference to FIGS. 1A and 1B, FIG. 2, FIGS. 3A to 3C, and FIGS. 4A to 4C.

Figure 1B:
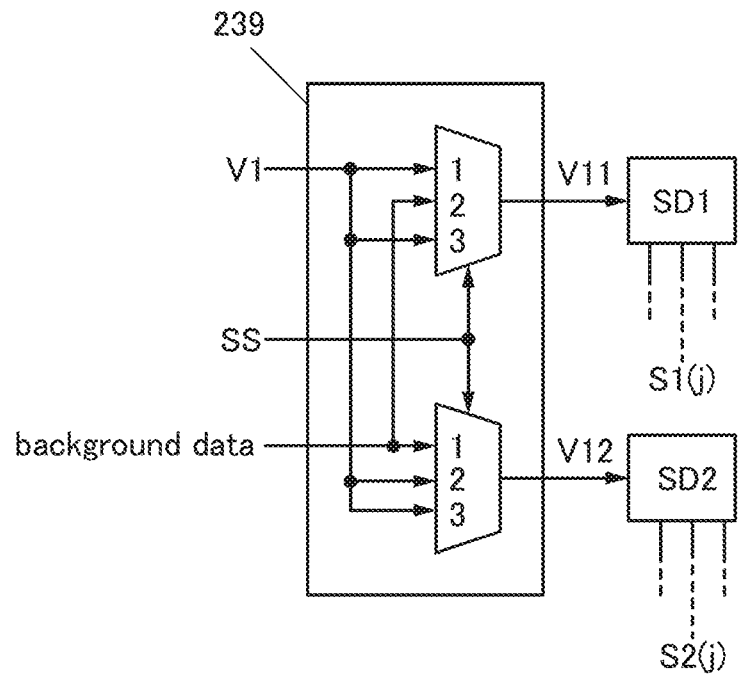

FIGS. 1A and 1B illustrate a configuration of the information processing device of one embodiment of the present invention. FIG. 1A is a block diagram of a display portion 230 that can be used in the information processing device of one embodiment of the present invention and FIG. 1B is a block diagram illustrating a selection circuit 239, a first driver circuit SD1, or a second driver circuit SD2 in FIG. 1A.

Figure 2:
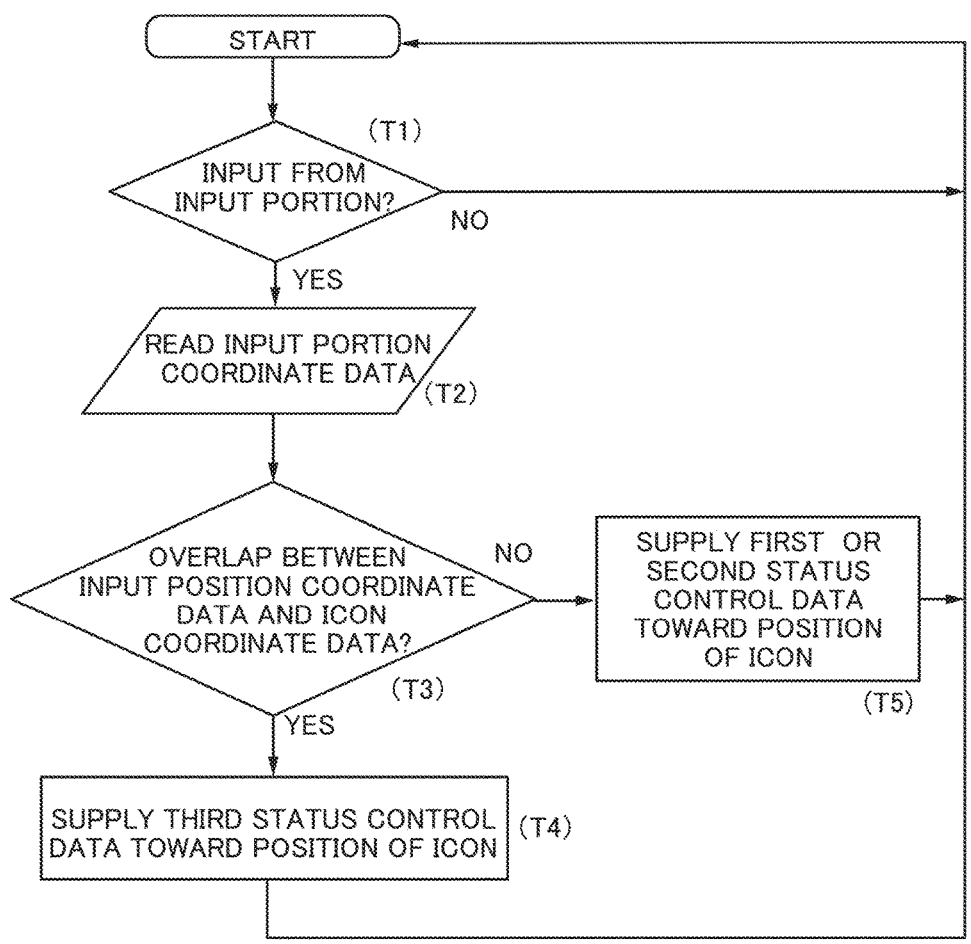
FIG. 2 is a flow chart showing a program that can be used in an information processing device of an embodiment.

FIG. 2 is a flow chart showing a program that can be used for the information processing device of one embodiment of the present invention.

FIG. 3A is a block diagram illustrating a configuration of an information processing device 200. FIGS. 3B and 3C are projection views illustrating examples of external views of the information processing device 200.

Figure 4A:
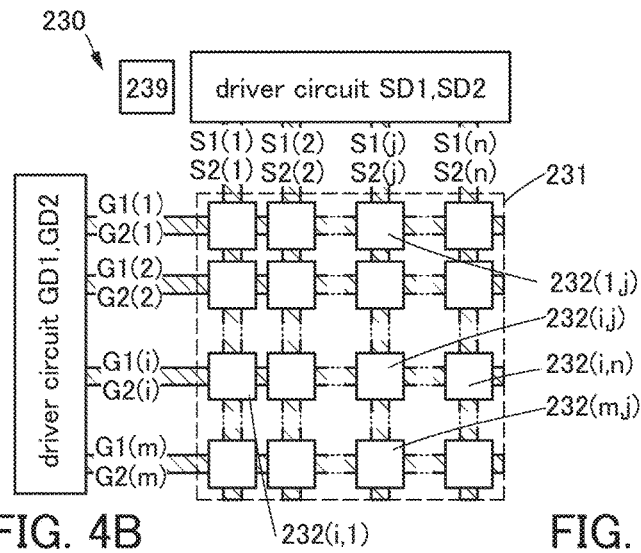
FIGS. 4A to 4C each illustrate an information processing device of an embodiment.
Figure 4B:
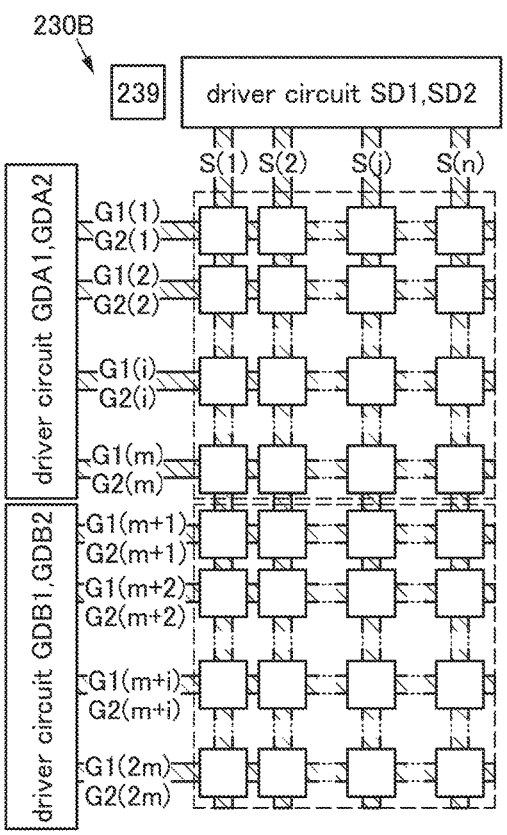
Figure 4C:
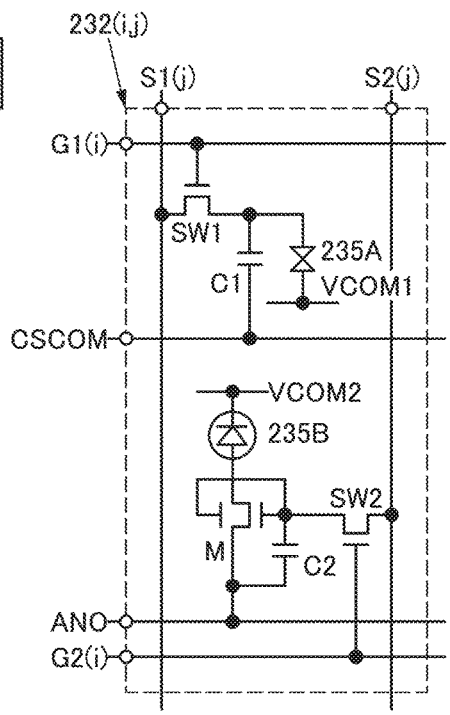

FIG. 4A is a block diagram illustrating a configuration of the display portion 230. FIG. 4B is a block diagram illustrating a configuration of a display portion 230B. FIG. 4C is a circuit diagram illustrating a configuration of a pixel 232(i, j).

<Configuration Example 1 of Information Processing Device>

The information processing device 200 described in this embodiment includes an input/output device 220 and an arithmetic device 210 (see FIG. 3A).

The input/output device 220 has a function of supplying input position coordinate data P1 and sensing data P2. In addition, the input/output device 220 has a function of receiving image data V1 and control data SS.

The arithmetic device 210 has a function of receiving the input position coordinate data P1 and the sensing data P2. In addition, the arithmetic device 210 has a function of supplying the image data V1 and the control data SS.

The input/output device 220 includes the display portion 230, an input portion 240, and a sensor portion 250.

The input portion 240 has a function of supplying the input position coordinate data P1.

The sensor portion 250 has a function of supplying the sensing data P2.

The display portion 230 has a function of displaying the image data V1.

The display portion 230 includes the selection circuit 239, the first driver circuit SD1, the second driver circuit SD2, and a display panel (see FIG. 1A).

The arithmetic device 210 has a function of generating the image data V1 (see FIG. 3A). In addition, the arithmetic device 210 has a function of generating the control data SS on the basis of the sensing data P2 and the image data V1. Note that the control data SS is any of a first-status control data, a second-status control data, and a third-status control data.

The selection circuit 239 has a function of supplying the image data V1 to the first driver circuit SD1 and supplying background data to the second driver circuit SD2 when receiving the first-status control data SS (see FIG. 1B).

The selection circuit 239 similarly has a function of supplying the background data to the first driver circuit SD1 and supplying the image data V1 to the second driver circuit SD2 when receiving the second-status control data SS.

The selection circuit 239 has a function of supplying the image data V1 to the first driver circuit SD1 and the second driver circuit SD2 when receiving the third-status control data SS.

The display panel of the information processing device 200 described in this embodiment includes a first signal line S1($j$), a second signal line S2($j$), and a group of pixels 232(1, $j$) to 232($m$, $j$) (see FIG. 1A).

The group of pixels 232(1, $j$) to 232($m$, $j$) are arranged in a column direction. Note that i is an integer greater than or equal to 1 and less than or equal to m, j is an integer greater than or equal to 1 and less than or equal to n, and m and n are each an integer greater than or equal to 1.

The first signal line S1($j$) is electrically connected to the group of pixels 232(1, $j$) to 232($m$, $j$) arranged in the column direction. In addition, the first signal line S1($j$) is electrically connected to the first driver circuit SD1.

The second signal line S2($j$) is electrically connected to the group of pixels 232(1, $j$) to 232($m$, $j$) arranged in the column direction. In addition, the second signal line S2($j$) is electrically connected to the second driver circuit SD2.

The pixel 232($i$, $j$) of the information processing device 200 described in this embodiment includes a first display element 235A and a second display element 235B (see FIG. 4C).

The first display element 235A includes a reflective display element and is electrically connected to the first signal line S1($j$).

The second display element 235B includes a light-emitting element and is electrically connected to the second signal line S2($j$).

The information processing device described in this embodiment includes the display panel including the pixel provided with the reflective display element and the light-emitting element. Thus, the reflective display element or the light-emitting element is selected on the basis of the sensing data, and the image data can be displayed using the selected reflective display element or light-emitting element. As a result, a novel information processing device that is highly convenient can be provided.

Furthermore, the arithmetic device 210 of the information processing device 200 described in this embodiment has a function of supplying the first-status control data SS when the input position coordinate data P1 is not supplied and the sensing data P2 is greater than or equal to a predetermined threshold value.

The threshold value is, for example, the value of the sensing data P2 at which the same luminance can be obtained from both the reflective display element and the light-emitting element, which is obtained by changing the sensing data P2 in the state where the reflective display element and the light-emitting element are individually made to display a white image with the highest possible luminance. Alternatively, in order to restrict image exhibition by the light-emitting element for the purpose of lower power consumption, the sensing data P2 at the time when the luminance of the reflective display element is 1.5 times that of the light-emitting element may be used as the threshold value.

Furthermore, the arithmetic device 210 supplies the second-status control data SS when the input position coordinate data P1 is not supplied and the sensing data P2 is less than the predetermined threshold value.

Moreover, the sensor portion 250 of the information processing device 200 described in this embodiment includes an illuminance sensor and the sensing data P2 contains illuminance data on the environment in which the information processing device 200 is used (see FIG. 3A).

The information processing device described in this embodiment includes the arithmetic device which has a function of determining the status on the basis of the sensing data and the image data and supplying the control data about the determined status. Thus, the reflective display element or the light-emitting element is selected on the basis of the sensing data such as illuminance and the image data, and the image data can be displayed using the selected reflective display element or light-emitting element. As a result, a novel information processing device that is highly convenient can be provided.

Moreover, the information processing device 200 includes a communication portion 290.

The following describes components included in the information processing device 200. Note that these components cannot be clearly distinguished and one component also serves as another component or includes part of another component in some cases.

For example, the display portion 230 with which the input portion 240 overlaps serves as both the input portion 240 and the display portion 230.

Configuration Example

The information processing device 200 includes the arithmetic device 210, the input/output device 220, the display portion 230, the sensor portion 250, or the input portion 240.
<Arithmetic Device 210>
The arithmetic device 210 includes an arithmetic portion 211 and a memory portion 212. The arithmetic device 210 further includes a transmission path 214 and an input/output interface 215.
<Arithmetic Portion 211>
The arithmetic portion 211 has a function of, for example, executing a program.
<Memory Portion 212>
The memory portion 212 has a function of, for example, storing the program executed by the arithmetic portion 211, initial data, setting data, an image, or the like. In addition, the memory portion 212 has a function of storing icon coordinate data.

Specifically, a hard disk, a flash memory, a transistor including an oxide semiconductor, or the like can be used.
<Program>
For example, a program for determining the status of the control data SS on the basis of the input position coordinate data P1 can be used for the arithmetic device 210.

Compared with the image exhibition by only the reflective display element or only the light-emitting element, the image exhibition using both the reflective display element and the light-emitting element enables a higher luminance.

In an example described below, the reflective display element is used when the first-status control data is supplied, whereas the light-emitting element is used when the second-status control data is supplied. In addition, both the reflective display element and the light-emitting element are used when the third-status control data is supplied.

When the third-status control data is supplied, the illuminance of the display is higher than that of the display when the first-status control data or the second-status control data is supplied, and visual emphasis is possible.

Specifically, a program including the following steps can be used.

<First Step>

In the first step, whether there is an input from the input portion 240 is determined. When there is an input, the second step is selected, and when there is not an input, the program returns to the START state (see (T1) in FIG. 2).

<Second Step>

In the second step, the input position coordinate data P1 supplied from the input portion 240 is read (see (T2) in FIG. 2).

<Third Step>

In the third step, with reference to icon coordinate data supplied from the memory portion 212, it is determined whether there is an overlap between the icon coordinate data, that is, the displayed icon and the position in the display portion designated by the input position coordinate data P1. When there is an overlap, the fourth step is selected. When there is not an overlap, the fifth step is selected.

<Fourth Step>

In the fourth step, the third-status control data SS is supplied toward the position in the display portion designated by the input position coordinate data P1 (see (T4) in FIG. 2).

<Fifth Step>

In the fifth step, the first-status or second-status control data SS is supplied toward the position in the display portion designated by the input position coordinate data P1 (see (T5) in FIG. 2). An example of supplying the first-status control data SS is described below.

In the case where an icon that is not selected is displayed, the selection circuit 239 supplies the image data V1 to the first driver circuit SD1 and the background data to the second driver circuit SD2 on the basis of the first-status control data SS in the process from the third step to the START state (see FIG. 1B). In the case where an icon that is selected is displayed, the selection circuit 239 supplies the image data V1 to the first driver circuit SD1 and the second driver circuit SD2 on the basis of the third-status control data SS through the fourth step and the fifth step. Then, the program returns to the START state.

The reflective display element and the light-emitting element are used in the above-described example. Depending on the pixel area or luminance of each display element and the environment such as external light, the luminance relation might be reversed between the reflective display element and the light-emitting element. Therefore, the information processing device 200 may have a function of appropriately changing the status assignment for the reflective display element and the light-emitting element may be provided.

<Input/Output Interface 215, Transmission Path 214>

The input/output interface 215 includes a terminal or a wiring and has a function of supplying and receiving data. For example, the input/output interface 215 can be electrically connected to the transmission path 214 and the input/output device 220.

The transmission path 214 includes a wiring and has a function of supplying and receiving data. For example, the transmission path 214 can be electrically connected to the input/output interface 215. In addition, the transmission path 214 can be electrically connected to the arithmetic portion 211, the memory portion 212, or the input/output interface 215.

<Input/Output Device 220>

The input/output device 220 includes the display portion 230, the input portion 240, the sensor portion 250, or the communication portion 290.

For example, the input/output device 220 includes the display portion 230 and the input portion 240 having a region overlapping with the display portion 230. A touch panel or the like can be used for the input/output device 220. Specifically, the touch panel described in Embodiment 7 can be used for the input/output device 220.

<Display Portion 230>

For example, the display panel, the selection circuit 239, the driver circuit SD1, or the driver circuit SD2 can be used in the display portion 230 (see FIG. 1A and FIGS. 4A to 4C).

A display region 231 includes a plurality of pixel $232(i, j)$ to $232(i, n)$ arranged in a row direction, a plurality of pixels $232(1, j)$ to $232(m, j)$ arranged in a column direction, scan lines $G1(i)$ and $G2(i)$ which are electrically connected to the plurality of pixels $232(i, 1)$ to $232(i, n)$, and the signal line $S1(j)$ and the signal line $S2(j)$ which are electrically connected to the plurality of pixel $232(i, j)$ to $232(m, j)$. Note that i is an integer greater than or equal to 1 and less than or equal to m, j is an integer greater than or equal to 1 and less than or equal to n, and m and n are each an integer greater than or equal to 1.

Note that the pixel $232(i, j)$ is electrically connected to the scan line $G1(i)$, the scan line $G2(i)$, the signal line $S1(j)$, the signal line $S2(j)$, a wiring ANO, a wiring CSCOM, a wiring VCOM1, and a wiring VCOM2 (see FIG. 4C).

The display portion can include a plurality of driver circuits. For example, the display portion 230B can include a driver circuit GDA and a driver circuit GDB (see FIG. 4B).

<Driver Circuit GD>

The driver circuit GD has a function of supplying a selection signal.

For example, the driver circuit GD has a function of supplying a selection signal to one scan line with a frequency of 30 Hz or higher, preferably 60 Hz or higher, on the basis of the control data.

<Display Panel>

For example, the display region 231 which has a function of displaying the image data V1 can be used in the display panel. Furthermore, the group of pixels $232(1, j)$ to $232(m, j)$ can be used in the display region 231 (see FIG. 1A).

In addition, the first signal line $1(j)$ and the second signal line $S2(j)$ can be used in the display panel.

Specifically, a display panel described in Embodiment 4 can be used in the display portion 230.

<Selection Circuit 239>

In the selection circuit 239, a first multiplexer and a second multiplexer can be used, for example (see FIG. 1B).

The first multiplexer includes a first input portion to which the image data V1 is supplied, a second input portion to which the background data is supplied, and a third input portion to which the image data V1 is supplied, and receives the control data SS. The first multiplexer outputs the image data V1 when receiving the first-status control data SS, the background data V00 when receiving the second-status control data SS, and the image data V1 when receiving the third-status control data SS. Note that the data output from the first multiplexer is referred to as data V11.

The second multiplexer includes a first input portion to which the background data is supplied and a second input portion and a third input portion to which the image data V1 is supplied, and receives the control data SS. The second multiplexer outputs the background data V00 when receiving the first-status control data SS, outputs the image data V1 when receiving the second-status control data SS, and outputs the image data V1 when receiving the third-status control data SS. Note that the data output from the second multiplexer is referred to as data V12.

The image data V1 contains signals for all the coordinates in the display region 231. The signals for all the coordinates in the display region 231 are sequentially transmitted to the selection circuit 239. When the control data SS for certain coordinates is transmitted at the same time when a signal for the certain coordinates among the image data V1 is transmitted, the supply destination of the image data V1 is set to any of the following: the first driver circuit SD1, the second driver circuit SD2, or both the first driver circuit SD1 and the second driver circuit SD2.

In an example of an analog circuit that can be used in this embodiment, the potential of the second-status control data SS2 can be assigned as a potential higher than that of the first-status control data SS1, and the potential of the third-status control data SS3 can be assigned as a potential higher than that of the second-status control data SS2.

Figure 5A:
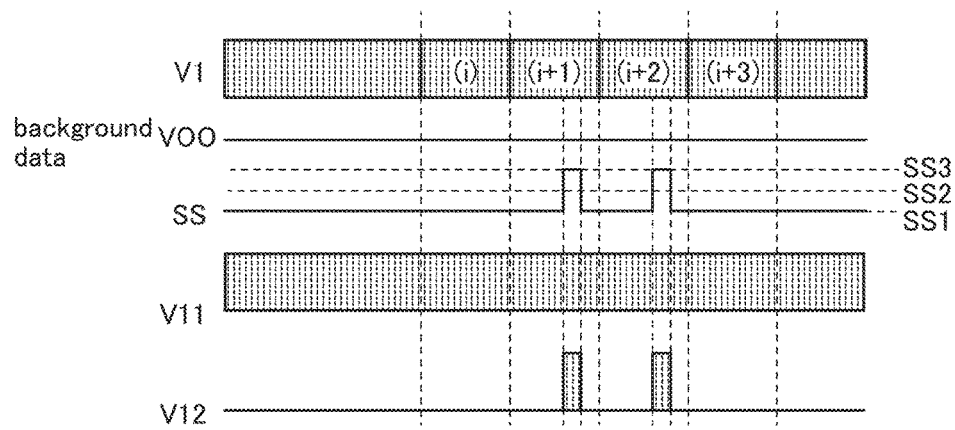
FIGS. 5A to 5C are drawings for explaining image data of an information processing device of an embodiment.
Figure 5B:
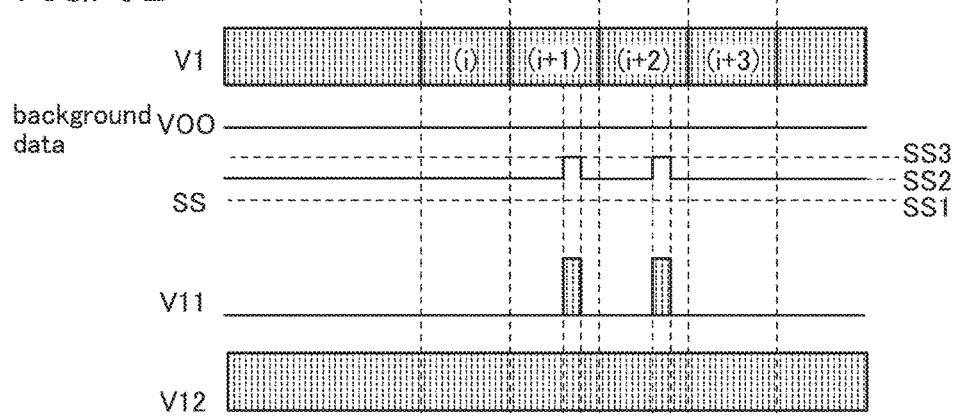

An example of generating the data V11 and the data V12 from the image data V1 using the first-status control data SS1 and the third-status control data SS3 is described. For example, the first-status control data can be assigned to an image that is not selected, and the third-status control data can be assigned to an image that is selected (see FIG. 5A). Alternatively, the second-status control data may be assigned to an image that is not selected, and the third-status control data may be assigned to an image that is selected (see FIG. 5B).

Figure 5C:
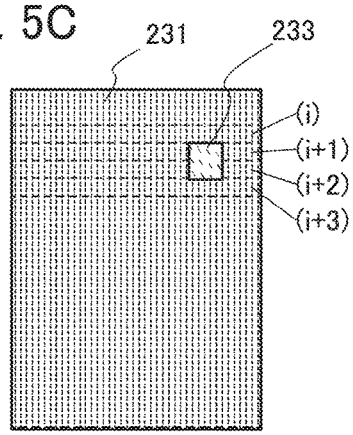

For example, the image that is selected is displayed by pixels positioned in the (i+1)-th row and the (i+2)-th row in the display region 231, and the region of these pixels is referred to as a region 233. Here, the arithmetic device 210 supplies the first-status control data SS1 and the third-status control data SS3, and the selection circuit 239 supplies the data V11 including the image data V1 and the data V12 including the image data V1 (see FIGS. 5A and 5C). The region 233 is displayed by the image data V1 supplied to the first driver circuit SD1 and the second driver circuit SD2, and the display region 231 except for the region 233 is displayed by the image data V1 supplied to the first driver circuit SD1.

Figure 6A:
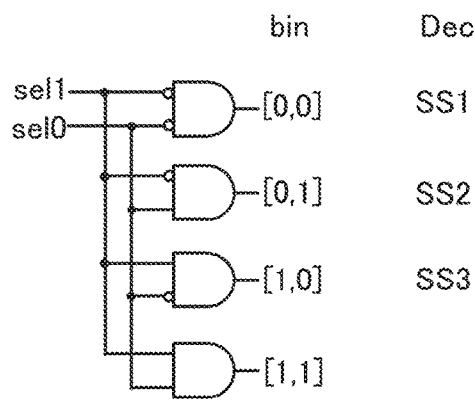
FIGS. 6A and 6B each illustrate a circuit of an information processing device of an embodiment.
Figure 6B:
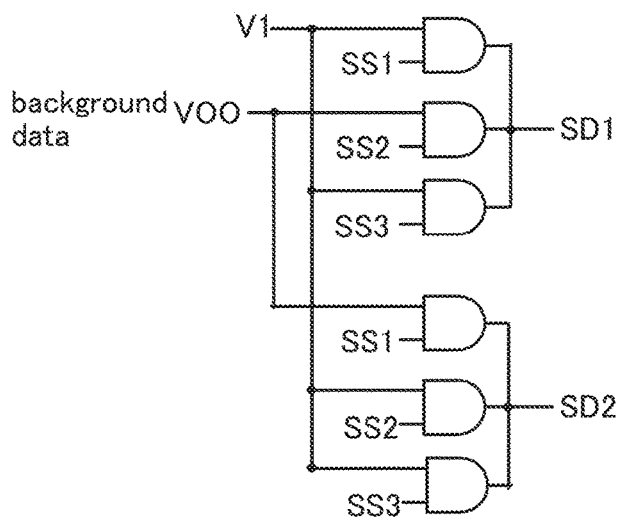

In an example of a digital circuit that can be used in this embodiment, the control data SS can be transmitted through two signal lines sel1 and sel0 (see FIG. 6A). By transmitting two values (0 and 1) of high and low power supply voltages through each signal line, four states (four combinations) can be made. Three of the four states are used as the first-status control data SS1, the second-status control data SS2, and the third-status control data SS3. By these control data SS, signals of the image data V1 or the background data V00 can be supplied to the first driver circuit SD1 or the second driver circuit SD2 (see FIG. 6B).

<Driver Circuit SD1, Driver Circuit SD2>

The driver circuit SD1 has a function of supplying an image signal on the basis of the data V11. The driver circuit SD2 has a function of supplying an image signal on the basis of the data V12. Note that, instead of the driver circuits SD1 and SD2, a driver circuit SD in which the driver circuits SD1 and SD2 are integrated can be used.

For example, any of a variety of sequential circuits, such as a shift register, can be used as the driver circuit SD1 or SD2.

Specifically, an integrated circuit formed on a silicon substrate can be used as the driver circuit SD.

The driver circuit SD1 has a function of generating a signal to be supplied to a pixel circuit electrically connected to the reflective display element, for example. Specifically, the driver circuit SD1 has a function of generating a signal whose polarity is inverted. Thus, for example, the reflective liquid crystal display element can be driven.

The driver circuit SD2 has a function of generating a signal to be supplied to a pixel circuit electrically connected to the light-emitting element, for example.

<Pixel 232(*i*, *j*)>

For example, the reflective display element and the light-emitting element can be used in the pixel 232(*i*, *j*) (see FIG. 4C).

Specifically, the pixel 232(*i*, *j*) includes a first display element 235A and a second display element 235B. The pixel 232(*i*, *j*) further includes a pixel circuit for driving the first display element 235A and the second display element 235B.

<First Display Element 235A>

For example, a display element having a function of controlling light reflection or transmission can be used as the first display element 235A. By using a reflective display element, the power consumption of a display panel can be reduced.

For example, a combined structure of a liquid crystal element and a polarizing plate or a MEMS shutter display element can be used. Specifically, a reflective liquid crystal display element can be used as the first display element 235A.

The first display element 235A includes a first electrode, a second electrode, and a liquid crystal layer. The liquid crystal layer contains a liquid crystal material whose orientation can be controlled by a voltage applied between the first electrode and the second electrode. For example, the orientation of the liquid crystal material can be controlled by an electric field in the thickness direction (also referred to as the vertical direction), the horizontal direction, or the diagonal direction of the liquid crystal layer.

<Second Display Element 235B>

For example, a display element having a function of emitting light can be used as the second display element 235B. Specifically, an organic EL element can be used.

For example, an organic EL element having a function of emitting white light can be used as the second display element 235B. Alternatively, an organic EL element that emits blue light, green light, or red light can be used as the second display element 235B.

<Pixel Circuit>

A circuit having a function of driving the first display element 235A or the second display element 235B can be used as the pixel circuit.

A switch, a transistor, a diode, a resistor, an inductor, a capacitor, or the like can be used in the pixel circuit.

For example, one or a plurality of transistors can be used as a switch. Alternatively, a plurality of transistors connected in parallel, in series, or in combination of parallel connection and series connection can be used as a switch.

<Transistor>

For example, a semiconductor film formed at the same step can be used for transistors in the driver circuit and the pixel circuit.

For example, bottom-gate transistors, top-gate transistors, or the like can be used.

For example, a manufacturing line for a bottom-gate transistor including amorphous silicon as a semiconductor can be easily remodeled into a manufacturing line for a bottom-gate transistor including an oxide semiconductor as a semiconductor. Furthermore, for example, a manufacturing line for a top-gate transistor including polysilicon as a semiconductor can be easily remodeled into a manufacturing line for a top-gate transistor including an oxide semiconductor as a semiconductor.

For example, a transistor including a semiconductor containing an element of Group 14 can be used. Specifically, a semiconductor containing silicon can be used for a semiconductor film. For example, single crystal silicon, polysilicon, microcrystalline silicon, amorphous silicon, or the like can be used for the semiconductor film of the transistor.

Note that the temperature for forming a transistor using polysilicon as a semiconductor is lower than the temperature for forming a transistor using single crystal silicon as a semiconductor. When low-temperature polysilicon (LTPS) is used, the upper limit of the process temperature is approximately 500° C. to 550° C.

In addition, the transistor using polysilicon as a semiconductor has a higher field-effect mobility than the transistor using amorphous silicon as a semiconductor, and therefore enables a higher aperture ratio of pixel. Moreover, pixels arranged at an extremely high density, a gate driver circuit, and a source driver circuit can be formed over the same substrate. As a result, the number of components included in an electronic device can be reduced.

In addition, the transistor using polysilicon as a semiconductor has higher reliability than the transistor using amorphous silicon as a semiconductor.

For example, a transistor including an oxide semiconductor can be used. Specifically, an oxide semiconductor containing indium or an oxide semiconductor containing indium, gallium, and zinc can be used for a semiconductor film.

For example, a transistor having a lower leakage current in an off state than a transistor that uses amorphous silicon for a semiconductor film can be used. Specifically, a transistor that uses an oxide semiconductor for a semiconductor film can be used.

Accordingly, the pixel circuit can hold an image signal for a longer time than a pixel circuit including a transistor that uses amorphous silicon for a semiconductor film. Specifically, the selection signal can be supplied with a frequency of lower than 30 Hz, preferably lower than 1 Hz, and further preferably less than once per minute while flickering is suppressed. Consequently, eyestrain on a user of the information processing device can be reduced, and power consumption for driving can be reduced.

Alternatively, for example, a transistor including a compound semiconductor can be used. Specifically, a semiconductor containing gallium arsenide can be used for a semiconductor film.

For example, a transistor including an organic semiconductor can be used. Specifically, an organic semiconductor containing any of polyacenes and graphene can be used for the semiconductor film.

<Input Portion 240>

The input portion 240 includes an input panel.

For example, the input panel includes a proximity sensor which has a function of sensing an approaching pointer. Note that a finger, a stylus pen, or the like can be used as the pointer.

As the stylus pen, a light-emitting element such as a light-emitting diode, a piece of metal, a coil, or the like can be used.

For example, a capacitive proximity sensor, an electromagnetic inductive proximity sensor, an infrared light detection type proximity sensor, a proximity sensor including a photoelectric conversion element, or the like can be used as the proximity sensor.

The capacitive proximity sensor includes a conductive film and has a function of detecting the proximity of an object with inductivity larger than that of the air to the conductive film. For example, a plurality of conductive films is provided in different regions of the input panel, and a region a finger or the like serving as a pointer approaches is identified in accordance with a change in the parasitic capacitance of the conductive film to determine input position coordinate data.

In addition, the electromagnetic inductive proximity sensor has a function of detecting the proximity of a piece of metal, a coil, or the like to the detection circuit. For example, a plurality of oscillator circuits is provided in different regions of the input panel, and a region a piece of metal, a coil, or the like in a stylus pen or the like serving as a pointer approaches can be identified in accordance with a change in the circuit constant of the oscillation circuit to determine input position coordinate data.

For example, the photo-detection proximity sensor has a function of detecting the proximity of a light-emitting element. For example, a plurality of photoelectric conversion elements is provided in different regions of the input panel, and a region a light-emitting element in a stylus pen or the like serving as a pointer approaches can be identified in accordance with a change in the electromotive force of the photoelectric conversion element to determine input position coordinate data.

<Sensor Portion 250>

As the sensor portion 250, a sensor having a function of sensing the surrounding state and supplying the sensing data P2 can be used.

For example, an illuminance sensor that senses the brightness of an environment, a human motion sensor, or the like can be used for the sensor portion 250.

For example, a camera, an acceleration sensor, a direction sensor, a pressure sensor, a temperature sensor, a humidity sensor, an illuminance sensor, or a global positioning system (GPS) signal receiving circuit can be used as the sensor portion 250.

<Communication Portion 290>

The communication portion 290 has a function of supplying or acquiring data to/from a network.

Note that this embodiment can be combined with any of the other embodiments in this specification as appropriate.

Embodiment 2

In this embodiment, a program that can be used for an information processing device of one embodiment of the present invention is described with reference to FIG. 7.

In this embodiment, a method for supplying the first-status control data SS, the second-status control data SS, or the third-status control data SS on the basis of the frequency of selection of the icon by the input/output device with the use of the structure described in Embodiment 1 is described. Furthermore, a method for supplying the first-status control data SS, the second-status control data SS, or the third-status control data SS on the basis of sensing data supplied from the sensor portion 250 to the arithmetic device is described.

With this program, an icon with low selection frequency is displayed at a low luminance using a reflective display element, while an icon with high selection frequency is displayed at a high luminance using a light-emitting element and a reflective display element so as to be emphasized and displayed at high visibility.

FIG. 7 is a flow chart showing the program of one embodiment of the present invention.

<Program Example>

The program of one embodiment of the present invention can have a structure of improving the visibility in the following manner on the basis of the illuminance of the environment where the information processing device 200 is placed and the frequency of selection of the icon by the input/output device, in addition to the structure of the program described in Embodiment 1.

The icon with high selection frequency is displayed using the light-emitting element and the reflective display element.

In the case where the information processing device 200 is used in a dim or dark environment, the icon with low selection frequency is displayed using the light-emitting element. Thus, the image data can be favorably displayed even in a dark environment.

In the case where the information processing device 200 is used in a bright environment, the icon with low selection frequency is displayed using the reflective display element.

As in Embodiment 1, the reflective display element is used when the first-status control data is supplied. Furthermore, the light-emitting element is used when the second-status control data is supplied. Moreover, both the reflective display element and the light-emitting element are used when the third-status control data is supplied.

That is, the program includes the following steps.

<First to Third Steps>

In the first to third steps ((T1) to (T3) in FIG. 7), in the same way as the steps (T1) to (T3) in FIG. 2, whether there is an input from the input portion 240 is determined, the input position coordinate data P1 supplied from the input portion 240 is read, and whether there is an overlap with the displayed icon is determined.

In the case where there is not an overlap with the displayed icon, the fifth step ((T5) in FIG. 7) is selected. In the case where there is an overlap with the displayed icon, the next fourth step ((T4) in FIG. 7) is selected.

<Fourth Step>

In the fourth step, the selection frequency of the icon that has an overlap according to the determination in the third step ((T3) in FIG. 7), that is, the selected icon is determined by the arithmetic device 210.

When it is determined that the icon is frequently selected, the next (7-3)th step ((T7-3) in FIG. 7) is selected, and the third-status control data SS is supplied in accordance with the data of the coordinates at which the icon is displayed, that is, icon coordinate data. The selection frequency is determined by whether the number of times the icon is selected so far from the time of input is more than or equal to a predetermined threshold value. In addition, the selection number of times is updated every input. Here, the selection circuit 239 supplies the image data V1 to the first driver circuit SD1 and the second driver circuit SD2 on the basis of the third-status control data SS (see FIG. 1B).

Furthermore, when it is determined that the icon is not selected frequently, the fifth step ((T5) in FIG. 7) is selected.

<Fifth Step>

In the fifth step, an illuminance sensor is used for the sensor portion 250 and the sensing data P2 about the illuminance is supplied to the sensor portion 250 to compare the sensing data P2 with a predetermined value.

<Sixth Step>

In the sixth step, which the first-status control data or the second-status control data is supplied is determined on the basis of the sensing data P2 about the outside environment, that is, illuminance. When the environment where the information processing device 200 is used is bright, the first-status control data is supplied and the reflective display element performs display ((T7-1) in FIG. 7). When the environment is dim or dark, the second-status control data is supplied and the light-emitting element performs display ((T7-2) in FIG. 7).

When the environment where the information processing device 200 is used is bright, the selection circuit 239 supplies the image data V1 and the background data to the first driver circuit SD1 and the second driver circuit SD2, respectively, on the basis of the first-status control data SS (see FIG. 1B). When the environment is dim or dark, the selection circuit 239 supplies the image data V1 and the background data to the second driver circuit SD2 and the first driver circuit SD1, respectively, on the basis of the second-status control data SS (see FIG. 1B).

Thus, the status of the control data can be determined on the basis of the sensing data such as illuminance and the selection frequency of the icon. As a result, the reflective display element, the light-emitting element, or both of them is selected, and the image data can be displayed using the selected reflective display element and/or the selected light-emitting element.

Note that this embodiment can be appropriately combined with any of the other embodiments in this specification as appropriate.

Embodiment 3

In this embodiment, a program that can be used for an information processing device of one embodiment of the present invention is described with reference to FIG. 8.

In this embodiment, the displaying method of a region selected by the input/output device can be changed. In the information processing device of this embodiment, when normal display is performed using the light-emitting element and a defect arises owing to a malfunction in a driver circuit for the light-emitting element, coordinate data of the defect region may be input from the input/output device with a touch sensor or the like, so that display can be performed by the reflective display element in addition to the light-emitting element.

By the program of this embodiment, the region selected by the input/output device is displayed by the reflective display element and the light-emitting element, and the region that is not selected is displayed by the light-emitting element only.

This embodiment can be similarly used in the case where normal display is performed using the reflective display element and display is performed by the light-emitting element in addition to the reflective display element.

Figure 8:
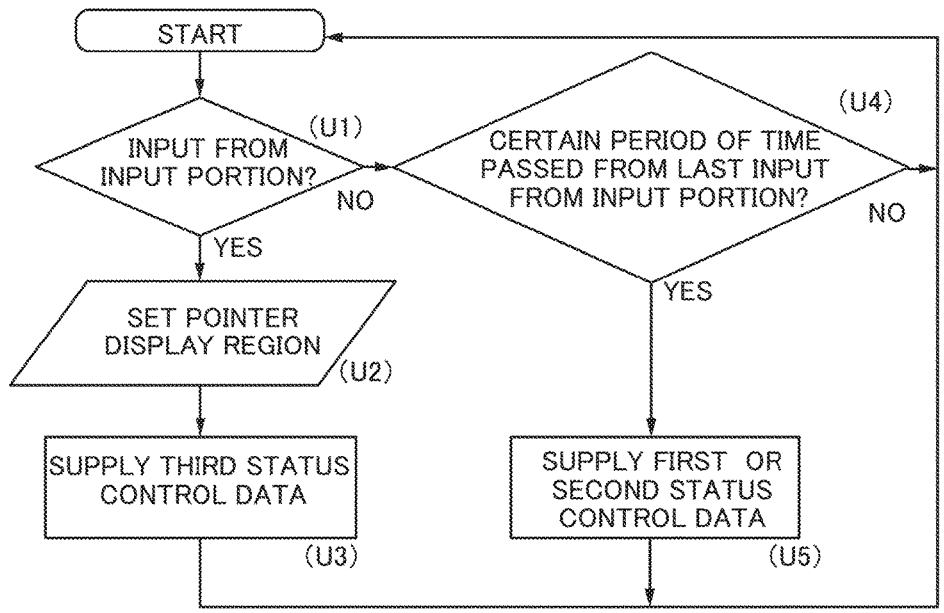
FIG. 8 is a flow chart showing a program that can be used in an information processing device of an embodiment.

FIG. 8 is a flow chart showing the program of one embodiment of the present invention.

<Program Example>

<First Step>

In the first step ((U1) in FIG. 8), whether there is an input from the input portion 240 is determined. If there is an input, the second step is selected.

<Second Step>

In the second step ((U2) in FIG. 8), the input position coordinate data P1 supplied from the input portion 240 is read. In this embodiment, a pointer that spreads with a certain radius from the center of the coordinates of the input position coordinate data P1 is displayed. In this specification, the region where the pointer is displayed is referred to as a pointer display region. Then, the third step is selected.

<Third Step>

In the third step, the third-status control data SS is supplied toward coordinates of the pointer display region set in the second step in the display portion ((U3) in FIG. 8). Then, display is performed by the reflective display element and the light-emitting element in the position to which the third-status control data is input. Thus, the defect region can be complementarily displayed, improving visibility.

<Fourth Step>

In the fourth step, whether a certain period of time has passed from the last input from the input portion is determined. In the certain period of time, the displayed image can be recognized. After the certain period of time, the fifth step for returning to normal display is selected.

<Fifth Step>

In the fifth step, control data for normal display, that is, the first-status control data or the second-status control data, is supplied toward coordinates corresponding to the pointer display region in the display portion. The displaying method for normal display is the method for displaying the icon with low selection frequency on the basis of the sensing data P2 as described in Embodiment 2. By returning to normal display in this manner, the emphasized portion can be updated.

When there are a plurality of input position coordinate data P1, the pointer display region may be a total region for the plurality of input position coordinate data P1.

Note that the input in this embodiment may be the input of sensing data, the input of the input position coordinate data, or the input of both of them. This embodiment can be combined with any of the other embodiments described in this specification as appropriate.

Embodiment 4

In this embodiment, the structure of a display panel of one embodiment of the present invention will be described with reference to FIGS. 9A, 9B1, and 9B2, FIG. 10, FIGS. 11A, 11B1, and 11B2, FIGS. 19A to 19C, and FIGS. 20A and 20B.

FIGS. 9A, 9B1, and 9B2 illustrate the structure of a display panel 700 of one embodiment of the present invention. FIG. 9A is a bottom view of the display panel 700 of one embodiment of the present invention. FIG. 9B1 is a bottom view illustrating part of FIG. 9A. FIG. 9B2 is a bottom view omitting some components illustrated in FIG. 9B1.

Figures 19A, 19B, 19C:
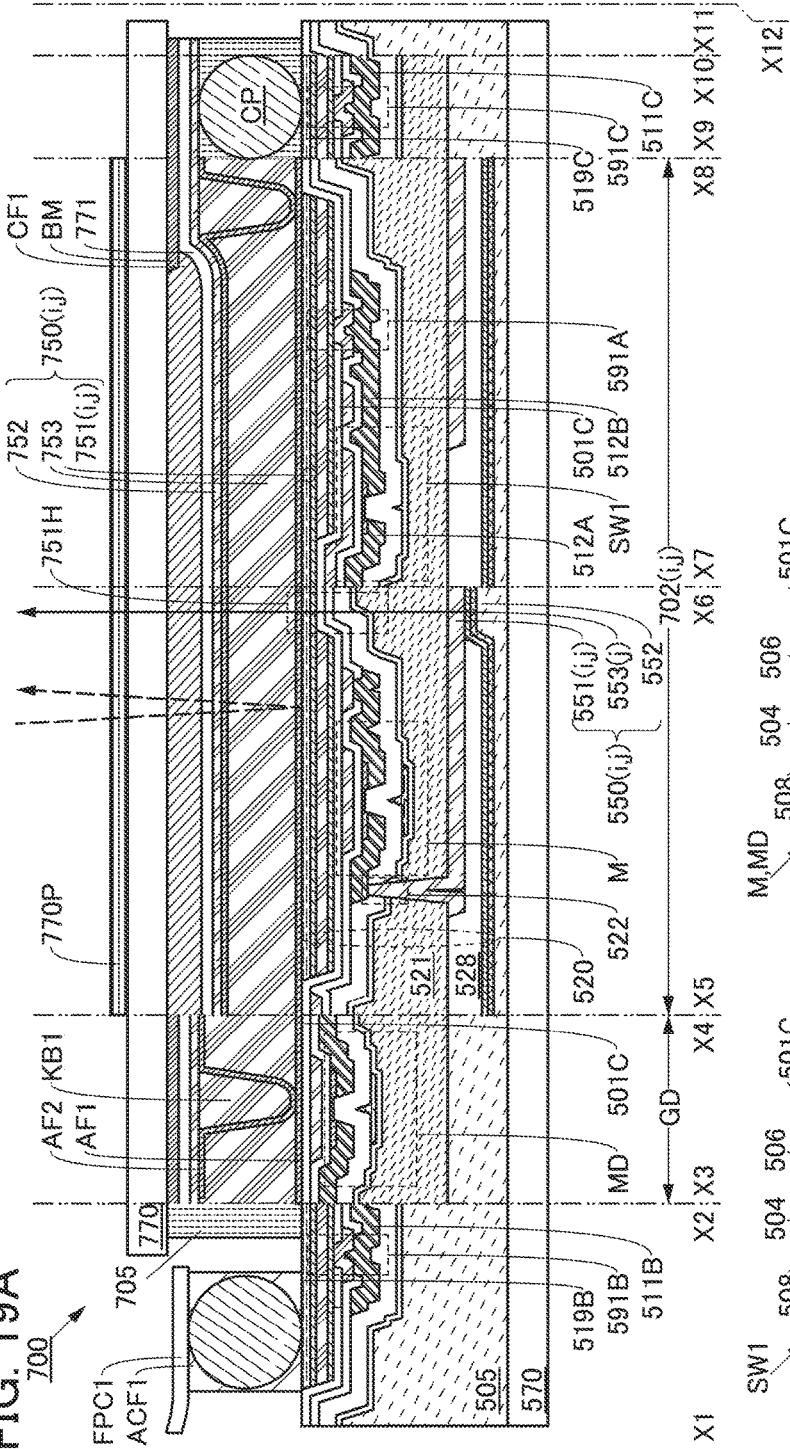
FIGS. 19A to 19C are cross-sectional views illustrating a structure of a display panel that can be used in a display device of an embodiment.

FIGS. 19A to 19C illustrate the structure of the display panel 700 of one embodiment of the present invention. FIG. 19A is a cross-sectional view taken along lines X1-X2, X3-X4, X5-X6, X7-X8, X9-X10, and X11-X12 in FIG. 9A. FIG. 19B is a cross-sectional view illustrating the structure of part of the display panel and FIG. 19C is a cross-sectional view illustrating the structure of another part of the display panel.

Figure 10:
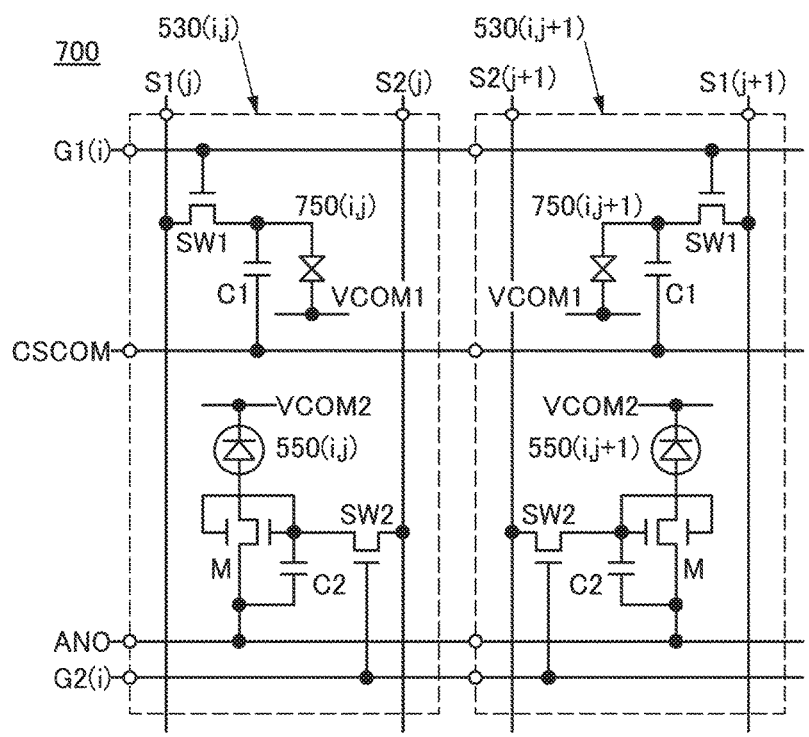
FIG. 10 is a circuit diagram illustrating a pixel circuit of a display panel that can be used in a display device of an embodiment.

FIG. 10 illustrates the structure of the display panel 700 of one embodiment of the present invention. FIG. 10 is a circuit diagram of a pixel circuit 530(*i, j*) and a pixel circuit 530(*i, j*+1) which are included in the display panel 700 of one embodiment of the present invention.

FIGS. 11A, 11B1, and 11B2 illustrate the structure of a display panel 700 of one embodiment of the present invention. FIG. 11A is a block diagram illustrating arrangement of pixels, wirings, or the like which can be used for the display panel 700 of one embodiment of the present invention. FIGS. 11B1 and 11B2 are schematic views illustrating the arrangement of openings 751H which can be used for the display panel 700 of one embodiment of the present invention.

<Structure Example 1 of Display Panel>

The display panel 700 described in this embodiment includes a signal line 1(*j*) and a pixel 702(*i, j*) (see FIGS. 9B1 and 9B2).

The pixel 702(*i, j*) is electrically connected to the signal line S1(*j*).

The pixel 702(*i, j*) includes a first display element 750(*i, j*), a first conductive film, a second conductive film, an insulating film 501C, the pixel circuit 530(*i, j*), and a second display element 550(*i, j*) (see FIG. 19A and FIG. 10).

The first conductive film is electrically connected to the first display element 750(*i, j*) (see FIG. 19A). For example, the first conductive film can be used for the first electrode 751(*i, j*) of the first display element 750(*i, j*).

The second conductive film has a region overlapping with the first conductive film. For example, the second conductive film can be used as a conductive film 512B serving as a source electrode or a drain electrode of a transistor which can be used as a switch SW1.

The insulating film 501C has a region interposed between the second conductive film and the first conductive film.

The pixel circuit 530(*i, j*) is electrically connected to the second conductive film. For example, the transistor in which the second conductive film is used as the conductive film 512B serving as a source electrode or a drain electrode can be used as the switch SW1 of the pixel circuit 530(*i, j*) (see FIG. 19A and FIG. 10).

The second display element 550(*i, j*) is electrically connected to the pixel circuit 530(*i, j*).

The insulating film 501C includes an opening 591A (see FIG. 19A).

The second conductive film is electrically connected to the first conductive film in the opening 591A. For example, the conductive film 512B is electrically connected to the first electrode 751(*i, j*) which also serves as the first conductive film.

The pixel circuit 530(*i, j*) is electrically connected to the signal line S1(*j*) (see FIG. 10). Note that the conductive film 512A is electrically connected to the signal line S1(*j*) (see FIG. 10 and FIG. 19A).

The first electrode 751(*i, j*) has an edge portion embedded in the insulating film 501C.

Furthermore, the pixel circuit 530(*i, j*) of the display panel described in this embodiment includes the switch SW1. The switch SW1 includes a transistor that includes an oxide semiconductor.

The second display element 550(*i, j*) of the display panel described in this embodiment has a viewing angle overlapping with part of a viewing angle of the first display element 750(*i, j*). In other words, the second display element 550(*i, j*) has a function of performing display in the same direction as any of display directions of the first display element 750(*i, j*). For example, a dashed arrow in the drawing denotes the direction in which the first display element 750(*i, j*) performs display by adjusting the intensity of external light reflection. In addition, a solid arrow in the drawing denotes the direction in which the second display element 550(*i, j*) performs display (see FIG. 19A).

In addition, the second display element 550(*i, j*) of the display panel described in this embodiment has a function of displaying in a region surrounded by a region where the first display element 750(*i, j*) performs display (see FIG. 11B1 or 11B2). Note that the first display element 750(*i, j*) performs display in a region overlapping with the first electrode 751(*i, j*) and that the second display element 550(*i, j*) performs display in a region overlapping with the opening 751H.

Furthermore, the first display element 750(*i, j*) of the display panel described in this embodiment includes a reflective film which reflects incident light and has a function of adjusting the intensity of the reflected light. The reflective film has the opening 751H. Note that for example, the first conductive film, the first electrode 751(*i, j*), or the like can be used as the reflective film of the first display element 750(*i, j*).

Furthermore, the second display element 550(*i, j*) has a function of emitting light toward the opening 751H.

In addition, the display panel described in this embodiment includes the pixel 702(*i, j*), one pixel group consisting of pixels 702(*i*, 1) to 702(*i, n*), another pixel group consisting of pixels 702(1, *j*) to 702(*m, j*), and a scan line G1(*i*) (see FIG. 11A). Note that i is an integer greater than or equal to 1 and less than or equal to m, j is an integer greater than or equal to 1 and less than or equal to n, and each of m and n is an integer greater than or equal to 1.

The display panel described in this embodiment includes a scan line G2(*i*), a wiring CSCOM, and a wiring ANO.

The one pixel group consisting of the pixels 702(*i*, 1) to 702(*i, n*) includes the pixel 702(*i, j*), and are arranged in a row direction (indicated by an arrow R in the drawing).

The other pixel group consisting of the pixels 702(1, *j*) to 702(*m, j*) includes the pixel 702(*i, j*), and are arranged in a column direction (indicated by an arrow C in the drawing) intersecting with the row direction.

The scan line G1(*i*) is electrically connected to group of the pixels 702(*i*, 1) to 702(*i, n*) arranged in the row direction.

The signal line S1(*j*) is electrically connected to the other group of the pixels 702(1, *j*) to 702(*m, j*) arranged in the column direction.

For example, the pixel 702(*i, j*+1) adjacent to the pixel 702(*i, j*) in the row direction includes an opening in a position different from that of the opening 751H in the pixel 702(*i, j*) (see FIG. 11B1).

For example, the pixel 702(*i*+1, j) adjacent to the pixel 702(*i, j*) in the column direction includes an opening in a position different from that of the opening 751H in the pixel 702(*i, j*) (see FIG. 11B2). Note that for example, the first electrode 751(*i, j*) can be used as the reflective film.

The display panel described in this embodiment includes a first display element, a first conductive film electrically connected to the first display element, a second conductive film having a region overlapping with the first conductive film, an insulating film having a region sandwiched between the second conductive film and the first conductive film, a pixel circuit electrically connected to the second conductive film, and a second display element electrically connected to the pixel circuit. The insulating film has an opening. The second conductive film is electrically connected to the first conductive film in the opening.

Accordingly, the first display element and the second display element which perform display using different methods can be driven, for example, with the pixel circuit which can be formed in the same process. As a result, a novel display panel that is highly convenient can be provided.

In addition, the display panel described in this embodiment includes a terminal 519B and a conductive film 511B (see FIG. 19A).

The insulating film 501C has a region interposed between the terminal 519B and the conductive film 511B. In addition, the insulating film 501C includes an opening 591B.

The terminal 519B is electrically connected to the conductive film 511B in the opening 591B. In addition, the conductive film 511B is electrically connected to the pixel circuit 530(*i, j*). Note that for example, when the first electrode 751(*i, j*) or the first conductive film is used as the reflective film, a surface serving as a contact with the terminal 519B is oriented in the same direction as a surface of the first electrode 751(*i, j*) that faces light incident to the first display element 750(*i, j*).

Thus, power or signals can be supplied to the pixel circuit through the terminal. As a result, a novel display panel that is highly convenient can be provided.

In addition, the first display element 750(*i, j*) of the display panel described in this embodiment includes a layer 753 containing a liquid-crystal material, the first electrode 751(*i, j*), and a second electrode 752. Note that the second electrode 752 is provided so that an electric field for controlling the alignment of the liquid crystal material is generated between the second electrode 752 and the first electrode 751(*i, j*).

Furthermore, the display panel described in this embodiment includes an alignment film AF1 and an alignment film AF2. The alignment film AF2 is provided so that the layer 753 containing a liquid crystal material is interposed between the alignment films AF1 and AF2.

In addition, the second display element 550(*i, j*) of the display panel described in this embodiment includes a third electrode 551(*i, j*), a fourth electrode 552, and a layer 553(*j*) containing a light-emitting organic compound.

The fourth electrode 552 has a region overlapping with the third electrode 551(*i, j*). The layer 553(*j*) containing a light-emitting organic compound is positioned between the third electrode 551(*i, j*) and the fourth electrode 552. The third electrode 551(*i, j*) is electrically connected to the pixel circuit 530(*i, j*) in a contact portion 522.

Moreover, the pixel 702(*i, j*) of the display panel described in this embodiment includes a coloring film CF1, a light-blocking film BM, an insulating film 771, and a functional film 770P.

The coloring film CF1 has a region overlapping with the first display element 750(*i, j*). The light-blocking film BM has an opening in a region overlapping with the first display element 750(*i, j*).

The insulating film 771 is positioned between the coloring film CF1 and the layer 753 containing a liquid crystal material or between the light-blocking film BM and the layer 753 containing a liquid crystal material. Thus, unevenness due to the thickness of the coloring film CF1 can be avoided. Alternatively, impurities can be prevented from being diffused from the light-blocking film BM, the coloring film CF1, or the like to the layer 753 containing a liquid crystal material.

The functional film 770P has a region overlapping with the first display element 750(*i, j*). The functional film 770P is provided so that a substrate 770 is interposed between the functional film 770P and the first display element 750(*i, j*).

In addition, the display panel described in this embodiment includes a substrate 570, the substrate 770, and a functional layer 520.

The substrate 770 has a region overlapping with the substrate 570. The functional layer 520 is positioned between the substrates 570 and 770.

The functional layer 520 includes the pixel circuit 530($i, j$), the second display element 550($i, j$), an insulating film 521, and an insulating film 528. Furthermore, the functional layer 520 includes an insulating film 518 and an insulating film 516.

The insulating film 521 is positioned between the pixel circuit 530($i, j$) and the second display element 550($i, j$).

The insulating film 528 is positioned between the insulating film 521 and the substrate 570 and has an opening in a region overlapping with the second display element 550($i, j$). The insulating film 528 along the edge of the third electrode 551 can avoid a short circuit between the third electrode 551 and the fourth electrode 552.

The insulating film 518 has a region positioned between the insulating film 521 and the pixel circuit 530($i, j$). The insulating film 516 has a region positioned between the insulating film 518 and the pixel circuit 530($i, j$).

Moreover, the display panel described in this embodiment includes a bonding layer 505, a sealant 705, and a structure body KB1.

The bonding layer 505 is positioned between the functional layer 520 and the substrate 570 and has a function of bonding the functional layer 520 and the substrate 570.

The sealant 705 is positioned between the functional layer 520 and the substrate 770 and has a function of bonding the functional layer 520 and the substrate 770.

The structure body KB1 has a function of making a predetermined gap between the functional layer 520 and the substrate 770.

In addition, the display panel described in this embodiment includes a terminal 519C, a conductive film 511C, and a conductor CP.

The insulating film 501C has a region interposed between the terminal 519C and the conductive film 511C. In addition, the insulating film 501C has an opening 591C.

The terminal 519C is electrically connected to the conductive film 511C in the opening 591C. In addition, the conductive film 511C is electrically connected to the pixel circuit 530($i, j$).

The conductor CP is interposed between the terminal 519C and the second electrode 752 for electrically connecting the terminal 519C and the second electrode 752. For example, a conductive particle can be used as the conductor CP.

Moreover, the display panel described in this embodiment includes a driver circuit GD and a driver circuit SD (see FIGS. 9A and 11A).

The driver circuit GD is electrically connected to the scan line G1($i$). The driver circuit GD includes, for example, a transistor MD. Specifically, a transistor which includes a semiconductor film and can be formed in the same step as the transistor included in the pixel circuit 530($i, j$) can be used as the transistor MD (see FIGS. 19A and 19C).

The driver circuit SD is electrically connected to the signal line S1($j$). The driver circuit SD is electrically connected to a terminal using a conductive material, for example. The terminal can be formed in the same step as the terminal 519B or the terminal 519C.

Individual components of the display panel will be described below. Note that these components cannot be clearly distinguished and one component serves as another one or includes part of another one in some cases.

For example, the first conductive film can be used as the first electrode 751($i, j$). The first conductive film can be used as a reflective film.

In addition, the second conductive film can be used as the conductive film 512B serving as a source electrode or a drain electrode of a transistor.

<<Structure Example 1>>

The display panel of one embodiment of the present invention includes the substrate 570, the substrate 770, the structure body KB1, the sealant 705, or the bonding layer 505.

In addition, the display panel of one embodiment of the present invention includes the functional layer 520, the insulating film 521, and the insulating film 528.

In addition, the display panel of one embodiment of the present invention includes the signal line S1($j$), the signal line S2($j$), the scan line G1($i$), the scan line G2($i$), the wiring CSCOM, and the wiring ANO.

In addition, the display panel of one embodiment of the present invention includes the first conductive film or the second conductive film.

In addition, the display panel of one embodiment of the present invention includes the terminal 519B, the terminal 519C, the conductive film 511B, or the conductive film 511C.

In addition, the display panel of one embodiment of the present invention includes the pixel circuit 530($i, j$) or the switch SW1.

In addition, the display panel of one embodiment of the present invention includes the first display element 750($i, j$), the first electrode 751($i, j$), the reflective film, the opening 751H, the layer 753 containing a liquid crystal material, and the second electrode 752.

In addition, the display panel of one embodiment of the present invention includes the alignment film AF1, the alignment film AF2, the coloring film CF1, the light-blocking film BM, the insulating film 771, and the functional film 770P.

In addition, the display panel of one embodiment of the present invention includes the second display element 550($i, j$), the third electrode 551($i, j$), the fourth electrode 552, or the layer 553($j$) containing a light-emitting organic compound.

Furthermore, the display panel of one embodiment of the present invention includes the insulating film 501C.

In addition, the display panel of one embodiment of the present invention includes the driver circuit GD or the driver circuit SD.

<<Substrate 570>>

The substrate 570 and the like can be formed using a material having heat resistance high enough to withstand heat treatment in the manufacturing process. Specifically, a non-alkali glass which is polished to a thickness of approximately 0.7 mm or 0.1 mm can be used For example, a large-sized glass substrate having any of the following sizes can be used as the substrate 570 and the like: the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm). Thus, a large-sized display device can be manufactured.

For the substrate 570 and the like, an organic material, an inorganic material, a composite material of an organic material and an inorganic material, or the like can be used. For example, an inorganic material such as glass, ceramic, or a metal can be used for the substrate 570 and the like.

Specifically, non-alkali glass, soda-lime glass, potash glass, crystal glass, quartz, sapphire, or the like can be used for the substrate 570 and the like. Specifically, an inorganic oxide film, an inorganic nitride film, an inorganic oxynitride film, or the like can be used for the substrate 570 and the like. For example, a film of silicon oxide, silicon nitride, silicon oxynitride, aluminum oxide, or the like can be used for the substrate 570 and the like. Stainless steel, aluminum, or the like can be used for the substrate 570 and the like.

For example, a single crystal semiconductor substrate or a polycrystalline semiconductor substrate of silicon or silicon carbide, a compound semiconductor substrate of silicon germanium, or an SOI substrate can be used as the substrate 570 and the like. Thus, a semiconductor element can be formed over the substrate 570 and the like.

For example, an organic material such as a resin, a resin film, or plastic can be used for the substrate 570 and the like. Specifically, a resin film or resin plate of polyester, polyolefin, polyamide, polyimide, polycarbonate, an acrylic resin, or the like can be used for the substrate 570 and the like.

For example, a composite material, such as a resin film to which a metal plate, a thin glass plate, or an inorganic film is bonded can be used for the substrate 570 and the like. For example, a composite material formed by dispersing a fibrous or particulate metal, glass, inorganic material, or the like into a resin film can be used for the substrate 570 and the like. For example, a composite material formed by dispersing a fibrous or particulate resin, organic material, or the like into an inorganic material can be used for the substrate 570 and the like.

A single-layer material or a material in which a plurality of layers are stacked can be used for the substrate 570 and the like. For example, a material in which a base, an insulating film that prevents diffusion of impurities contained in the base, and the like are stacked can be used for the substrate 570 and the like. Specifically, a material in which glass and one or a plurality of films that prevent diffusion of impurities contained in the glass and that are selected from a silicon oxide layer, a silicon nitride layer, a silicon oxynitride layer, and the like are stacked can be used for the substrate 570 and the like. Alternatively, a material in which a resin and a film for preventing diffusion of impurities that penetrate the resin, such as a silicon oxide film, a silicon nitride film, and a silicon oxynitride film are stacked can be used for the substrate 570 and the like.

Specifically, a resin film, a resin plate, a stack, or the like of polyester, polyolefin, polyamide, polyimide, polycarbonate, an acrylic resin, or the like can be used for the substrate 570 and the like.

Specifically, a material including polyester, polyolefin, polyamide (e.g., nylon or aramid), polyimide, polycarbonate, polyurethane, an acrylic resin, an epoxy resin, or a resin having a siloxane bond, such as silicone, can be used for the substrate 570 and the like.

Specifically, polyethylene terephthalate (PET), polyethylene naphthalate (PEN), polyethersulfone (PES), acrylic, or the like can be used for the substrate 570 and the like.

Alternatively, paper, wood, or the like can be used for the substrate 570 and the like.

For example, a flexible substrate can be used as the substrate 570 and the like.

Note that a transistor, a capacitor, or the like can be directly formed on the substrate. Alternatively, a transistor, a capacitor, or the like can be formed over a substrate that is for use in manufacturing processes and withstands heat applied in the processes, and then can be transferred to the substrate 570 or the like. Accordingly, a transistor, a capacitor, or the like can be formed over a flexible substrate.

<<Substrate 770>>

For example, a light-transmitting material can be used for the substrate 770. Specifically, a material selected from the materials used for the substrate 570 can be used for the substrate 770. Specifically, a non-alkali glass which is polished to a thickness of approximately 0.7 mm or 0.1 mm can be used.

<<Structure Body KB1>>

For example, an organic material, an inorganic material, or a composite material of an organic material and an inorganic material can be used for the structure body KB1 or the like. Thus, components between which the structure body KB1 or the like is interposed can have a predetermined gap.

Specifically, for the structure body KB1 or the like, polyester, polyolefin, polyamide, polyimide, polycarbonate, polysiloxane, an acrylic resin, or the like, or a composite material of plural kinds of resins selected from these can be used. Alternatively, a photosensitive material may be used.

<<Sealant 705>>

For the sealant 705 or the like, an inorganic material, an organic material, a composite material of an inorganic material and an organic material, or the like can be used.

For example, an organic material such as a thermally fusible resin or a curable resin can be used for the sealant 705 or the like.

For the sealant 705 or the like, an organic material such as a reactive curable adhesive, a photo-curable adhesive, a thermosetting adhesive, and/or an anaerobic adhesive can be used.

Specifically, an adhesive containing an epoxy resin, an acrylic resin, a silicone resin, a phenol resin, a polyimide resin, an imide resin, a polyvinyl chloride (PVC) resin, a polyvinyl butyral (PVB) resin, or an ethylene vinyl acetate (EVA) resin, or the like can be used for the sealant 705 or the like.

<<Bonding Layer 505>>

For example, a material that can be used for the sealant 705 can be used for the bonding layer 505.

<<Insulating Film 521>>

For example, an insulating inorganic material, an insulating organic material, or an insulating composite material containing an inorganic material and an organic material can be used for the insulating film 521 or the like.

Specifically, an inorganic oxide film, an inorganic nitride film, an inorganic oxynitride film, or a material obtained by stacking any of these films can be used for the insulating film 521 or the like. For example, a film including any of a silicon oxide film, a silicon nitride film, a silicon oxynitride film, and an aluminum oxide film, or a film including a material obtained by stacking any of these films can be used for the insulating film 521 or the like.

Specifically, polyester, polyolefin, polyamide, polyimide, polycarbonate, polysiloxane, an acrylic resin, or a stacked or composite material including resins selected from these, or the like can be used for the insulating film 521 or the like. Alternatively, a photosensitive material may be used.

Thus, for example, steps due to components overlapping with the insulating film 521 can be eliminated.

<<Insulating Film 528>>

For example, a material that can be used for the insulating film 521 can be used for the insulating film 528 or the like. Specifically, a 1-μm-thick film containing polyimide can be used for the insulating film 528.

<<Insulating Film 501C>>

For example, the material that can be used for the insulating film 521 can be used for the insulating film 501C. Specifically, a material containing silicon and oxygen can be used for the insulating film 501C. Thus, impurity diffusion into the pixel circuit or the second display element can be suppressed.

For example, a 200-nm-thick film containing silicon, oxygen, and nitrogen can be used as the insulating film 501C.

Note that the insulating film 501C includes the opening 591A, 591B, or 591C.

<<Wiring, Terminal, Conductive Film>>

A conductive material can be used for a wiring or the like. Specifically, the conductive material can be used for the signal line S1($j$), the signal line S2($j$), the scan line G1($i$), the scan line G2($i$), the wiring CSCOM, the wiring ANO, the terminal 519B, the terminal 519C, the conductive film 511B, the conductive film 511C, or the like.

For example, an inorganic conductive material, an organic conductive material, a metal material, a conductive ceramic material, or the like can be used for the wiring or the like.

Specifically, a metal element selected from aluminum, gold, platinum, silver, copper, chromium, tantalum, titanium, molybdenum, tungsten, nickel, iron, cobalt, palladium, and manganese, or the like can be used for the wiring or the like. Alternatively, an alloy including any of the above-described metal elements, or the like can be used for the wiring or the like. In particular, an alloy of copper and manganese is suitably used in microfabrication with the use of a wet etching method.

Specifically, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, or the like can be used for the wiring or the like.

Specifically, a conductive oxide such as indium oxide, indium tin oxide, indium zinc oxide, zinc oxide, or zinc oxide to which gallium is added can be used for the wiring or the like.

Specifically, a film containing graphene or graphite can be used for the wiring or the like.

For example, a film including graphene oxide is formed and is reduced, so that a film including graphene can be formed. As a reducing method, a method using heat, a method using a reducing agent, or the like can be employed.

Specifically, a conductive high molecule can be used for the wiring or the like.

<<First Conductive Film, Second Conductive Film>>

For example, the material that can be used for the wiring or the like can be used for the first conductive film or the second conductive film.

The first electrode 751($i, j$), the wiring, or the like can be used for the first conductive film.

The conductive film 512B, the wiring, or the like of the transistor that can be used as the switch SW1 can be used as the second conductive film.

<<Pixel Circuit 530($i,j$)>>

The pixel circuit 530($i, j$) is electrically connected to the signal line S1($j$), the signal line S2($j$), the scan line G1($i$), the scan line G2($i$), the wiring CSCOM, and the wiring ANO (see FIG. 10).

The pixel circuit 530($i, j+1$) is electrically connected to a signal line S1($j+1$), a signal line S2($j+1$), a scan line G1($i$), a scan line G2($i$), the wiring CSCOM, and the wiring ANO.

Note that in the case where a voltage used as a signal supplied to the signal line S2($j$) is different from a voltage used as a signal supplied to the signal line S1($j+1$), the signal line S1($j+1$) is positioned apart from the signal line S2($j$). Specifically, the signal line S2($j+1$) is positioned adjacent to the signal line S2($j$).

The pixel circuit 530($i, j$) includes the switch SW1, a capacitor C1, a switch SW2, a transistor M, and a capacitor C2.

For example, a transistor including a gate electrode electrically connected to the scan line G1($i$) and a first electrode electrically connected to the signal line S1($j$) can be used as the switch SW1.

The capacitor C1 includes a first electrode electrically connected to a second electrode of the transistor used as the switch SW1 and a second electrode electrically connected to the wiring CSCOM.

For example, a transistor that includes a gate electrode electrically connected to the scan line G2($i$) and includes a first electrode electrically connected to the signal line S2($j$) can be used as the switch SW2.

The transistor M includes a gate electrode electrically connected to the second electrode of the transistor used as the switch SW2, and a first electrode electrically connected to the wiring ANO.

Note that a transistor that includes a semiconductor film provided between a gate electrode and a conductive film can be used as the transistor M. For example, a conductive film electrically connected to a wiring that can supply the same potential as the first electrode of the transistor M can be used.

The capacitor C2 includes a first electrode electrically connected to a second electrode of a transistor used as the switch SW2 and a second electrode electrically connected to the first electrode of the transistor M.

Note that the first electrode of the first display element 750($i, j$) is electrically connected to the second electrode of the transistor used as the switch SW1, and the second electrode of the first display element 750($i, j$) is electrically connected to the wiring VCOM1. Accordingly, the first display element 750($i, j$) can be driven.

In addition, the first electrode of the second display element 550($i, j$) is electrically connected to the second electrode of the transistor M and the second electrode of the second display element 550($i, j$) is electrically connected to and the wiring VCOM2. Accordingly, the second display element 550($i, j$) can be driven.

<<Switch SW1, Switch SW2, Transistor M, Transistor MD>>

For example, a bottom-gate transistor, a top-gate transistor, or the like can be used as the switch SW1, the switch SW2, the transistor M, the transistor MD, or the like.

For example, a transistor using a semiconductor containing an element of Group 14 for a semiconductor film can be used. Specifically, a semiconductor containing silicon can be used for the semiconductor film. For example, single crystal silicon, polysilicon, microcrystalline silicon, amorphous silicon, or the like can be used for the semiconductor film of the transistor.

For example, a transistor using an oxide semiconductor for a semiconductor film can be used. Specifically, an oxide semiconductor containing indium or an oxide semiconductor containing indium, gallium, and zinc can be used for a semiconductor film.

For example, a transistor having a lower leakage current in an off state than a transistor that uses amorphous silicon for a semiconductor film can be used as the switch SW1, the switch SW2, the transistor M, the transistor MD, or the like. Specifically, a transistor using an oxide semiconductor for a semiconductor film 508 can be used as the switch SW1, the switch SW2, the transistor M, the transistor MD, or the like.

Thus, a pixel circuit can hold an image signal for a longer time than a pixel circuit including a transistor that uses amorphous silicon for a semiconductor film. Specifically, the selection signal can be supplied with a frequency of lower than 30 Hz, preferably lower than 1 Hz, and more preferably less than once per minute while flickering is suppressed. Consequently, eyestrain on a user of the information processing device can be reduced, and power consumption for driving can be reduced.

The transistor that can be used as the switch SW1 includes the semiconductor film 508 and the conductive film 504 having a region overlapping with the semiconductor film 508 (see FIG. 19B). Furthermore, the transistor that can be used as the switch SW1 includes the conductive film 512A and the conductive film 512B.

Note that the conductive film 504 and the insulating film 506 serve as a gate electrode and a gate insulating film, respectively. Furthermore, the conductive film 512A has one of a function as a source electrode and a function as a drain electrode, and the conductive film 512B has the other.

In addition, a transistor that includes the semiconductor film 508 provided between the conductive film 504 and the conductive film 524 can be used as the transistor M (see FIG. 19C).

A conductive film in which a 10-nm-thick film containing tantalum and nitrogen and a 300-nm-thick film containing copper are stacked in this order can be used as the conductive film 504.

A material in which a 400-nm-thick film containing silicon and nitrogen and a 200-nm-thick film containing silicon, oxygen, and nitrogen are stacked can be used for the insulating film 506.

A 25-nm-thick film containing indium, gallium, and zinc can be used as the semiconductor film 508.

A conductive film in which a 50-nm-thick film containing tungsten, a 400-nm-thick film containing aluminum, and a 100-nm-thick film containing titanium are stacked in this order can be used as the conductive film 512A or 512B.

<<First Display Element 750(i, j)>>

For example, a display element having a function of controlling transmission or reflection of light can be used as the first display element 750(i, j) or the like. For example, a combined structure of a liquid crystal element and a polarizing plate or a MEMS shutter display element can be used. Specifically, the use of a reflective display element can reduce the power consumption of a display panel. For example, a reflective liquid crystal display element can be used as the first display element 750.

Specifically, a liquid crystal element driven in any of the following driving modes can be used: an in-plane-switching (IPS) mode, a twisted nematic (TN) mode, a fringe field switching (FFS) mode, an axially symmetric aligned microcell (ASM) mode, an optically compensated birefringence (OCB) mode, a ferroelectric liquid crystal (FLC) mode, an antiferroelectric liquid crystal (AFLC) mode, and the like.

In addition, a liquid crystal element that can be driven by, for example, a vertical alignment (VA) mode such as a multi-domain vertical alignment (MVA) mode, a patterned vertical alignment (PVA) mode, an electrically controlled birefringence (ECB) mode, a continuous pinwheel alignment (CPA) mode, or an advanced super view (ASV) mode can be used.

For example, thermotropic liquid crystal, low-molecular liquid crystal, high-molecular liquid crystal, polymer dispersed liquid crystal, ferroelectric liquid crystal, anti-ferroelectric liquid crystal, or the like can be used. A liquid crystal material that exhibits a cholesteric phase, a smectic phase, a cubic phase, a chiral nematic phase, an isotropic phase, or the like can be used. Alternatively, a liquid crystal material that exhibits a blue phase can be used.

<<First Electrode 751(i, j)>>

For example, the material of the wiring or the like can be used for the first electrode 751(i, j). Specifically, a reflective film can be used for the first electrode 751(i, j).

<<Reflective Film>>

For example, a material reflecting visible light can be used for the reflective film. Specifically, a material containing silver can be used for the reflective film. For example, a material containing silver, palladium, and the like or a material containing silver, copper, and the like can be used for the reflective film.

The reflective film reflects, for example, light passing through the layer 753 containing a liquid crystal material. This allows the first display element 750 to serve as a reflective liquid crystal element. Alternatively, a material with an uneven surface can be used for the reflective film. In that case, incident light can be reflected in various directions so that a white image can be displayed.

Note that one embodiment of the present invention is not limited to the structure in which the first electrode 751(i, j) is used as the reflective film. For example, a structure in which the reflective film is positioned between the layer 753 containing a liquid crystal material and the first electrode 751(i, j) can be used. Alternatively, a structure in which the first electrode 751(i, j) having light-transmitting properties is positioned between the reflective film and the layer 753 containing a liquid crystal material can be used.

<<Opening 751H>>

If the ratio of the total area of the opening 751H to the total area except for the opening is too high, display performed using the first display element 750(i, j) is dark. If the ratio of the total area of the opening 751H to the total area except for the opening is too low, display performed using the second display element 550(i, j) is dark.

Also, if the area of the opening 751H in the reflective film is too small, light emitted from the second display element 550 is not efficiently extracted.

The opening 751H may have a polygonal shape, a quadrangular shape, an elliptical shape, a circular shape, a cross-like shape, or the like. The opening 751H may also have a stripe shape, a slit-like shape, or a checkered pattern. The opening 751H may be positioned close to an adjacent pixel. Preferably, the opening 751H is positioned close to another pixel having a function of emitting light of the same color. In that case, a phenomenon in which light emitted from the second display element 550 enters a coloring film of the adjacent pixel (also called cross talk), can be suppressed.

<<Second Electrode 752>>

For example, a material having a visible-light transmitting property and conductivity can be used for the second electrode 752.

For example, a conductive oxide, a metal film thin enough to transmit light, or a metal nanowire can be used as the second electrode 752.

Specifically, a conductive oxide containing indium can be used for the second electrode 752. Alternatively, a metal thin film with a thickness more than or equal to 1 nm and less than or equal to 10 nm can be used for the second electrode 752. Further alternatively, a metal nanowire containing silver can be used for the second electrode 752.

Specifically, indium oxide, indium tin oxide, indium zinc oxide, zinc oxide, zinc oxide to which gallium is added, zinc oxide to which aluminum is added, or the like can be used for the second electrode 752.

<<Alignment Films AF1 and AF2>>

For example, the alignment films AF1 and AF2 can be formed with a material containing polyimide or the like. Specifically, it is possible to use a material formed to be aligned in a predetermined direction by a rubbing process or an optical alignment process.

For example, a film containing soluble polyimide can be used as the alignment film AF1 or AF2.

<<Coloring Film CF1>>

A material transmitting light of a predetermined color can be used for the coloring film CF1. Thus, the coloring film CF1 can be used as, for example, a color filter.

For example, a material transmitting light of blue, green, red, yellow, or white can be used for the coloring film CF1.

<<Light-Blocking Film BM>>

A material that prevents light transmission can be used for the light-blocking film BM. Thus, the light-blocking film BM can be used as, for example, a black matrix.

<<Insulating Film 771>>

For example, polyimide, epoxy resin, acrylic resin, or the like can be used for the insulating film 771.

<<Functional Film 770P>>

For example, a polarizing plate, a retardation plate, a diffusing film, an anti-reflective film, a condensing film, or the like can be used as the functional film 770P. Alternatively, a polarizing plate containing a dichromatic pigment can be used as the functional film 770P.

Alternatively, an antistatic film preventing the attachment of dust, a water repellent film suppressing the attachment of stain, a hard coat film suppressing generation of a scratch in use, or the like can be used as the functional film 770P.

<<Second Display Element 550($i$, $j$)>>

For example, a light-emitting element can be used as the second display element 550($i$, $j$). Specifically, an organic electroluminescence element, an inorganic electroluminescence element, a light-emitting diode, or the like can be used for the second display element 550($i$, $j$).

For example, a stack body for emitting blue light, green light, or red light can be used as the layer 553($j$) containing a light-emitting organic compound.

For example, a stack body extending linearly in the column direction along the signal line Sl($j$) can be used as the layer 553($j$) containing a light-emitting organic compound. In addition, a stack body that extends linearly in the column direction along the signal line S1($j$+1) and emits light of a color different from that of the layer 553($j$) containing a light-emitting organic compound can be used as the layer 553($j$+1) containing a light-emitting organic compound.

Alternatively, for example, a stack body for emitting white light can be used as the layer 553($j$) containing a light-emitting organic compound and the layer 553($j$+1) containing a light-emitting organic compound. Specifically, a stack of a layer containing a light-emitting organic compound containing a fluorescent material that emits blue light, and a layer containing a material that is other than the fluorescent material and that emits green light and red light, or a layer containing a material that is other than the fluorescent material and that emits yellow light can be used as the layer 553($j$) containing a light-emitting organic compound and the layer 553($j$+1) containing a light-emitting organic compound.

For example, a material that can be used for the wiring or the like can be used for the third electrode 551($i$, $j$) or the fourth electrode 552.

For example, a material that transmits visible light and is selected from the materials used for the wiring or the like can be used for the third electrode 551($i$, $j$).

Specifically, conductive oxide, indium-containing conductive oxide, indium oxide, indium tin oxide, indium zinc oxide, zinc oxide, zinc oxide to which gallium is added, or the like can be used for the third electrode 551($i$, $j$). Alternatively, a metal film that is thin enough to transmit light can be used as the third electrode 551($i$, $j$).

For example, a material that reflects visible light and is selected from the materials used for the wiring or the like can be used for the fourth electrode 552.

<<Driver Circuit GD>>

Any of a variety of sequential circuits, such as a shift register, can be used as the driver circuit GD. For example, the transistor MD, a capacitor, and the like can be used in the driver circuit GD. Specifically, a transistor including a semiconductor film that can be formed at the same step as the transistor M can be used.

The transistor MD can have a structure different from that of the transistor used as the switch SW1. Specifically, a transistor including the conductive film 524 can be used as the transistor MD (see FIG. 19C).

The semiconductor film 508 is positioned between the conductive film 504 and the conductive film 524, the insulating film 516 is positioned between the conductive film 524 and the semiconductor film 508, and the insulating film 506 is positioned between the semiconductor film 508 and the conductive film 504. For example, the conductive film 524 is electrically connected to a wiring supplying the same potential as that supplied to the conductive film 504.

Note that the transistor MD can have the same structure as the transistor M.

<<Driver Circuit SD>>

For example, an integrated circuit can be used in the driver circuit SD. Specifically, an integrated circuit formed on a silicon substrate can be used as the driver circuit SD.

For example, a chip on glass (COG) method can be used to mount the driver circuit SD on a pad electrically connected to the pixel circuit 530($i$, $j$). Specifically, an anisotropic conductive film can be used to mount the integrated circuit on the pad.

Note that the pad can be formed in the same step as the terminal 519B or 519C.

<Structure Example 2 of Display Panel>

FIGS. 20A and 20B illustrate the structure of a display panel 700B of one embodiment of the present invention. FIG. 20A is a cross-sectional view taken along lines X1-X2, X3-X4, X5-X6, X7-X8, X9-X10, and X11-X12 in FIG. 9A. FIG. 20B is a cross-sectional view illustrating part of the display panel.

Note that the display panel 700B is different from the display panel 700 in FIGS. 7A to 7C in including a top-gate transistor instead of the bottom-gate transistor. Described below are different structures, and the above description is referred to for similar structures.

<<Switch SW1B, Transistor MB, Transistor MDB>>

A transistor that can be used as a switch SW1B, and transistors MB and MDB include the conductive film 504 having a region overlapping with the insulating film 501C and the semiconductor film 508 having a region positioned between the insulating film 501C and the conductive film 504. Note that the conductive film 504 serves as a gate electrode (see FIG. 20B).

The semiconductor film 508 includes a first region 508A, a second region 508B, and a third region 508C. The first region 508A and the second region 508B do not overlap with the conductive film 504. The third region 508C lies between the first region 508A and the second region 508B and overlaps with the conductive film 504.

The transistor MDB includes the insulating film 506 between the third region 508C and the conductive film 504. Note that the insulating film 506 serves as a gate insulating film.

The first region 508A and the second region 508B have a lower resistivity than the third region 508C, and serve as a source region or a drain region.

Note that the first region 508A and the second region 508B can be formed in the semiconductor film 508 by, for example, a method for controlling the resistivity of the oxide semiconductor, which is described in detail in the end of this embodiment. Specifically, plasma treatment using a gas containing a rare gas can be employed.

Furthermore, for example, the conductive film 504 can be used as a mask, in which case the shape of part of the third region 508C can be the same as the shape of an end portion of the conductive film 504 in a self-aligned manner.

The transistor MDB includes the conductive films 512A and 512B which are in contact with the first region 508A and the second region 508B, respectively. The conductive films 512A and 512B serve as a source electrode or a drain electrode.

The transistor that can be formed in the same process as the transistor MDB can be used as the transistor MB.

<Method for Controlling Resistivity of Oxide Semiconductor>

The method for controlling the resistivity of an oxide semiconductor film will be described.

An oxide semiconductor film with a certain resistivity can be used for the semiconductor film 508 or the conductive film 524.

For example, the resistivity of an oxide semiconductor film can be controlled by a method for controlling the concentration of impurities such as hydrogen and water contained in the oxide semiconductor film and/or the oxygen vacancies in the film.

Specifically, plasma treatment can be used as a method for increasing or decreasing the concentration of impurities such as hydrogen and water and/or the oxygen vacancies in the film.

Specifically, plasma treatment using a gas containing one or more kinds selected from a rare gas (He, Ne, Ar, Kr, Xe), hydrogen, boron, phosphorus, and nitrogen can be employed. For example, plasma treatment in an Ar atmosphere, plasma treatment in a mixed gas atmosphere of Ar and hydrogen, plasma treatment in an ammonia atmosphere, plasma treatment in a mixed gas atmosphere of Ar and ammonia, or plasma treatment in a nitrogen atmosphere can be employed. Thus, the oxide semiconductor film can have a high carrier density and a low resistivity.

Alternatively, hydrogen, boron, phosphorus, or nitrogen is added to the oxide semiconductor film by an ion implantation method, an ion doping method, a plasma immersion ion implantation method, or the like, so that the oxide semiconductor film can have a low resistivity.

Alternatively, an insulating film containing hydrogen is formed in contact with the oxide semiconductor film, and the hydrogen is diffused from the insulating film to the oxide semiconductor film, so that the oxide semiconductor film can have a high carrier density and a low resistivity.

For example, an insulating film with a hydrogen concentration of greater than or equal to $1 \times 10^{22}$ atoms/cm$^3$ is formed in contact with the oxide semiconductor film, in which case hydrogen can be effectively supplied to the oxide semiconductor film. Specifically, a silicon nitride film can be used as the insulating film formed in contact with the oxide semiconductor film.

Hydrogen contained in the oxide semiconductor film reacts with oxygen bonded to a metal atom to be water, and an oxygen vacancy is formed in a lattice from which oxygen is released (or a portion from which oxygen is released). Due to entry of hydrogen into the oxygen vacancy, an electron serving as a carrier is generated in some cases. Furthermore, bonding of part of hydrogen to oxygen bonded to a metal atom causes generation of an electron serving as a carrier in some cases. Thus, the oxide semiconductor film can have a high carrier density and a low resistivity.

Specifically, an oxide semiconductor with a hydrogen concentration measured by secondary ion mass spectrometry (SIMS) of greater than or equal to $8 \times 10^{19}$ atoms/cm$^3$, preferably greater than or equal to $1 \times 10^{20}$ atoms/cm$^3$, more preferably greater than or equal to $5 \times 10^{20}$ atoms/cm$^3$ can be suitably used for the conductive film 524.

On the other hand, an oxide semiconductor with a high resistivity can be used for a semiconductor film where a channel of a transistor is formed, specifically, for the semiconductor film 508.

For example, an insulating film containing oxygen, i.e., an insulating film capable of releasing oxygen, is formed in contact with an oxide semiconductor film, and the oxygen is supplied from the insulating film to the oxide semiconductor film, so that oxygen vacancies in the film or at the interface can be filled. Thus, the oxide semiconductor film can have a high resistivity.

For example, a silicon oxide film or a silicon oxynitride film can be used as the insulating film capable of releasing oxygen.

The oxide semiconductor film in which oxygen vacancies are filled and the hydrogen concentration is reduced can be referred to as a highly purified intrinsic or substantially highly purified intrinsic oxide semiconductor film. The term "substantially intrinsic" refers to the state in which an oxide semiconductor film has a carrier density lower than $8 \times 10^{11}$/cm$^3$, preferably lower than $1 \times 10^{11}$/cm$^3$, further preferably lower than $1 \times 10^{10}$/cm$^3$. A highly purified intrinsic or substantially highly purified intrinsic oxide semiconductor film has few carrier generation sources and thus can have a low carrier density. The highly purified intrinsic or substantially highly purified intrinsic oxide semiconductor film has a low density of defect states and accordingly can have a low density of trap states.

Furthermore, a transistor including the highly purified intrinsic or substantially highly purified intrinsic oxide semiconductor film has an extremely low off-state current; even when an element has a channel width of $1 \times 10^6$ μm and a channel length L of 10 μm, the off-state current can be lower than or equal to the measurement limit of a semiconductor parameter analyzer, that is, lower than or equal to $1 \times 10^{-13}$ A, at a voltage (drain voltage) between a source electrode and a drain electrode of from 1 V to 10 V.

The transistor including a channel region formed in the oxide semiconductor film that is a highly purified intrinsic or substantially highly purified intrinsic oxide semiconductor film can have a small change in electrical characteristics and high reliability.

Specifically, an oxide semiconductor has a hydrogen concentration which is measured by secondary ion mass spectrometry (SIMS) of lower than or equal to $2\times10^{20}$ atoms/cm$^3$, preferably lower than or equal to $5\times10^{19}$ atoms/cm$^3$, more preferably lower than or equal to $1\times10^{19}$ atoms/cm$^3$, more preferably lower than $5\times10^{18}$ atoms/cm$^3$, more preferably lower than or equal to $1\times10^{18}$ atoms/cm$^3$, more preferably lower than or equal to $5\times10^{17}$ atoms/cm$^3$, more preferably lower than or equal to $1\times10^{16}$ atoms/cm$^3$ can be favorably used for a semiconductor where a channel of a transistor is formed.

Note that an oxide semiconductor film that has a higher hydrogen concentration and/or a larger number of oxygen vacancies and that has a lower resistivity than the semiconductor film 508 is used as the conductive film 524.

Furthermore, a film whose hydrogen concentration is twice or more, preferably ten times or more that in the semiconductor film 508 can be used as in the conductive film 524.

Moreover, a film whose resistivity is higher than or equal to $1\times10^{-8}$ times and lower than $1\times10^{-1}$ times the resistivity of the semiconductor film 508 can be used as the conductive film 524.

Specifically, a film with a resistivity higher than or equal to $1\times10^{-3}$ Ωcm and lower than $1\times10^{4}$ Ωcm, preferably higher than or equal to $1\times10^{-3}$ Ωcm and lower than $1\times10^{-1}$ Ωcm can be used as the conductive film 524.

Note that this embodiment can be combined with any of the other embodiments in this specification as appropriate.

Embodiment 5

In this embodiment, the structure of a transistor that can be used for the display panel of one embodiment of the present invention is described with reference to FIGS. 12A to 12D.

<Structure Example of Semiconductor Device>

Figure 12A:
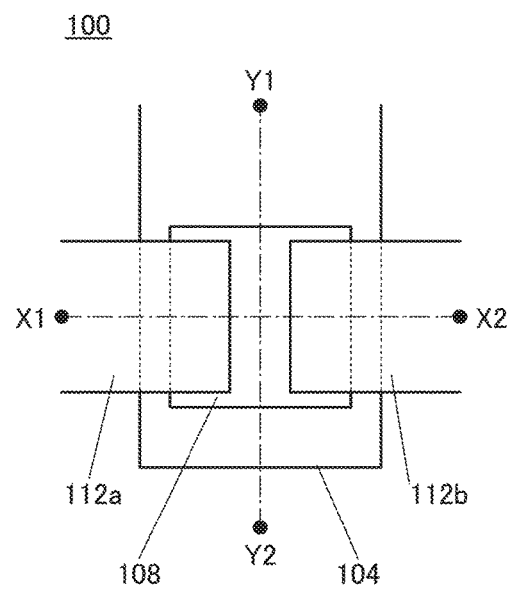
FIGS. 12A to 12D illustrate a structure of a transistor according to an embodiment.

FIG. 12A is a top view of a transistor 100. FIG. 12C is a cross-sectional view taken along the cutting plane line X1-X2 in FIG. 12A. FIG. 12D is a cross-sectional view taken along the cutting plane line Y1-Y2 in FIG. 12A. Note that in FIG. 12A, some components of the transistor 100 (e.g., an insulating film serving as a gate insulating film) are not illustrated to avoid complexity. In some cases, the direction of the cutting plane line X1-X2 is referred to as a channel length direction and the direction of the cutting plane line Y1-Y2 is referred to as a channel width direction. As in FIG. 12A, some components might not be illustrated in some top views of transistors described below.

Note that the transistor 100 can be used in the display panel 700 or the like described in Embodiment 4.

For example, when the transistor 100 is used as the switch SW1, a substrate 102, a conductive film 104, a stacked film of an insulating film 106 and an insulating film 107, an oxide semiconductor film 108, a conductive film 112a, a conductive film 112b, a stacked film of an insulating film 114 and an insulating film 116, and an insulating film 118 can be referred to as the insulating film 501C, the conductive film 504, the insulating film 506, the semiconductor film 508, the conductive film 512A, the conductive film 512B, the insulating film 516, and the insulating film 518, respectively.

The transistor 100 includes the conductive film 104 functioning as a gate electrode over the substrate 102, the insulating film 106 over the substrate 102 and the conductive film 104, the insulating film 107 over the insulating film 106, the oxide semiconductor film 108 over the insulating film 107, and the conductive films 112a and 112b functioning as source and drain electrodes electrically connected to the oxide semiconductor film 108. Over the transistor 100, specifically, over the conductive films 112a and 112b and the oxide semiconductor film 108, the insulating films 114, 116, and 118 are provided. The insulating films 114, 116, and 118 function as protective insulating films for the transistor 100.

The oxide semiconductor film 108 includes a first oxide semiconductor film 108a on the conductive film 104 side and a second oxide semiconductor film 108b over the first oxide semiconductor film 108a. The conductive film 104 serves as a gate electrode. Furthermore, the insulating films 106 and 107 function as gate insulating films of the transistor 100.

An In-M oxide (M is Ti, Ga, Sn, Y, Zr, La, Ce, Nd, or Hf) or an In-M-Zn oxide can be used for the oxide semiconductor film 108. It is particularly preferable to use an In-M-Zn oxide for the oxide semiconductor film 108.

The first oxide semiconductor film 108a includes a first region in which the atomic proportion of In is larger than the atomic proportion of M The second oxide semiconductor film 108b includes a second region in which the atomic proportion of In is smaller than that in the first oxide semiconductor film 108a. The second region includes a portion thinner than the first region.

The first oxide semiconductor film 108a including the first region in which the atomic proportion of In is larger than that of M can increase the field-effect mobility (also simply referred to as mobility or μFE) of the transistor 100. Specifically, the field-effect mobility of the transistor 100 can exceed 10 cm$^2$/Vs.

For example, the use of the transistor with high field-effect mobility for a gate driver that generates a gate signal (specifically, a demultiplexer connected to an output terminal of a shift register included in a gate driver) allows a semiconductor device or a display device to have a narrow frame.

On the other hand, the first oxide semiconductor film 108a including the first region in which the atomic proportion of In is larger than that of M makes it easier to change electrical characteristics of the transistor 100 in light irradiation. However, in the semiconductor device of one embodiment of the present invention, the second oxide semiconductor film 108b is formed over the first oxide semiconductor film 108a. In addition, the thickness of the channel region in the second oxide semiconductor film 108b is smaller than the thickness of the first oxide semiconductor film 108a.

Furthermore, the second oxide semiconductor film 108b includes the second region in which the atomic proportion of In is smaller than that in the first oxide semiconductor film 108a and thus has larger Eg than the first oxide semiconductor film 108a. For this reason, the oxide semiconductor film 108 that is a layered structure of the first oxide semiconductor film 108a and the second oxide semiconductor film 108b has high resistance to a negative bias stress test with light irradiation.

The amount of light absorbed by the oxide semiconductor film 108 can be reduced during light irradiation. As a result, the change in electrical characteristics of the transistor 100 due to light irradiation can be reduced. In the semiconductor device of one embodiment of the present invention, the insulating film 114 or the insulating film 116 includes excess oxygen. This structure can further reduce the change in electrical characteristics of the transistor 100 due to light irradiation.

Here, the oxide semiconductor film 108 is described in detail with reference to FIG. 12B.

Figure 12B:
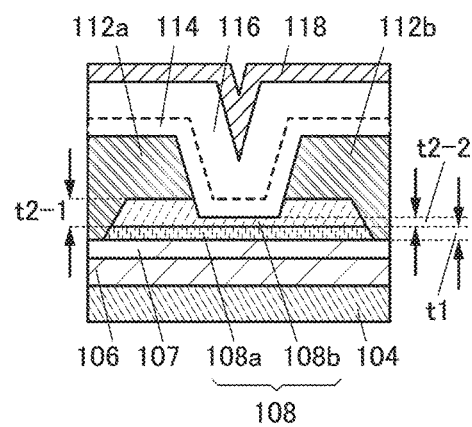
Figure 12C:
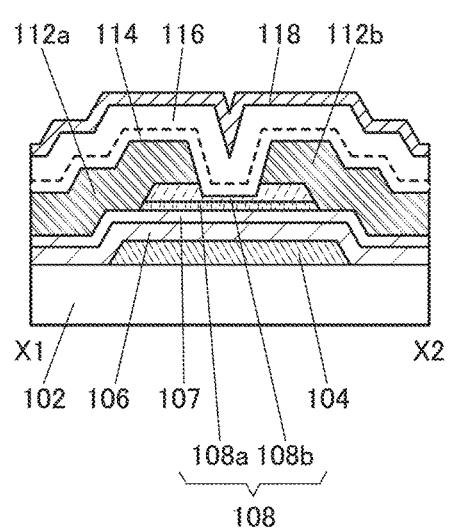
Figure 12D:
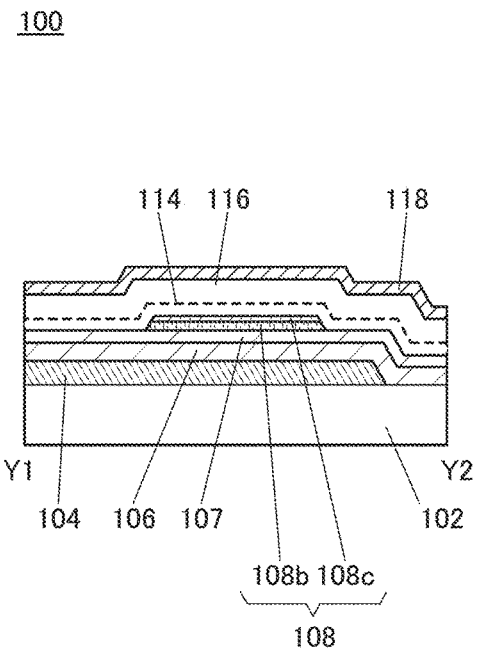

FIG. 12B is a cross-sectional enlarged view of the oxide semiconductor film 108 and the vicinity thereof in the transistor 100 illustrated in FIG. 12C.

In FIG. 12B, t1, t2-1, and t2-2 denote a thickness of the first oxide semiconductor film 108a, one thickness of the second oxide semiconductor film 108b, and the other thickness of the second oxide semiconductor film 108b, respectively. The second oxide semiconductor film 108b over the first oxide semiconductor film 108a prevents the first oxide semiconductor film 108a from being exposed to an etching gas, an etchant, or the like when the conductive films 112a and 112b are formed. This is why the first oxide semiconductor film 108a is not or is hardly reduced in thickness. In contrast, in the second oxide semiconductor film 108b, a portion not overlapping with the conductive films 112a and 112b is etched by formation of the conductive films 112a and 112b, so that a depression is formed in the etched region. In other words, a thickness of the second oxide semiconductor film 108b in a region overlapping with the conductive films 112a and 112b is t2-1, and a thickness of the second oxide semiconductor film 108b in a region not overlapping with the conductive films 112a and 112b is t2-2.

As for the relationships between the thicknesses of the oxide semiconductor film 108a and the second oxide semiconductor film 108b, t2-1>t1>t2-2 is preferable. A transistor with the thickness relationships can have high field-effect mobility and less variation in threshold voltage in light irradiation.

When oxygen vacancies are formed in the oxide semiconductor film 108 included in the transistor 100, electrons serving as carriers are generated; as a result, the transistor 100 tends to be normally-on. Therefore, for stable transistor characteristics, it is important to reduce oxygen vacancies in the oxide semiconductor film 108, particularly oxygen vacancies in the first oxide semiconductor film 108a. In the structure of the transistor of one embodiment of the present invention, excess oxygen is introduced into an insulating film over the oxide semiconductor film 108, here, the insulating film 114 and/or the insulating film 116 over the oxide semiconductor film 108, whereby oxygen is moved from the insulating film 114 and/or the insulating film 116 to the oxide semiconductor film 108 to fill oxygen vacancies in the oxide semiconductor film 108, particularly in the first oxide semiconductor film 108a.

Note that it is preferable that the insulating films 114 and 116 each include a region (oxygen excess region) including oxygen in excess of that in the stoichiometric composition. In other words, the insulating films 114 and 116 are insulating films capable of releasing oxygen. Note that the oxygen excess region is formed in the insulating films 114 and 116 in such a manner that oxygen is introduced into the insulating films 114 and 116 after the deposition, for example. As a method for introducing oxygen, an ion implantation method, an ion doping method, a plasma immersion ion implantation method, plasma treatment, or the like may be employed.

In order to fill oxygen vacancies in the first oxide semiconductor film 108a, the thickness of the portion including the channel region and the vicinity of the channel region in the second oxide semiconductor film 108b is preferably small, and t2-2<t1 is preferably satisfied. For example, the thickness of the portion including the channel region and the vicinity of the channel region in the second oxide semiconductor film 108b is preferably more than or equal to 1 nm and less than or equal to 20 nm, further preferably more than or equal to 3 nm and less than or equal to 10 nm.

Other constituent elements of the semiconductor device of this embodiment are described below in detail.
<Substrate>

There is no particular limitation on the property of a material and the like of the substrate 102 as long as the material has heat resistance enough to withstand at least heat treatment to be performed later. For example, a glass substrate, a ceramic substrate, a quartz substrate, or a sapphire substrate may be used as the substrate 102.

Alternatively, a single crystal semiconductor substrate or a polycrystalline semiconductor substrate of silicon or silicon carbide, a compound semiconductor substrate of silicon germanium, an SOI substrate, or the like can be used.

Alternatively, any of these substrates provided with a semiconductor element, an insulating film, or the like may be used as the substrate 102.

Note that in the case where a glass substrate is used as the substrate 102, a large substrate having any of the following sizes can be used: the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm). Thus, a large display device can be manufactured.

Alternatively, a flexible substrate may be used as the substrate 102, and the transistor 100 may be provided directly on the flexible substrate. Alternatively, a separation layer may be provided between the substrate 102 and the transistor 100. The separation layer can be used when part or the whole of a semiconductor device formed over the separation layer is separated from the substrate 102 and transferred onto another substrate. In such a case, the transistor 100 can be transferred to a substrate having low heat resistance or a flexible substrate as well.
<Conductive Film Functioning as Gate Electrode, Source Electrode, and Drain Electrode>

The conductive film 104 functioning as a gate electrode and the conductive films 112a and 112b functioning as a source electrode and a drain electrode, respectively, can each be formed using a metal element selected from chromium (Cr), copper (Cu), aluminum (Al), gold (Au), silver (Ag), zinc (Zn), molybdenum (Mo), tantalum (Ta), titanium (Ti), tungsten (W), manganese (Mn), nickel (Ni), iron (Fe), and cobalt (Co); an alloy including any of these metal elements as its component; an alloy including a combination of any of these metal elements; or the like.

Furthermore, the conductive films 104, 112a, and 112b may have a single-layer structure or a stacked-layer structure of two or more layers. For example, a single-layer structure of an aluminum film including silicon, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, and a three-layer structure in which a titanium film, an aluminum film, and a titanium film are stacked in this order can be given. Alternatively, an alloy film or a nitride film in which aluminum and one or more elements selected from titanium, tantalum, tungsten, molybdenum, chromium, neodymium, and scandium are combined may be used.

The conductive films 104, 112a, and 112b can be formed using a light-transmitting conductive material such as indium tin oxide, indium oxide including tungsten oxide, indium zinc oxide including tungsten oxide, indium oxide including titanium oxide, indium tin oxide including titanium oxide, indium zinc oxide, or indium tin oxide to which silicon oxide is added.

A Cu—X alloy film (X is Mn, Ni, Cr, Fe, Co, Mo, Ta, or Ti) may be used for the conductive films 104, 112a, and 112b. Use of a Cu—X alloy film enables the manufacturing cost to be reduced because wet etching process can be used in the processing.

<Insulating Film Functioning as Gate Insulating Film>

As each of the insulating films 106 and 107 functioning as gate insulating films of the transistor 100, an insulating film including at least one of the following films formed by a plasma enhanced chemical vapor deposition (PECVD) method, a sputtering method, or the like can be used: a silicon oxide film, a silicon oxynitride film, a silicon nitride oxide film, a silicon nitride film, an aluminum oxide film, a hafnium oxide film, an yttrium oxide film, a zirconium oxide film, a gallium oxide film, a tantalum oxide film, a magnesium oxide film, a lanthanum oxide film, a cerium oxide film, and a neodymium oxide film. Note that instead of a stacked-layer structure of the insulating films 106 and 107, an insulating film of a single layer formed using a material selected from the above or an insulating film of three or more layers may be used.

The insulating film 106 has a function as a blocking film that inhibits penetration of oxygen. For example, in the case where excess oxygen is supplied to the insulating film 107, the insulating film 114, the insulating film 116, and/or the oxide semiconductor film 108, the insulating film 106 can inhibit penetration of oxygen.

Note that the insulating film 107 that is in contact with the oxide semiconductor film 108 functioning as a channel region of the transistor 100 is preferably an oxide insulating film and preferably includes a region including oxygen in excess of the stoichiometric composition (oxygen-excess region). In other words, the insulating film 107 is an insulating film capable of releasing oxygen. In order to provide the oxygen excess region in the insulating film 107, the insulating film 107 is formed in an oxygen atmosphere, for example. Alternatively, the oxygen excess region may be formed by introduction of oxygen into the insulating film 107 after the deposition. As a method for introducing oxygen, an ion implantation method, an ion doping method, a plasma immersion ion implantation method, plasma treatment, or the like may be employed.

In the case where hafnium oxide is used for the insulating film 107, the following effect is attained. Hafnium oxide has a higher dielectric constant than silicon oxide and silicon oxynitride. Therefore, by using hafnium oxide, the thickness of the insulating film 107 can be made large as compared with the case where silicon oxide is used; thus, leakage current due to tunnel current can be low. That is, it is possible to provide a transistor with a low off-state current. Moreover, hafnium oxide with a crystalline structure has higher dielectric constant than hafnium oxide with an amorphous structure. Therefore, it is preferable to use hafnium oxide with a crystalline structure in order to provide a transistor with a low off-state current. Examples of the crystalline structure include a monoclinic crystal structure and a cubic crystal structure. Note that one embodiment of the present invention is not limited thereto.

In this embodiment, a silicon nitride film is formed as the insulating film 106, and a silicon oxide film is formed as the insulating film 107. The silicon nitride film has a higher dielectric constant than a silicon oxide film and needs a larger thickness for electrostatic capacitance equivalent to that of the silicon oxide film. Thus, when the silicon nitride film is included in the gate insulating film of the transistor 100, the physical thickness of the insulating film can be increased. This makes it possible to reduce a decrease in withstand voltage of the transistor 100 and furthermore to increase the withstand voltage, thereby reducing electrostatic discharge damage to the transistor 100.

<Oxide Semiconductor Film>

The oxide semiconductor film 108 can be formed using the materials described above.

In the case where the oxide semiconductor film 108 includes In-M-Zn oxide, it is preferable that the atomic ratio of metal elements of a sputtering target used for forming the In-M-Zn oxide satisfy In≥M and Zn≥M. As the atomic ratio of metal elements of such a sputtering target, In:M:Zn=1:1:1, In:M:Zn=1:1:1.2, In:M:Zn=2:1:3, In:M:Zn=3:1:2, and In:M:Zn=4:2:4.1 are preferable.

In the case where the oxide semiconductor film 108 includes In-M-Zn oxide, it is preferable to use a target including polycrystalline In-M-Zn oxide as the sputtering target. The use of the target including polycrystalline In-M-Zn oxide facilitates formation of the oxide semiconductor film 108 having crystallinity. Note that the atomic ratios of metal elements in the formed oxide semiconductor film 108 vary from the above atomic ratio of metal elements of the sputtering target within a range of ±40% as an error. For example, when a sputtering target with an atomic ratio of In to Ga and Zn of 4:2:4.1 is used, the atomic ratio of In to Ga and Zn in the formed oxide semiconductor film 108 may be 4:2:3 or in the vicinity of 4:2:3.

The first oxide semiconductor film 108a can be formed using the sputtering target having an atomic ratio of In:M:Zn=2:1:3, In:M:Zn=3:1:2, or In:M:Zn=4:2:4.1. The second oxide semiconductor film 108b can be formed using the sputtering target having an atomic ratio of In:M:Zn=1:1:1 or In:M:Zn=1:1:1.2. Note that the atomic ratio of metal elements in a sputtering target used for forming the second oxide semiconductor film 108b does not necessarily satisfy In ≥M and Zn≥M, and may satisfy In ≥M and Zn<M, such as In:M:Zn=1:3:2.

The energy gap of the oxide semiconductor film 108 is 2 eV or more, preferably 2.5 eV or more, further preferably 3 eV or more. The use of an oxide semiconductor having a wide energy gap can reduce off-state current of the transistor 100. In particular, an oxide semiconductor film having an energy gap more than or equal to 2 eV, preferably more than or equal to 2 eV and less than or equal to 3.0 eV is preferably used as the first oxide semiconductor film 108a, and an oxide semiconductor film having an energy gap more than or equal to 2.5 eV and less than or equal to 3.5 eV is preferably used as the second oxide semiconductor film 108b. Furthermore, the second oxide semiconductor film 108b preferably has a higher energy gap than that of the first oxide semiconductor film 108a.

Each thickness of the first oxide semiconductor film 108a and the second oxide semiconductor film 108b is more than or equal to 3 nm and less than or equal to 200 nm, preferably more than or equal to 3 nm and less than or equal to 100 nm, further preferably more than or equal to 3 nm and less than or equal to 50 nm. Note that the above-described thickness relationships between them are preferably satisfied.

An oxide semiconductor film with low carrier density is used as the second oxide semiconductor film 108b. For example, the carrier density of the second oxide semiconductor film 108b is lower than or equal to $1\times10^{17}$ cm$^{-3}$, preferably lower than or equal to $1\times10^{15}$ cm$^{-3}$, further preferably lower than or equal to $1\times10^{13}$ cm$^{-3}$, still further preferably lower than or equal to $1\times10^{11}$ cm$^{-3}$.

Note that, without limitation to the compositions and materials described above, a material with an appropriate composition may be used depending on required semiconductor characteristics and electrical characteristics (e.g., field-effect mobility and threshold voltage) of a transistor. Furthermore, in order to obtain required semiconductor characteristics of a transistor, it is preferable that the carrier density, the impurity concentration, the defect density, the atomic ratio of a metal element to oxygen, the interatomic distance, the density, and the like of the first oxide semiconductor film 108a and the second oxide semiconductor film 108b be set to be appropriate.

Note that it is preferable to use, as the first oxide semiconductor film 108a and the second oxide semiconductor film 108b, an oxide semiconductor film in which the impurity concentration is low and the density of defect states is low, in which case the transistor can have more excellent electrical characteristics. Here, the state in which the impurity concentration is low and the density of defect states is low (the number of oxygen vacancies is small) is referred to as "highly purified intrinsic" or "substantially highly purified intrinsic". A highly purified intrinsic or substantially highly purified intrinsic oxide semiconductor film has few carrier generation sources, and thus can have a low carrier density. Thus, a transistor in which a channel region is formed in the oxide semiconductor film rarely has a negative threshold voltage (is rarely normally on). A highly purified intrinsic or substantially highly purified intrinsic oxide semiconductor film has a low density of defect states and accordingly has a low density of trap states in some cases. Furthermore, the highly purified intrinsic or substantially highly purified intrinsic oxide semiconductor film has an extremely low off-state current; even when an element has a channel width of $1 \times 10^6$ μm and a channel length L of 10 μm, the off-state current can be less than or equal to the measurement limit of a semiconductor parameter analyzer, that is, less than or equal to $1 \times 10^{-13}$ A, at a voltage (drain voltage) between a source electrode and a drain electrode of from 1 V to 10 V.

Accordingly, the transistor in which the channel region is formed in the highly purified intrinsic or substantially highly purified intrinsic oxide semiconductor film can have a small change in electrical characteristics and high reliability. Charges trapped by the trap states in the oxide semiconductor film take a long time to be released and may behave like fixed charges. Thus, the transistor whose channel region is formed in the oxide semiconductor film having a high density of trap states has unstable electrical characteristics in some cases. As examples of the impurities, hydrogen, nitrogen, alkali metal, alkaline earth metal, and the like are given.

Hydrogen included in the oxide semiconductor film reacts with oxygen bonded to a metal atom to be water, and also causes oxygen vacancies in a lattice from which oxygen is released (or a portion from which oxygen is released). Due to entry of hydrogen into the oxygen vacancies, electrons serving as carriers are generated in some cases. Furthermore, in some cases, bonding of part of hydrogen to oxygen bonded to a metal atom causes generation of electrons serving as carriers. Thus, a transistor including an oxide semiconductor film that contains hydrogen is likely to be normally on. Accordingly, it is preferable that hydrogen be reduced as much as possible in the oxide semiconductor film 108. Specifically, in the oxide semiconductor film 108, the concentration of hydrogen that is measured by SIMS is lower than or equal to $2 \times 10^{20}$ atoms/cm$^3$, preferably lower than or equal to $5 \times 10^{19}$ atoms/cm$^3$, further preferably lower than or equal to $1 \times 10^{19}$ atoms/cm$^3$, further preferably lower than or equal to $5 \times 10^{18}$ atoms/cm$^3$, further preferably lower than or equal to $1 \times 10^{18}$ atoms/cm$^3$, further preferably lower than or equal to $5 \times 10^{17}$ atoms/cm$^3$, and further preferably lower than or equal to $1 \times 10^{16}$ atoms/cm$^3$.

When silicon or carbon that is one of elements belonging to Group 14 is included in the first oxide semiconductor film 108a, oxygen vacancies are increased in the first oxide semiconductor film 108a, and the first oxide semiconductor film 108a becomes an n-type film. Thus, the concentration of silicon or carbon (the concentration is measured by SIMS) in the first oxide semiconductor film 108a or the concentration of silicon or carbon (the concentration is measured by SIMS) in the vicinity of an interface with the first oxide semiconductor film 108a is set to be lower than or equal to $2 \times 10^{18}$ atoms/cm$^3$, preferably lower than or equal to $2 \times 10^{17}$ atoms/cm$^3$.

In addition, the concentration of alkali metal or alkaline earth metal of the first oxide semiconductor film 108a, which is measured by SIMS, is lower than or equal to $1 \times 10^{18}$ atoms/cm$^3$, preferably lower than or equal to $2 \times 10^{16}$ atoms/cm$^3$. Alkali metal and alkaline earth metal might generate carriers when bonded to an oxide semiconductor, in which case the off-state current of the transistor might be increased. Therefore, it is preferable to reduce the concentration of alkali metal or alkaline earth metal of the first oxide semiconductor film 108a.

Furthermore, when including nitrogen, the first oxide semiconductor film 108a easily becomes n-type by generation of electrons serving as carriers and an increase of carrier density. Thus, a transistor including an oxide semiconductor film that contains nitrogen is likely to have normally-on characteristics. For this reason, nitrogen in the oxide semiconductor film is preferably reduced as much as possible; the concentration of nitrogen that is measured by SIMS is preferably set to be, for example, lower than or equal to $5 \times 10^{18}$ atoms/cm$^3$.

The first oxide semiconductor film 108a and the second oxide semiconductor film 108b may each have a non-single-crystal structure. The non-single crystal structure includes a c-axis aligned crystalline oxide semiconductor (CAAC-OS), a polycrystalline structure, a microcrystalline structure, or an amorphous structure, for example.

<Insulating Film Functioning as Protective Insulating Film of Transistor>

The insulating films 114 and 116 each have a function of supplying oxygen to the oxide semiconductor film 108. The insulating film 118 has a function as a protective insulating film of the transistor 100. The insulating films 114 and 116 include oxygen. Furthermore, the insulating film 114 is an insulating film that can transmit oxygen. The insulating film 114 also functions as a film that relieves damage to the oxide semiconductor film 108 at the time of forming the insulating film 116 in a later step.

A silicon oxide film, a silicon oxynitride film, or the like with a thickness greater than or equal to 5 nm and less than or equal to 150 nm, preferably greater than or equal to 5 nm and less than or equal to 50 nm can be used as the insulating film 114.

In addition, it is preferable that the number of defects in the insulating film 114 be small and typically, the spin density corresponding to a signal that appears at g=2.001 due to a dangling bond of silicon be lower than or equal to $3 \times 10^{17}$ spins/cm$^3$ by electron spin resonance (ESR) measurement. This is because if the density of defects in the insulating film 114 is high, oxygen is bonded to the defects and the amount of oxygen that transmits the insulating film 114 is decreased.

Note that all oxygen entering the insulating film 114 from the outside does not move to the outside of the insulating film 114 and some oxygen remains in the insulating film 114. Furthermore, movement of oxygen occurs in the insulating film 114 in some cases in such a manner that oxygen enters the insulating film 114 and oxygen included in the insulating film 114 moves to the outside of the insulating film 114. When an oxide insulating film that can transmit oxygen is formed as the insulating film 114, oxygen released from the insulating film 116 provided over the insulating film 114 can be moved to the oxide semiconductor film 108 through the insulating film 114.

Note that the insulating film 114 can be formed using an oxide insulating film having a low density of states due to nitrogen oxide. Note that the density of states due to nitrogen oxide can be formed between the energy of the valence band maximum ($E_{v\_os}$) and the energy of the conduction band minimum ($E_{c\_os}$) of the oxide semiconductor film. A silicon oxynitride film that releases less nitrogen oxide, an aluminum oxynitride film that releases less nitrogen oxide, and the like can be used as the above oxide insulating film.

Note that a silicon oxynitride film that releases less nitrogen oxide is a film of which the amount of released ammonia is larger than the amount of released nitrogen oxide in thermal desorption spectroscopy (TDS) analysis; the amount of released ammonia is typically greater than or equal to $1 \times 10^{18}$ cm$^{-3}$ and less than or equal to $5 \times 10^{19}$ cm$^{-3}$. Note that the amount of released ammonia is the amount of ammonia released by heat treatment with which the surface temperature of a film becomes higher than or equal to 50° C. and lower than or equal to 650° C., preferably higher than or equal to 50° C. and lower than or equal to 550° C.

Nitrogen oxide ($NO_x$; x is greater than 0 and less than or equal to 2, preferably greater than or equal to 1 and less than or equal to 2), typically $NO_2$ or $NO$, forms levels in the insulating film 114, for example. The level is positioned in the energy gap of the oxide semiconductor film 108. Therefore, when nitrogen oxide is diffused to the interface between the insulating film 114 and the oxide semiconductor film 108, an electron is in some cases trapped by the level on the insulating film 114 side. As a result, the trapped electron remains in the vicinity of the interface between the insulating film 114 and the oxide semiconductor film 108; thus, the threshold voltage of the transistor is shifted in the positive direction.

Nitrogen oxide reacts with ammonia and oxygen in heat treatment. Since nitrogen oxide included in the insulating film 114 reacts with ammonia included in the insulating film 116 in heat treatment, nitrogen oxide included in the insulating film 114 is reduced. Therefore, an electron is hardly trapped at the vicinity of the interface between the insulating film 114 and the oxide semiconductor film 108.

By using such an oxide insulating film, the insulating film 114 can reduce the shift in the threshold voltage of the transistor, which leads to a smaller change in the electrical characteristics of the transistor.

Note that in an ESR spectrum at 100 K or lower of the insulating film 114, by heat treatment of a manufacturing process of the transistor, typically heat treatment at a temperature higher than or equal to 300° C. and lower than 350° C., a first signal that appears at a g-factor of greater than or equal to 2.037 and less than or equal to 2.039, a second signal that appears at a g-factor of greater than or equal to 2.001 and less than or equal to 2.003, and a third signal that appears at a g-factor of greater than or equal to 1.964 and less than or equal to 1.966 are observed. The split width of the first and second signals and the split width of the second and third signals that are obtained by ESR measurement using an X-band are each approximately 5 mT. The sum of the spin densities of the first signal that appears at a g-factor of greater than or equal to 2.037 and less than or equal to 2.039, the second signal that appears at a g-factor of greater than or equal to 2.001 and less than or equal to 2.003, and the third signal that appears at a g-factor of greater than or equal to 1.964 and less than or equal to 1.966 is lower than $1 \times 10^{18}$ spins/cm$^3$, typically higher than or equal to $1 \times 10^{17}$ spins/cm$^3$ and lower than $1 \times 10^{18}$ spins/cm$^3$.

In the ESR spectrum at 100 K or lower, the first signal that appears at a g-factor of greater than or equal to 2.037 and less than or equal to 2.039, the second signal that appears at a g-factor of greater than or equal to 2.001 and less than or equal to 2.003, and the third signal that appears at a g-factor of greater than or equal to 1.964 and less than or equal to 1.966 correspond to signals attributed to nitrogen oxide ($NO_x$; x is greater than 0 and less than or equal to 2, preferably greater than or equal to 1 and less than or equal to 2). Typical examples of nitrogen oxide include nitrogen monoxide and nitrogen dioxide. In other words, the lower the total spin density of the first signal that appears at a g-factor of greater than or equal to 2.037 and less than or equal to 2.039, the second signal that appears at a g-factor of greater than or equal to 2.001 and less than or equal to 2.003, and the third signal that appears at a g-factor of greater than or equal to 1.964 and less than or equal to 1.966 is, the lower the content of nitrogen oxide in the oxide insulating film is.

The concentration of nitrogen of the above oxide insulating film measured by SIMS is lower than or equal to $6 \times 10^{20}$ atoms/cm$^3$.

The above oxide insulating film is formed by a PECVD method at a film surface temperature higher than or equal to 220° C. and lower than or equal to 350° C. using silane and dinitrogen monoxide, whereby a dense and hard film can be formed.

The insulating film 116 is formed using an oxide insulating film that contains oxygen in excess of that in the stoichiometric composition. Part of oxygen is released by heating from the oxide insulating film including oxygen in excess of that in the stoichiometric composition. The oxide insulating film including oxygen in excess of that in the stoichiometric composition is an oxide insulating film of which the amount of released oxygen converted into oxygen atoms is greater than or equal to $1.0 \times 10^{19}$ atoms/cm$^3$, preferably greater than or equal to $3.0 \times 10^{20}$ atoms/cm$^3$ in TDS analysis. Note that the temperature of the film surface in the TDS analysis is preferably higher than or equal to 100° C. and lower than or equal to 700° C., or higher than or equal to 100° C. and lower than or equal to 500° C.

A silicon oxide film, a silicon oxynitride film, or the like with a thickness greater than or equal to 30 nm and less than or equal to 500 nm, preferably greater than or equal to 50 nm and less than or equal to 400 nm can be used as the insulating film 116.

It is preferable that the number of defects in the insulating film 116 be small, and typically the spin density corresponding to a signal that appears at g=2.001 due to a dangling bond of silicon be lower than $1.5 \times 10^{18}$ spins/cm$^3$, preferably lower than or equal to $1 \times 10^{18}$ spins/cm$^3$ by ESR measurement. Note that the insulating film 116 is provided more apart from the oxide semiconductor film 108 than the insulating film 114 is; thus, the insulating film 116 may have higher density of defects than the insulating film 114.

Furthermore, the insulating films 114 and 116 can be formed using insulating films formed of the same kinds of materials; thus, a boundary between the insulating films 114 and 116 cannot be clearly observed in some cases. Thus, in this embodiment, the boundary between the insulating films 114 and 116 is shown by a dashed line. Although a two-layer structure of the insulating films 114 and 116 is described in this embodiment, the present invention is not limited to this. For example, a single-layer structure of the insulating film 114 may be employed.

The insulating film 118 includes nitrogen. Alternatively, the insulating film 118 includes nitrogen and silicon. The insulating film 118 has a function of blocking oxygen, hydrogen, water, alkali metal, alkaline earth metal, or the like. It is possible to prevent outward diffusion of oxygen from the oxide semiconductor film 108, outward diffusion of oxygen included in the insulating films 114 and 116, and entry of hydrogen, water, or the like into the oxide semiconductor film 108 from the outside by providing the insulating film 118. A nitride insulating film, for example, can be used as the insulating film 118. The nitride insulating film is formed using silicon nitride, silicon nitride oxide, aluminum nitride, aluminum nitride oxide, or the like. Note that instead of the nitride insulating film having a blocking effect against oxygen, hydrogen, water, alkali metal, alkaline earth metal, and the like, an oxide insulating film having a blocking effect against oxygen, hydrogen, water, and the like may be provided. As the oxide insulating film having a blocking effect against oxygen, hydrogen, water, and the like, an aluminum oxide film, an aluminum oxynitride film, a gallium oxide film, a gallium oxynitride film, an yttrium oxide film, an yttrium oxynitride film, a hafnium oxide film, a hafnium oxynitride film, and the like can be given.

Although the variety of films such as the conductive films, the insulating films, and the oxide semiconductor films that are described above can be formed by a sputtering method or a PECVD method, such films may be formed by another method, e.g., a thermal chemical vapor deposition (CVD) method. Examples of the thermal CVD method include a metal organic chemical vapor deposition (MOCVD) method and an atomic layer deposition (ALD) method.

A thermal CVD method has an advantage that no defect due to plasma damage is generated since it does not utilize plasma for forming a film.

Deposition by a thermal CVD method may be performed in such a manner that a source gas and an oxidizer are supplied to the chamber at a time so that the pressure in a chamber is set to an atmospheric pressure or a reduced pressure, and react with each other in the vicinity of the substrate or over the substrate.

Deposition by an ALD method may be performed in such a manner that the pressure in a chamber is set to an atmospheric pressure or a reduced pressure, source gases for reaction are sequentially introduced into the chamber, and then the sequence of the gas introduction is repeated. For example, two or more kinds of source gases are sequentially supplied to the chamber by switching respective switching valves (also referred to as high-speed valves). For example, a first source gas is introduced, an inert gas (e.g., argon or nitrogen) or the like is introduced at the same time as or after the introduction of the first gas so that the source gases are not mixed, and then a second source gas is introduced. Note that in the case where the first source gas and the inert gas are introduced at a time, the inert gas serves as a carrier gas, and the inert gas may also be introduced at the same time as the introduction of the second source gas. Alternatively, the first source gas may be exhausted by vacuum evacuation instead of the introduction of the inert gas, and then the second source gas may be introduced. The first source gas is adsorbed on the surface of the substrate to form a first layer; then the second source gas is introduced to react with the first layer; as a result, a second layer is stacked over the first layer, so that a thin film is formed. The sequence of the gas introduction is repeated a plurality of times until a desired thickness is obtained, whereby a thin film with excellent step coverage can be formed. The thickness of the thin film can be adjusted by the number of repetition times of the sequence of the gas introduction; therefore, an ALD method makes it possible to accurately adjust a thickness and thus is suitable for manufacturing a minute FET.

The variety of films such as the conductive films, the insulating films, the oxide semiconductor films, and the metal oxide films in this embodiment can be formed by a thermal CVD method such as an MOCVD method or an ALD method. For example, in the case where an In—Ga—Zn—O film is formed, trimethylindium, trimethylgallium, and dimethylzinc are used. Note that the chemical formula of trimethylindium is $In(CH_3)_3$. The chemical formula of trimethylgallium is $Ga(CH_3)_3$. The chemical formula of dimethylzinc is $Zn(CH_3)_2$. Without limitation to the above combination, triethylgallium (chemical formula: $Ga(C_2H_5)_3$) can be used instead of trimethylgallium and diethylzinc (chemical formula: $Zn(C_2H_5)_2$) can be used instead of dimethylzinc.

For example, in the case where a hafnium oxide film is formed by a deposition apparatus using an ALD method, two kinds of gases, that is, ozone ($O_3$) as an oxidizer and a source gas that is obtained by vaporizing liquid containing a solvent and a hafnium precursor compound (e.g., a hafnium alkoxide or a hafnium amide such as tetrakis(dimethylamide) hafnium (TDMAH)) are used. Note that the chemical formula of tetrakis(dimethylamide)hafnium is $Hf[N(CH_3)_2]_4$. Examples of another material liquid include tetrakis(ethylmethylamide)hafnium.

For example, in the case where an aluminum oxide film is formed by a deposition apparatus using an ALD method, two kinds of gases, e.g., $H_2O$ as an oxidizer and a source gas that is obtained by vaporizing liquid containing a solvent and an aluminum precursor compound (e.g., trimethylaluminum (TMA)) are used. Note that the chemical formula of trimethylaluminum is $Al(CH_3)_3$. Examples of another material liquid include tris(dimethylamide)aluminum, triisobutylaluminum, and aluminum tris(2,2,6,6-tetramethyl-3,5-heptanedionate).

For example, in the case where a silicon oxide film is formed by a deposition apparatus using an ALD method, hexachlorodisilane is adsorbed on a surface where a film is to be formed, chlorine included in the adsorbate is removed, and radicals of an oxidizing gas (e.g., 02 or dinitrogen monoxide) are supplied to react with the adsorbate.

For example, in the case where a tungsten film is formed using a deposition apparatus using an ALD method, a $WF_6$ gas and a $B_2H_6$ gas are sequentially introduced a plurality of times to form an initial tungsten film, and then a $WF_6$ gas and an $H_2$ gas are used, so that a tungsten film is formed. Note that a $SiH_4$ gas may be used instead of a $B_2H_6$ gas.

For example, in the case where an oxide semiconductor film, e.g., an In—Ga—Zn—O film is formed using a deposition apparatus using an ALD method, an $In(CH_3)_3$ gas and an $O_3$ gas are sequentially introduced a plurality of times to form an InO layer, a GaO layer is formed using a $Ga(CH_3)_3$ gas and an $O_3$ gas, and then a ZnO layer is formed using a $Zn(CH_3)_2$ gas and an $O_3$ gas. Note that the order of these layers is not limited to this example. A mixed compound layer such as an In—Ga—O layer, an In—Zn—O layer, or a Ga—Zn—O layer may be formed by mixing these gases.

Note that although an H₂O gas that is obtained by bubbling water with an inert gas such as Ar may be used instead of an $O_3$ gas, it is preferable to use an $O_3$ gas, which does not contain H. Furthermore, instead of an $In(CH_3)_3$ gas, an $In(C_2H_5)_3$ gas may be used. Instead of a $Ga(CH_3)_3$ gas, a $Ga(C_2H_5)_3$ gas may be used. Furthermore, a $Zn(CH_3)_2$ gas may be used.

Note that this embodiment can be combined with any of the other embodiments in this specification as appropriate.

Embodiment 6

In this embodiment, the structure of a transistor that can be used in the display panel of one embodiment of the present invention is described with reference to FIGS. 13A to 13C.

<Structural Example of Semiconductor Device>

Figure 13A:
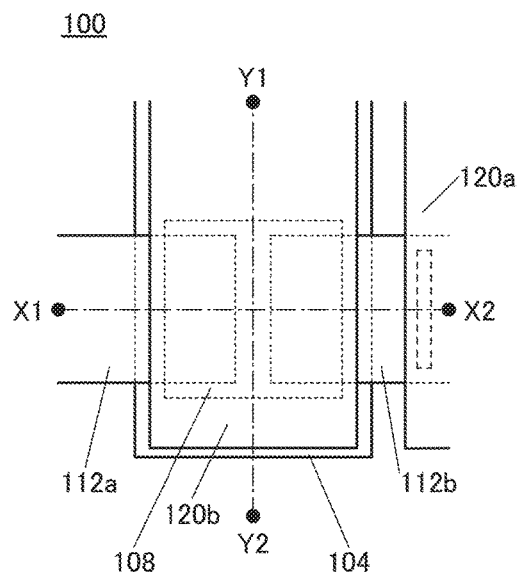
FIGS. 13A to 13C illustrate a structure of a transistor according to an embodiment.
Figure 13B:
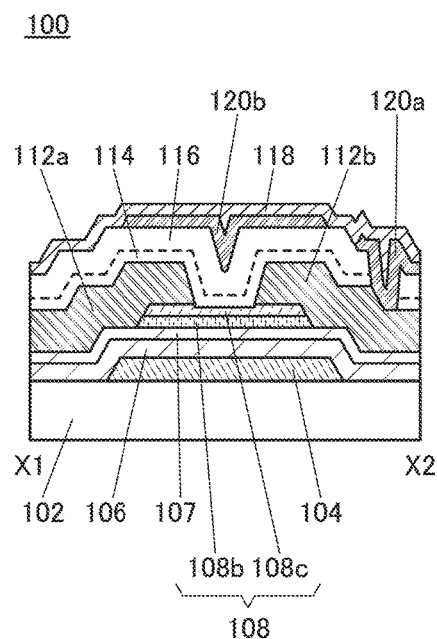
Figure 13C:
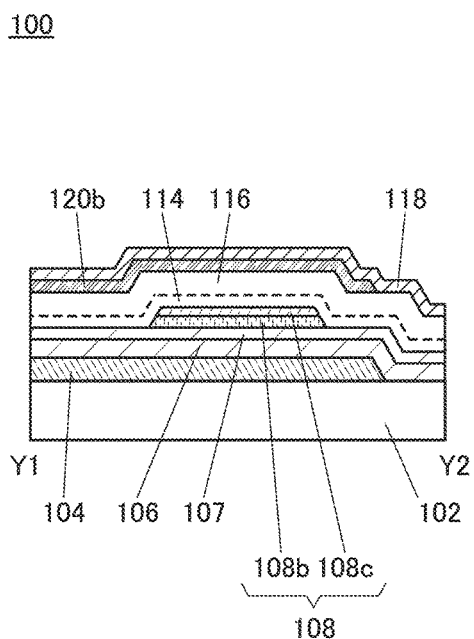

FIG. 13A is a top view of the transistor 100. FIG. 13B is a cross-sectional view taken along the cutting plane line X1-X2 in FIG. 13A. FIG. 13C is a cross-sectional view taken along the cutting plane line Y1-Y2 in FIG. 13A. Note that in FIG. 13A, some components of the transistor 100 (e.g., an insulating film serving as a gate insulating film) are not illustrated to avoid complexity. Furthermore, the direction of the cutting plane line X1-X2 may be called a channel length direction, and the direction of the cutting plane line Y1-Y2 may be called a channel width direction. As in FIG. 13A, some components are not illustrated in some cases in top views of transistors described below.

The transistor 100 can be used for the display panel 700 or the like described in Embodiment 4.

For example, when the transistor 100 is used as the transistor MB or the transistor MD, the substrate 102, the conductive film 104, a stacked film of the insulating film 106 and the insulating film 107, the oxide semiconductor film 108, the conductive film 112a, the conductive film 112b, a stacked film of the insulating film 114 and the insulating film 116, the insulating film 118, and a conductive film 120b can be referred to as the insulating film 501C, the conductive film 504, the insulating film 506, the semiconductor film 508, the conductive film 512A, the conductive film 512B, the insulating film 516, the insulating film 518, and the conductive film 524, respectively.

The transistor 100 includes the conductive film 104 functioning as a first gate electrode over the substrate 102, the insulating film 106 over the substrate 102 and the conductive film 104, the insulating film 107 over the insulating film 106, the oxide semiconductor film 108 over the insulating film 107, and the conductive films 112a and 112b functioning as source and drain electrodes electrically connected to the oxide semiconductor film 108, the insulating films 114 and 116 over the oxide semiconductor film 108 and the conductive films 112a and 112b, a conductive film 120a that is over the insulating film 116 and electrically connected to the conductive film 112b, the conductive film 120b over the insulating film 116, and the insulating film 118 over the insulating film 116 and the conductive films 120a and 120b.

The insulating films 106 and 107 function as a first gate insulating film of the transistor 100. The insulating films 114 and 116 function as a second gate insulating film of the transistor 100. The insulating film 118 functions as a protective insulating film of the transistor 100. In this specification and the like, the insulating films 106 and 107 are collectively referred to as a first insulating film, the insulating films 114 and 116 are collectively referred to as a second insulating film, and the insulating film 118 is referred to as a third insulating film in some cases.

The conductive film 120b can be used as a second gate electrode of the transistor 100.

In the case where the transistor 100 is used in a pixel portion of a display panel, the conductive film 120a can be used as an electrode of a display element, or the like.

The oxide semiconductor film 108 includes the oxide semiconductor film 108b (on the conductive film 104 side) that functions as a first gate electrode, and an oxide semiconductor film 108c over the oxide semiconductor film 108b. The oxide semiconductor films 108b and 108c contain In, M (M is Al, Ga, Y, or Sn), and Zn.

The oxide semiconductor film 108b preferably includes a region in which the atomic proportion of In is larger than the atomic proportion of M, for example. The oxide semiconductor film 108c preferably includes a region in which the atomic proportion of In is smaller than that in the oxide semiconductor film 108b.

The oxide semiconductor film 108b including the region in which the atomic proportion of In is larger than that of M can increase the field-effect mobility (also simply referred to as mobility or μFE) of the transistor 100. Specifically, the field-effect mobility of the transistor 100 can exceed 10 cm²/Vs, preferably exceed 30 cm²/Vs.

For example, the use of the transistor with high field-effect mobility for a gate driver that generates a gate signal (specifically, a demultiplexer connected to an output terminal of a shift register included in a gate driver) allows a semiconductor device or a display device to have a narrow frame.

On the other hand, the oxide semiconductor film 108b including the region in which the atomic proportion of In is larger than that of M makes it easier to change electrical characteristics of the transistor 100 in light irradiation. However, in the semiconductor device of one embodiment of the present invention, the oxide semiconductor film 108c is formed over the oxide semiconductor film 108b. Furthermore, the oxide semiconductor film 108c including the region in which the atomic proportion of In is smaller than that in the oxide semiconductor film 108b has larger Eg than the oxide semiconductor film 108b. For this reason, the oxide semiconductor film 108 that is a layered structure of the oxide semiconductor film 108b and the oxide semiconductor film 108c has high resistance to a negative bias stress test with light irradiation.

Impurities such as hydrogen or moisture entering the channel region of the oxide semiconductor film 108, particularly the oxide semiconductor film 108b adversely affect the transistor characteristics and therefore cause a problem. Moreover, it is preferable that the amount of impurities such as hydrogen or moisture in the channel region of the oxide semiconductor film 108b be as small as possible. Furthermore, oxygen vacancies formed in the channel region in the oxide semiconductor film 108b adversely affect the transistor characteristics and therefore cause a problem. For example, oxygen vacancies formed in the channel region in the oxide semiconductor film 108b are bonded to hydrogen to serve as a carrier supply source. The carrier supply source generated in the channel region in the oxide semiconductor film 108b causes a change in the electrical characteristics, typically, shift in the threshold voltage, of the transistor 100 including the oxide semiconductor film 108b. Therefore, it is preferable that the amount of oxygen vacancies in the channel region of the oxide semiconductor film 108b be as small as possible.

In view of this, one embodiment of the present invention is a structure in which insulating films in contact with the oxide semiconductor film 108, specifically the insulating film 107 formed under the oxide semiconductor film 108 and the insulating films 114 and 116 formed over the oxide semiconductor film 108 include excess oxygen. Oxygen or excess oxygen is transferred from the insulating film 107 and the insulating films 114 and 116 to the oxide semiconductor film 108, whereby the oxygen vacancies in the oxide semiconductor film can be reduced. As a result, a change in electrical characteristics of the transistor 100, particularly a change in electrical characteristics of the transistor 100 due to light irradiation, can be reduced.

In one embodiment of the present invention, a manufacturing method is used in which the number of manufacturing steps is not increased or an increase in the number of manufacturing steps is extremely small, because the insulating film 107 and the insulating films 114 and 116 are made to contain excess oxygen. Thus, the transistor 100 can be manufactured with high yield.

Specifically, in a step of forming the oxide semiconductor film 108b, the oxide semiconductor film 108b is formed by a sputtering method in an atmosphere containing an oxygen gas, whereby oxygen or excess oxygen is added to the insulating film 107 over which the oxide semiconductor film 108b is formed.

Furthermore, in a step of forming the conductive films 120a and 120b, the conductive films 120a and 120b are formed by a sputtering method in an atmosphere containing an oxygen gas, whereby oxygen or excess oxygen is added to the insulating film 116 over which the conductive films 120a and 120b are formed. Note that in some cases, oxygen or excess oxygen is added also to the insulating film 114 and the oxide semiconductor film 108 under the insulating film 116 when oxygen or excess oxygen is added to the insulating film 116.

<Oxide Conductor>

Next, an oxide conductor is described. In a step of forming the conductive films 120a and 120b, the conductive films 120a and 120b serve as a protective film for suppressing release of oxygen from the insulating films 114 and 116. The conductive films 120a and 120b serve as semiconductors before a step of forming the insulating film 118 and serve as conductors after the step of forming the insulating film 118.

To allow the conductive films 120a and 120b to serve as conductors, an oxygen vacancy is formed in the conductive films 120a and 120b and hydrogen is added from the insulating film 118 to the oxygen vacancy, whereby a donor level is formed in the vicinity of the conduction band. As a result, the conductivity of each of the conductive films 120a and 120b is increased, so that the conductive films 120a and 120b become conductors. The conductive films 120a and 120b having become conductors can each be referred to as an oxide conductor. Oxide semiconductors generally have a visible light transmitting property because of their large energy gap. An oxide conductor is an oxide semiconductor having a donor level in the vicinity of the conduction band. Therefore, the influence of absorption due to the donor level is small in an oxide conductor, and an oxide conductor has a visible light transmitting property comparable to that of an oxide semiconductor.

<Components of Semiconductor Device>

Components of the semiconductor device of this embodiment are described below in detail.

As materials described below, materials described in Embodiment 5 can be used.

The material that can be used for the substrate 102 described in Embodiment 5 can be used for the substrate 102 in this embodiment. Furthermore, the materials that can be used for the insulating films 106 and 107 described in Embodiment 5 can be used for the insulating films 106 and 107 in this embodiment.

In addition, the materials that can be used for the conductive films functioning as the gate electrode, the source electrode, and the drain electrode described in Embodiment 5 can be used for the conductive films functioning as the first gate electrode, the source electrode, and the drain electrode in this embodiment.

<Oxide Semiconductor Film>

The oxide semiconductor film 108 can be formed using the materials described above.

In the case where the oxide semiconductor film 108b includes In-M-Zn oxide, it is preferable that the atomic ratio of metal elements of a sputtering target used for forming the In-M-Zn oxide satisfy In>M. The atomic ratio between metal elements in such a sputtering target is, for example, In:M:Zn=2:1:3, In:M:Zn=3:1:2, or In:M:Zn=4:2:4.1.

In the case where the oxide semiconductor film 108c includes In-M-Zn oxide, it is preferable that the atomic ratio of metal elements of a sputtering target used for forming a film of the In-M-Zn oxide satisfy In≤M. The atomic ratio of metal elements in such a sputtering target is, for example, In:M:Zn=1:1:1, In:M:Zn=1:1:1.2, In:M:Zn=1:3:2, In:M:Zn=1:3:4, In:M:Zn=1:3:6, or In:M:Zn=1:4:5.

In the case where the oxide semiconductor films 108b and 108c include In-M-Zn oxide, it is preferable to use a target including polycrystalline In-M-Zn oxide as the sputtering target. The use of the target including polycrystalline In-M-Zn oxide facilitates formation of the oxide semiconductor films 108b and 108c having crystallinity. Note that the atomic ratios of metal elements in each of the formed oxide semiconductor films 108b and 108c vary from the above atomic ratio of metal elements of the sputtering target within a range of ±40% as an error. For example, when a sputtering target of the oxide semiconductor film 108b with an atomic ratio of In to Ga and Zn of 4:2:4.1 is used, the atomic ratio of In to Ga and Zn in the formed oxide semiconductor film 108b may be 4:2:3 or in the vicinity of 4:2:3.

The energy gap of the oxide semiconductor film 108 is 2 eV or more, preferably 2.5 eV or more, further preferably 3 eV or more. The use of an oxide semiconductor having a wide energy gap can reduce off-state current of the transistor 100. In particular, an oxide semiconductor film having an energy gap more than or equal to 2 eV, preferably more than or equal to 2 eV and less than or equal to 3.0 eV is preferably used as the oxide semiconductor film 108b, and an oxide semiconductor film having an energy gap more than or equal to 2.5 eV and less than or equal to 3.5 eV is preferably used as the oxide semiconductor film 108c. Furthermore, the oxide semiconductor film 108c preferably has a higher energy gap than the oxide semiconductor film 108b.

Each thickness of the oxide semiconductor film 108b and the oxide semiconductor film 108c is more than or equal to 3 nm and less than or equal to 200 nm, preferably more than or equal to 3 nm and less than or equal to 100 nm, further preferably more than or equal to 3 nm and less than or equal to 50 nm.

An oxide semiconductor film with low carrier density is used as the oxide semiconductor film 108c. For example, the carrier density of the oxide semiconductor film 108c is lower than or equal to $1 \times 10^{17}$ cm$^{-3}$, preferably lower than or equal to $1 \times 10^{15}$ cm$^{-3}$, further preferably lower than or equal to $1 \times 10^{13}$ cm$^{-3}$, still further preferably lower than or equal to $1 \times 10^{11}$ cm$^{-3}$.

Note that, without limitation to the compositions and materials described above, a material with an appropriate composition may be used depending on required semiconductor characteristics and electrical characteristics (e.g., field-effect mobility and threshold voltage) of a transistor. Furthermore, in order to obtain required semiconductor characteristics of a transistor, it is preferable that the carrier density, the impurity concentration, the defect density, the atomic ratio of a metal element to oxygen, the interatomic distance, the density, and the like of the oxide semiconductor film 108b and the oxide semiconductor film 108c be set to be appropriate.

Note that it is preferable to use, as the oxide semiconductor film 108b and the oxide semiconductor film 108c, an oxide semiconductor film in which the impurity concentration is low and the density of defect states is low, in which case the transistor can have more excellent electrical characteristics. Here, the state in which the impurity concentration is low and the density of defect states is low (the amount of oxygen vacancy is small) is referred to as "highly purified intrinsic" or "substantially highly purified intrinsic". A highly purified intrinsic or substantially highly purified intrinsic oxide semiconductor film has few carrier generation sources, and thus can have a low carrier density. Thus, a transistor in which a channel region is formed in the oxide semiconductor film rarely has a negative threshold voltage (is rarely normally on). A highly purified intrinsic or substantially highly purified intrinsic oxide semiconductor film has a low density of defect states and accordingly has a low density of trap states in some cases. Furthermore, the highly purified intrinsic or substantially highly purified intrinsic oxide semiconductor film has an extremely low off-state current; even when an element has a channel width of $1\times10^6$ μm and a channel length L of 10 μm, the off-state current can be less than or equal to the measurement limit of a semiconductor parameter analyzer, that is, less Than or equal to $1\times10^{-13}$ A, at a voltage (drain voltage) between a source electrode and a drain electrode of from 1 V to 10 V.

Accordingly, the transistor in which the channel region is formed in the highly purified intrinsic or substantially highly purified intrinsic oxide semiconductor film can have a small change in electrical characteristics and high reliability. Charges trapped by the trap states in the oxide semiconductor film take a long time to be released and may behave like fixed charges. Thus, the transistor whose channel region is formed in the oxide semiconductor film having a high density of trap states has unstable electrical characteristics in some cases. As examples of the impurities, hydrogen, nitrogen, alkali metal, and alkaline earth metal are given.

Hydrogen included in the oxide semiconductor film reacts with oxygen bonded to a metal atom to be water, and also causes oxygen vacancy in a lattice from which oxygen is released (or a portion from which oxygen is released). Due to entry of hydrogen into the oxygen vacancy, an electron serving as a carrier is generated in some cases. Furthermore, in some cases, bonding of part of hydrogen to oxygen bonded to a metal atom causes generation of an electron serving as a carrier. Thus, a transistor including an oxide semiconductor film that contains hydrogen is likely to be normally on. Accordingly, it is preferable that hydrogen be reduced as much as possible in the oxide semiconductor film 108. Specifically, in the oxide semiconductor film 108, the concentration of hydrogen that is measured by SIMS is lower than or equal to $2\times10^{20}$ atoms/cm$^3$, preferably lower than or equal to $5\times10^{19}$ atoms/cm$^3$, further preferably lower than or equal to $1\times10^{19}$ atoms/cm$^3$, further preferably lower than or equal to $5\times10^{18}$ atoms/cm$^3$, further preferably lower than or equal to $1\times10^{18}$ atoms/cm$^3$, further preferably lower than or equal to $5\times10^{17}$ atoms/cm$^3$, and further preferably lower than or equal to $1\times10^{16}$ atoms/cm$^3$.

The oxide semiconductor film 108b preferably includes a region in which hydrogen concentration is smaller than that in the oxide semiconductor film 108c. A semiconductor device including the oxide semiconductor film 108b having the region in which hydrogen concentration is smaller than that in the oxide semiconductor film 108c can be increased in reliability.

When silicon or carbon that is one of elements belonging to Group 14 is included in the oxide semiconductor film 108b, oxygen vacancies are increased in the oxide semiconductor film 108b, and the oxide semiconductor film 108b becomes an n-type film. Thus, the concentration of silicon or carbon (the concentration is measured by SIMS) in the oxide semiconductor film 108b or the concentration of silicon or carbon (the concentration is measured by SIMS) in the vicinity of an interface with the oxide semiconductor film 108b is set to be lower than or equal to $2\times10^{18}$ atoms/cm$^3$, preferably lower than or equal to $2\times10^{17}$ atoms/cm$^3$.

In addition, the concentration of alkali metal or alkaline earth metal of the oxide semiconductor film 108b, which is measured by SIMS, is lower than or equal to $1\times10^{18}$ atoms/cm$^3$, preferably lower than or equal to $2\times10^{16}$ atoms/cm$^3$. Alkali metal and alkaline earth metal might generate carriers when bonded to an oxide semiconductor, in which case the off-state current of the transistor might be increased. Therefore, it is preferable to reduce the concentration of alkali metal or alkaline earth metal of the oxide semiconductor film 108b.

Furthermore, when including nitrogen, the oxide semiconductor film 108b easily becomes n-type by generation of electrons serving as carriers and an increase of carrier density. Thus, a transistor including an oxide semiconductor film that contains nitrogen is likely to have normally-on characteristics. For this reason, nitrogen in the oxide semiconductor film is preferably reduced as much as possible; the concentration of nitrogen that is measured by SIMS is preferably set to be, for example, lower than or equal to $5\times10^{18}$ atoms/cm$^3$.

The oxide semiconductor film 108b and the oxide semiconductor film 108c may have a non-single-crystal structure. The non-single crystal structure includes CAAC-OS, a polycrystalline structure, a microcrystalline structure, or an amorphous structure, for example.

<Insulating Films Functioning as Second Gate Insulating Film>

The insulating films 114 and 116 function as a second gate insulating film of the transistor 100. In addition, the insulating films 114 and 116 each have a function of supplying oxygen to the oxide semiconductor film 108. That is, the insulating films 114 and 116 contain oxygen. Furthermore, the insulating film 114 is an insulating film that can transmit oxygen. Note that the insulating film 114 also functions as a film that relieves damage to the oxide semiconductor film 108 at the time of forming the insulating film 116 in a later step.

For example, the insulating films 114 and 116 described in Embodiment 5 can be used as the insulating films 114 and 116 in this embodiment.

<Oxide Semiconductor Film Functioning as Conductive Film and Oxide Semiconductor Film Functioning as Second Gate Electrode>

The material of the oxide semiconductor film 108 described above can be used for the conductive film 120a functioning as a conductive film and the conductive film 120b functioning as the second gate electrode.

That is, the conductive film 120a functioning as a conductive film and the conductive film 120b functioning as a second gate electrode contain a metal element that is the same as that contained in the oxide semiconductor film 108 (the oxide semiconductor film 108b and the oxide semiconductor film 108c). For example, the conductive film 120b functioning as a second gate electrode and the oxide semiconductor film 108 (the oxide semiconductor film 108b and the oxide semiconductor film 108c) contain the same metal element; thus, the manufacturing cost can be reduced.

For example, in the case where the conductive film 120a functioning as a conductive film and the conductive film 120b functioning as a second gate electrode each include In-M-Zn oxide, the atomic ratio of metal elements in a sputtering target used for forming the In-M-Zn oxide preferably satisfies In≥M. The atomic ratio of metal elements in such a sputtering target is In:M:Zn=2:1:3, In:M:Zn=3:1:2, In:M:Zn=4:2:4.1, or the like.

The conductive film 120a functioning as a conductive film and the conductive film 120b functioning as a second gate electrode can each have a single-layer structure or a stacked-layer structure of two or more layers. Note that in the case where the conductive film 120a and the conductive film 120b each have a stacked-layer structure, the composition of the sputtering target is not limited to that described above.

<Insulating Film Functioning as Protective Insulating Film of Transistor>

The insulating film 118 serves as a protective insulating film of the transistor 100.

The insulating film 118 includes one or both of hydrogen and nitrogen. Alternatively, the insulating film 118 includes nitrogen and silicon. The insulating film 118 has a function of blocking oxygen, hydrogen, water, alkali metal, alkaline earth metal, or the like. It is possible to prevent outward diffusion of oxygen from the oxide semiconductor film 108, outward diffusion of oxygen included in the insulating films 114 and 116, and entry of hydrogen, water, or the like into the oxide semiconductor film 108 from the outside by providing the insulating film 118.

The insulating film 118 has a function of supplying one or both of hydrogen and nitrogen to the conductive film 120a functioning as a conductive film and the conductive film 120b functioning as a second gate electrode. The insulating film 118 preferably includes hydrogen and has a function of supplying the hydrogen to the conductive films 120a and 120b. The conductive films 120a and 120b supplied with hydrogen from the insulating film 118 function as conductors.

A nitride insulating film, for example, can be used as the insulating film 118. The nitride insulating film is formed using silicon nitride, silicon nitride oxide, aluminum nitride, aluminum nitride oxide, or the like.

Although the variety of films such as the conductive films, the insulating films, and the oxide semiconductor films that are described above can be formed by a sputtering method or a PECVD method, such films may be formed by another method, e.g., a thermal CVD method. Examples of the thermal CVD method include an MOCVD method and an ALD method.

A thermal CVD method has an advantage that no defect due to plasma damage is generated since it does not utilize plasma for forming a film.

Deposition by a thermal CVD method may be performed in such a manner that a source gas and an oxidizer are supplied to the chamber at a time so that the pressure in a chamber is set to an atmospheric pressure or a reduced pressure, and react with each other in the vicinity of the substrate or over the substrate.

Deposition by an ALD method may be performed in such a manner that the pressure in a chamber is set to an atmospheric pressure or a reduced pressure, source gases for reaction are sequentially introduced into the chamber, and then the sequence of the gas introduction is repeated. For example, two or more kinds of source gases are sequentially supplied to the chamber by switching respective switching valves (also referred to as high-speed valves). For example, a first source gas is introduced, an inert gas (e.g., argon or nitrogen) or the like is introduced at the same time as or after the introduction of the first gas so that the source gases are not mixed, and then a second source gas is introduced. Note that in the case where the first source gas and the inert gas are introduced at a time, the inert gas serves as a carrier gas, and the inert gas may also be introduced at the same time as the introduction of the second source gas. Alternatively, the first source gas may be exhausted by vacuum evacuation instead of the introduction of the inert gas, and then the second source gas may be introduced. The first source gas is adsorbed on the surface of the substrate to form a first layer; then the second source gas is introduced to react with the first layer; as a result, a second layer is stacked over the first layer, so that a thin film is formed. The sequence of the gas introduction is repeated a plurality of times until a desired thickness is obtained, whereby a thin film with excellent step coverage can be formed. The thickness of the thin film can be adjusted by the number of repetition times of the sequence of the gas introduction; therefore, an ALD method makes it possible to accurately adjust a thickness and thus is suitable for manufacturing a minute FET.

The variety of films such as the conductive films, the insulating films, the oxide semiconductor films, and the metal oxide films in this embodiment can be formed by a thermal CVD method such as an MOCVD method or an ALD method. For example, in the case where an In—Ga—Zn—O film is formed, trimethylindium, trimethylgallium, and dimethylzinc are used. Note that the chemical formula of trimethylindium is $In(CH_3)_3$. The chemical formula of trimethylgallium is $Ga(CH_3)_3$. The chemical formula of dimethylzinc is $Zn(CH_3)_2$. Without limitation to the above combination, triethylgallium (chemical formula: $Ga(C_2H_5)_3$) can be used instead of trimethylgallium and diethylzinc (chemical formula: $Zn(C_2H_5)_2$) can be used instead of dimethylzinc.

For example, in the case where a hafnium oxide film is formed by a deposition apparatus using an ALD method, two kinds of gases, that is, ozone ($O_3$) as an oxidizer and a source gas that is obtained by vaporizing liquid containing a solvent and a hafnium precursor compound (e.g., a hafnium alkoxide or a hafnium amide such as tetrakis(dimethylamide) hafnium (TDMAH)) are used. Note that the chemical formula of tetrakis(dimethylamide)hafnium is $Hf[N(CH_3)_2]_4$. Examples of another material liquid include tetrakis(ethylmethylamide)hafnium.

For example, in the case where an aluminum oxide film is formed by a deposition apparatus using an ALD method, two kinds of gases, e.g., $H_2O$ as an oxidizer and a source gas that is obtained by vaporizing liquid containing a solvent and an aluminum precursor compound (e.g., trimethylaluminum (TMA)) are used. Note that the chemical formula of trimethylaluminum is $Al(CH_3)_3$. Examples of another material liquid include tris(dimethylamide)aluminum, triisobutylaluminum, and aluminum tris(2,2,6,6-tetramethyl-3,5-heptanedionate).

For example, in the case where a silicon oxide film is formed by a deposition apparatus using an ALD method, hexachlorodisilane is adsorbed on a surface where a film is to be formed, chlorine included in the adsorbate is removed, and radicals of an oxidizing gas (e.g., $O_2$ or dinitrogen monoxide) are supplied to react with the adsorbate.

For example, in the case where a tungsten film is formed using a deposition apparatus using an ALD method, a $WF_6$ gas and a $B_2H_6$ gas are sequentially introduced a plurality of times to form an initial tungsten film, and then a $WF_6$ gas and an $H_2$ gas are used, so that a tungsten film is formed. Note that a $SiH_4$ gas may be used instead of a $B_2H_6$ gas.

For example, in the case where an oxide semiconductor film, e.g., an In—Ga—Zn—O film is formed using a deposition apparatus using an ALD method, an $In(CH_3)_3$ gas and an $O_3$ gas are sequentially introduced a plurality of times to form an InO layer, a GaO layer is formed using a $Ga(CH_3)_3$ gas and an $O_3$ gas, and then a ZnO layer is formed using a $Zn(CH_3)_2$ gas and an $O_3$ gas. Note that the order of these layers is not limited to this example. A mixed compound layer such as an In—Ga—O layer, an In—Zn—O layer, or a Ga—Zn—O layer may be formed by mixing these gases. Note that although an $H_2O$ gas that is obtained by bubbling water with an inert gas such as Ar may be used instead of an $O_3$ gas, it is preferable to use an $O_3$ gas, which does not contain H. Furthermore, instead of an $In(CH_3)_3$ gas, an $In(C_2H_5)_3$ gas may be used. Instead of a $Ga(CH_3)_3$ gas, a $Ga(C_2H_5)_3$ gas may be used. Furthermore, a $Zn(CH_3)_2$ gas may be used.

Note that this embodiment can be combined with any of the other embodiments in this specification as appropriate.

Embodiment 7

In this embodiment, a structure of an input/output device which is one embodiment of the present invention will be described with reference to FIG. 14.

Figure 14:
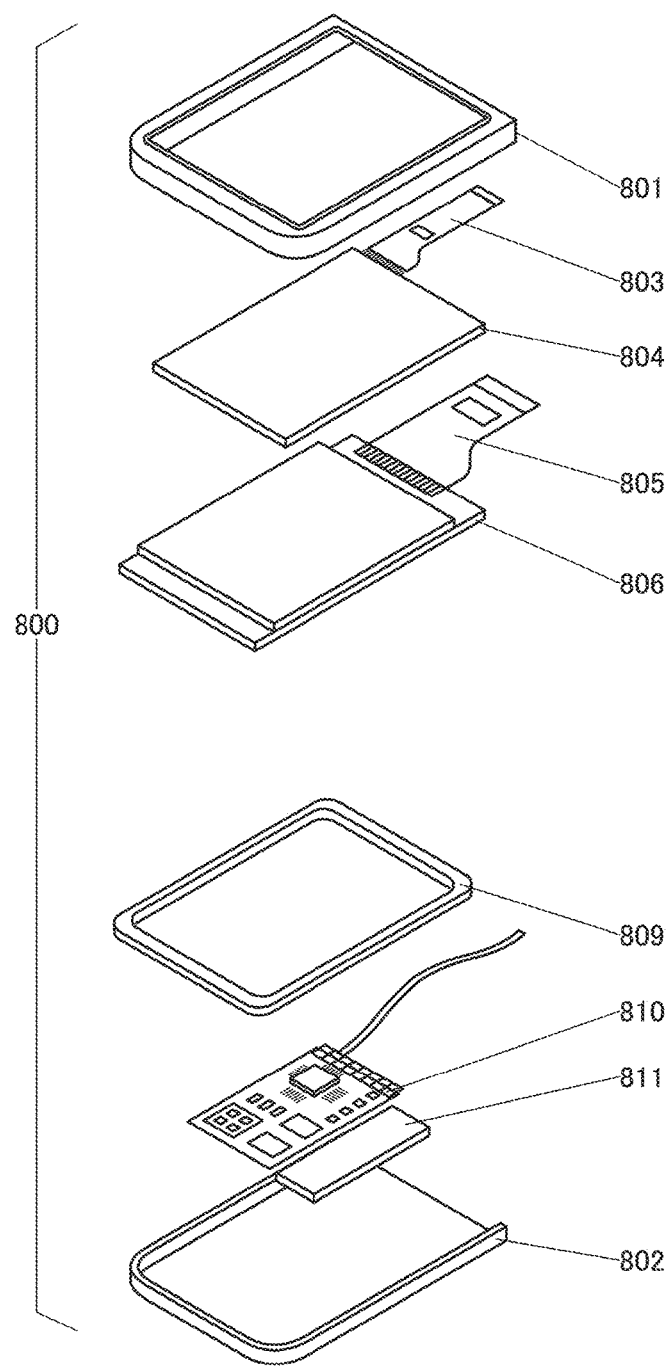
FIG. 14 illustrates a structure of an input/output device according to an embodiment.

FIG. 14 is an exploded view of a structure of an input/output device 800.

The input/output device 800 includes a display panel 806 and a touch sensor 804 having a region overlapping with the display panel 806. Note that the input/output device 800 can be referred to as a touch panel.

The input/output device 800 is provided with a driver circuit 810 for driving the touch sensor 804 and the display panel 806, a battery 811 for supplying power to the driver circuit 810, and a housing where the touch sensor 804, the display panel 806, the driver circuit 810, and the battery 811 are stored.

<<Touch Sensor 804>>

The touch sensor 804 includes a region overlapping with the display panel 806. Note that an FPC 803 is electrically connected to the touch sensor 804.

For the touch sensor 804, a resistive touch sensor, a capacitive touch sensor, or a touch sensor using a photoelectric conversion element can be used, for example.

Note that the touch sensor 804 may be used as part of the display panel 806.

<<Display Panel 806>>

For example, the display panel described in Embodiment 1 can be used as the display panel 806. Note that an FPC 805 or the like is electrically connected to the display panel 806.

<<Driver Circuit 810>>

As the driver circuit 810, a power supply circuit or a signal processing circuit can be used, for example. Power supplied to the battery or an external commercial power supply can be utilized.

The signal processing circuit has a function of outputting a video signal, a clock signal, and the like.

The power supply circuit has a function of supplying predetermined power.

<<Housing>>

An upper cover 801, a lower cover 802 which fits the upper cover 801, and a frame 809 which is stored in a region surrounded by the upper cover 801 and the lower cover 802 can be used for the housing, for example.

The frame 809 has a function of protecting the display panel 806, a function of blocking electromagnetic waves generated by the operation of the driver circuit 810, or a function as a radiator plate.

Metal, a resin, an elastomer, or the like can be used for the upper cover 801, the lower cover 802, or the frame 809.

<<Battery 811>>

The battery 811 has a function of supplying power.

Note that a member such as a polarizing plate, a retardation plate, or a prism sheet can be used for the input/output device 800.

This embodiment can be combined with any of the other embodiments in this specification as appropriate.

Embodiment 8

In this embodiment, a semiconductor device (memory device) that can retain stored data even when not powered and that has an unlimited number of write cycles, and a CPU including the semiconductor device are described. The CPU described in this embodiment can be used for the data processing device described in Embodiment 1, for example.

<Memory Device>

Figure 15A:
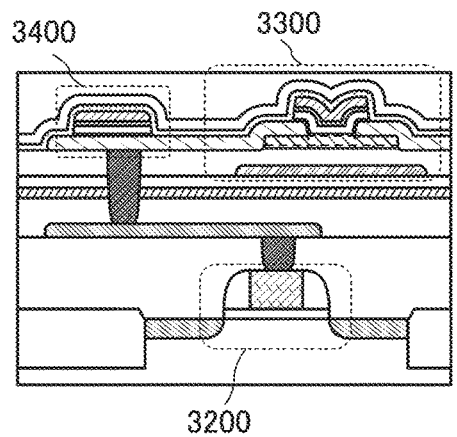
FIGS. 15A to 15C are a cross-sectional view and circuit diagrams each illustrating a structure of a semiconductor device of an embodiment.
Figure 15B:
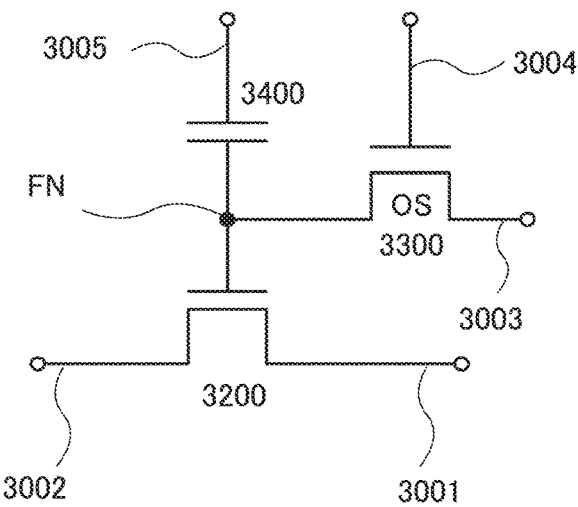
Figure 15C:
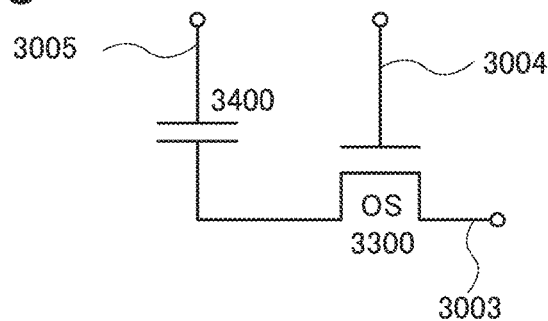

An example of a semiconductor device (memory device) that can retain stored data even when not powered and that has an unlimited number of write cycles is shown in FIGS. 15A to 15C. Note that FIG. 15B is a circuit diagram of the structure in FIG. 15A.

The semiconductor device illustrated in FIGS. 15A and 15B includes a transistor 3200 using a first semiconductor material, a transistor 3300 using a second semiconductor material, and a capacitor 3400.

The first and second semiconductor materials preferably have different energy gaps. For example, the first semiconductor material can be a semiconductor material other than an oxide semiconductor (examples of such a semiconductor material include silicon (including strained silicon), germanium, silicon germanium, silicon carbide, gallium arsenide, aluminum gallium arsenide, indium phosphide, gallium nitride, and an organic semiconductor), and the second semiconductor material can be an oxide semiconductor. A transistor using a material other than an oxide semiconductor, such as single crystal silicon, can operate at high speed easily. On the other hand, a transistor including an oxide semiconductor has a low off-state current.

The transistor 3300 is a transistor in which a channel is formed in a semiconductor layer including an oxide semiconductor. Since the off-state current of the transistor 3300 is small, stored data can be retained for a long period. In other words, power consumption can be sufficiently reduced because a semiconductor memory device in which refresh operation is unnecessary or the frequency of refresh operation is extremely low can be provided.

In FIG. 15B, a first wiring 3001 is electrically connected to a source electrode of the transistor 3200. A second wiring 3002 is electrically connected to a drain electrode of the transistor 3200. A third wiring 3003 is electrically connected to one of a source electrode and a drain electrode of the transistor 3300. A fourth wiring 3004 is electrically connected to a gate electrode of the transistor 3300. A gate electrode of the transistor 3200 and the other of the source electrode and the drain electrode of the transistor 3300 are electrically connected to one electrode of the capacitor 3400. A fifth wiring 3005 is electrically connected to the other electrode of the capacitor 3400.

The semiconductor device in FIG. 15A has a feature that the potential of the gate electrode of the transistor 3200 can be retained, and thus enables writing, retaining, and reading of data as follows.

Writing and retaining of data are described. First, the potential of the fourth wiring 3004 is set to a potential at which the transistor 3300 is turned on, so that the transistor 3300 is turned on. Accordingly, the potential of the third wiring 3003 is supplied to the gate electrode of the transistor 3200 and the capacitor 3400. That is, a predetermined charge is supplied to the gate electrode of the transistor 3200 (writing). Here, one of two kinds of charges providing different potential levels (hereinafter referred to as a low-level charge and a high-level charge) is supplied. After that, the potential of the fourth wiring 3004 is set to a potential at which the transistor 3300 is turned off, so that the transistor 3300 is turned off. Thus, the charge supplied to the gate electrode of the transistor 3200 is held (retaining).

Since the off-state current of the transistor 3300 is extremely small, the charge of the gate electrode of the transistor 3200 is retained for a long time.

Next, reading of data is described. An appropriate potential (a reading potential) is supplied to the fifth wiring 3005 while a predetermined potential (a constant potential) is supplied to the first wiring 3001, whereby the potential of the second wiring 3002 varies depending on the amount of charge retained in the gate electrode of the transistor 3200. This is because in the case of using an n-channel transistor as the transistor 3200, an apparent threshold voltage $V_{th\_H}$ at the time when the high-level charge is given to the gate electrode of the transistor 3200 is lower than an apparent threshold voltage $V_{th\_L}$ at the time when the low-level charge is given to the gate electrode of the transistor 3200. Here, an apparent threshold voltage refers to the potential of the fifth wiring 3005 that is needed to turn on the transistor 3200. Thus, the potential of the fifth wiring 3005 is set to a potential $V_0$ that is between $V_{th\_H}$ and $V_{th\_L}$, whereby charge supplied to the gate electrode of the transistor 3200 can be determined. For example, in the case where the high-level charge is supplied to the gate electrode of the transistor 3200 in writing and the potential of the fifth wiring 3005 is $V_0$ ($>V_{th\_H}$), the transistor 3200 is turned on. In the case where the low-level charge is supplied to the gate electrode of the transistor 3200 in writing, even when the potential of the fifth wiring 3005 is $V_0$ ($<V_{th\_L}$), the transistor 3200 remains off. Thus, the data retained in the gate electrode of the transistor 3200 can be read by determining the potential of the second wiring 3002.

Note that in the case where memory cells are arrayed, it is necessary that only data of a designated memory cell(s) can be read. In the case where data is not read, the fifth wiring 3005 may be supplied with a potential at which the transistor 3200 is turned off regardless of the state of the gate, that is, a potential lower than $V_{th\_H}$.

The semiconductor device illustrated in FIG. 15C is different from the semiconductor device illustrated in FIG. 15A in that the transistor 3200 is not provided. Also in this case, writing and retaining operation of data can be performed in a manner similar to those of the semiconductor device illustrated in FIG. 15A.

Next, reading of data of the semiconductor device illustrated in FIG. 15C is described. When the transistor 3300 is turned on, the third wiring 3003 that is in a floating state and the capacitor 3400 are electrically connected to each other, and the charge is redistributed between the third wiring 3003 and the capacitor 3400. As a result, the potential of the third wiring 3003 is changed. The amount of change in the potential of the third wiring 3003 varies depending on the potential of the one electrode of the capacitor 3400 (or the charge accumulated in the capacitor 3400).

For example, the potential of the third wiring 3003 after the charge redistribution is $(C_B \times V_{B0} + C \times V)/(C_B + C)$, where V is the potential of the one electrode of the capacitor 3400, C is the capacitance of the capacitor 3400, $C_B$ is the capacitance component of the third wiring 3003, and $V_{B0}$ is the potential of the third wiring 3003 before the charge redistribution. Thus, it can be found that, assuming that the memory cell is in either of two states in which the potential of the one electrode of the capacitor 3400 is $V_1$ and $V_0$ ($V_1 > V_0$), the potential of the third wiring 3003 in the case of retaining the potential $V_1$ ($=(C_B \times V_{B0} + C \times V_1)/(C_B + C)$) is higher than the potential of the third wiring 3003 in the case of retaining the potential $V_0$ ($=(C_B \times V_{B0} + C \times V_0)/(C_B + C)$).

Then, by comparing the potential of the third wiring 3003 with a predetermined potential, data can be read.

In this case, a transistor including the first semiconductor material may be used for a driver circuit for driving a memory cell, and a transistor including the second semiconductor material may be stacked over the driver circuit as the transistor 3300.

When including a transistor in which a channel formation region is formed using an oxide semiconductor and which has an extremely small off-state current, the semiconductor device described in this embodiment can retain stored data for an extremely long time. In other words, refresh operation becomes unnecessary or the frequency of the refresh operation can be extremely low, which leads to a sufficient reduction in power consumption. Moreover, stored data can be retained for a long time even when power is not supplied (note that a potential is preferably fixed).

Furthermore, in the semiconductor device described in this embodiment, high voltage is not needed for writing data and there is no problem of deterioration of elements. Unlike in a conventional nonvolatile memory, for example, it is not necessary to inject and extract electrons into and from a floating gate; thus, a problem such as deterioration of a gate insulating film is not caused. That is, the semiconductor device described in this embodiment does not have a limit on the number of times data can be rewritten, which is a problem of a conventional nonvolatile memory, and the reliability thereof is drastically improved. Furthermore, data is written depending on the state of the transistor (on or off), whereby high-speed operation can be easily achieved.

The above memory device can also be used in an LSI such as a digital signal processor (DSP), a custom LSI, or a programmable logic device (PLD) and a radio frequency identification (RF-ID) tag, in addition to a central processing unit (CPU), for example.

<CPU>

A CPU including the above memory device is described below.

Figure 16:
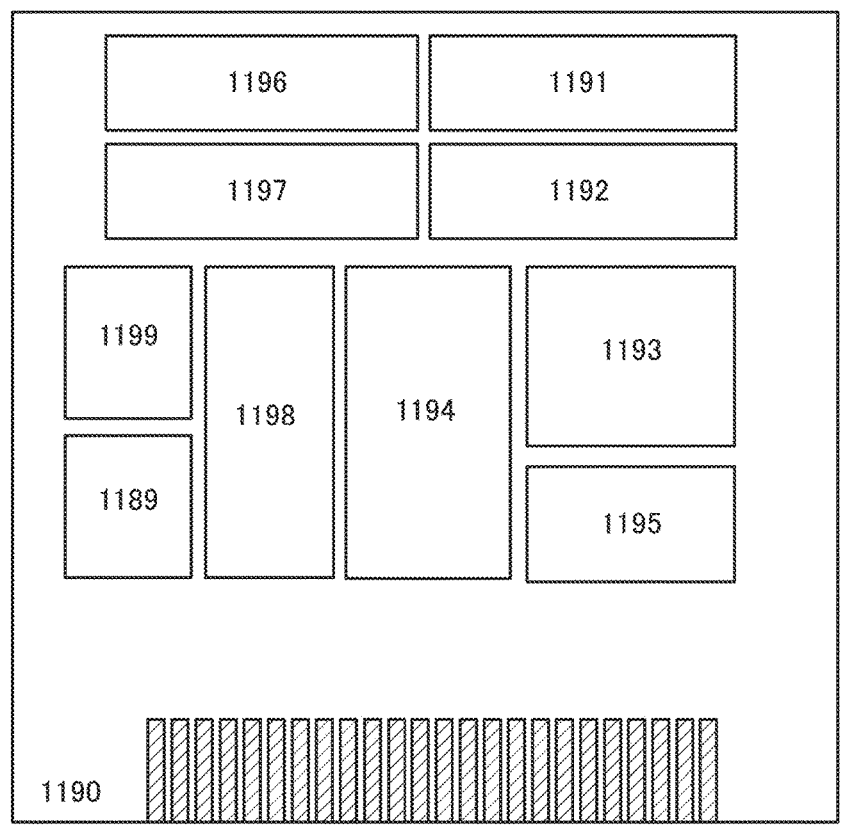
FIG. 16 is a block diagram illustrating a structure of a CPU of an embodiment.

FIG. 16 is a block diagram illustrating a structural example of the CPU including the above memory device.

The CPU illustrated in FIG. 16 includes, over a substrate 1190, an arithmetic logic unit (ALU) 1191, an ALU controller 1192, an instruction decoder 1193, an interrupt controller 1194, a timing controller 1195, a register 1196, a register controller 1197, a bus interface (BUS I/F) 1198, a rewritable ROM 1199, and a ROM interface (ROM I/F) 1189. A semiconductor substrate, an SOI substrate, a glass substrate, or the like is used as the substrate 1190. The ROM 1199 and the ROM interface 1189 may be provided over a separate chip. Needless to say, the CPU in FIG. 16 is just an example in which the structure is simplified, and an actual CPU may have a variety of structures depending on the application. For example, the CPU may have the following structure: a structure including the CPU illustrated in FIG. 16 or an arithmetic circuit is considered as one core; a plurality of such cores are included; and the cores operate in parallel. The number of bits that the CPU can process in an internal arithmetic circuit or in a data bus can be, for example, 8, 16, 32, or 64.

An instruction that is input to the CPU through the bus interface 1198 is input to the instruction decoder 1193 and decoded therein, and then, input to the ALU controller 1192, the interrupt controller 1194, the register controller 1197, and the timing controller 1195.

The ALU controller 1192, the interrupt controller 1194, the register controller 1197, and the timing controller 1195 conduct various controls in accordance with the decoded instruction. Specifically, the ALU controller 1192 generates signals for controlling the operation of the ALU 1191. While the CPU is executing a program, the interrupt controller 1194 processes an interrupt request from an external input/output device or a peripheral circuit depending on its priority or a mask state. The register controller 1197 generates an address of the register 1196, and reads/writes data from/to the register 1196 depending on the state of the CPU.

The timing controller 1195 generates signals for controlling operation timings of the ALU 1191, the ALU controller 1192, the instruction decoder 1193, the interrupt controller 1194, and the register controller 1197. For example, the timing controller 1195 includes an internal clock generator for generating an internal clock signal on the basis of a reference clock signal, and supplies the internal clock signal to the above circuits.

In the CPU illustrated in FIG. 16, a memory cell is provided in the register 1196.

In the CPU illustrated in FIG. 16, the register controller 1197 selects operation of retaining data in the register 1196 in accordance with an instruction from the ALU 1191. That is, the register controller 1197 selects whether data is retained by a flip-flop or by a capacitor in the memory cell included in the register 1196. When data retaining by the flip-flop is selected, a power supply voltage is supplied to the memory cell in the register 1196. When data retaining by the capacitor is selected, the data is rewritten in the capacitor, and supply of the power supply voltage to the memory cell in the register 1196 can be stopped.

Figure 17:
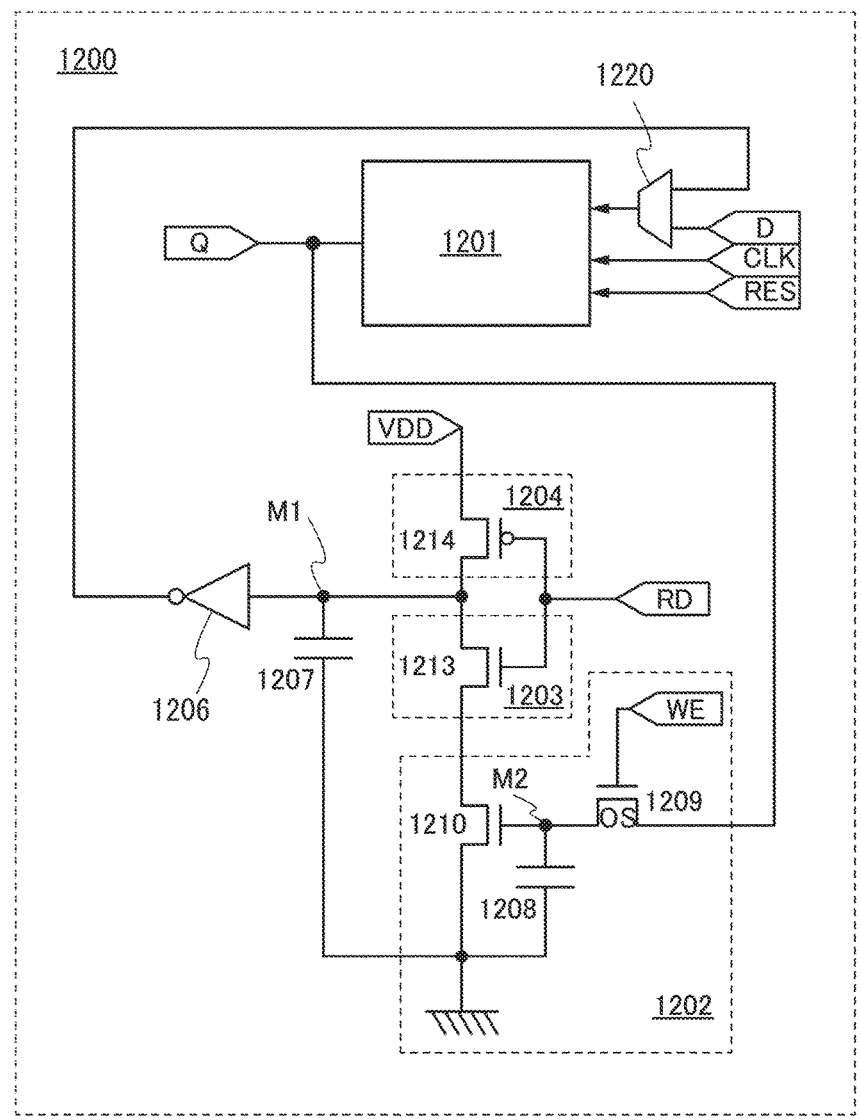
FIG. 17 is a circuit diagram illustrating a structure of a memory element of an embodiment.

FIG. 17 is an example of a circuit diagram of a memory element that can be used for the register 1196. A memory element 1200 includes a circuit 1201 in which stored data is volatile when power supply is stopped, a circuit 1202 in which stored data is nonvolatile even when power supply is stopped, a switch 1203, a switch 1204, a logic element 1206, a capacitor 1207, and a circuit 1220 having a selecting function. The circuit 1202 includes a capacitor 1208, a transistor 1209, and a transistor 1210. Note that the memory element 1200 may further include another element such as a diode, a resistor, or an inductor, as needed.

Here, the above-described memory device can be used as the circuit 1202. When supply of a power supply voltage to the memory element 1200 is stopped, a ground potential (0 V) or a potential at which the transistor 1209 in the circuit 1202 is turned off continues to be input to a gate of the transistor 1209. For example, the gate of the transistor 1209 is grounded through a load such as a resistor.

Shown here is an example in which the switch 1203 is a transistor 1213 having one conductivity type (e.g., an n-channel transistor) and the switch 1204 is a transistor 1214 having a conductivity type opposite to the one conductivity type (e.g., a p-channel transistor). A first terminal of the switch 1203 corresponds to one of a source and a drain of the transistor 1213, a second terminal of the switch 1203 corresponds to the other of the source and the drain of the transistor 1213, and conduction or non-conduction between the first terminal and the second terminal of the switch 1203 (i.e., the on/off state of the transistor 1213) is selected by a control signal RD input to a gate of the transistor 1213. A first terminal of the switch 1204 corresponds to one of a source and a drain of the transistor 1214, a second terminal of the switch 1204 corresponds to the other of the source and the drain of the transistor 1214, and conduction or non-conduction between the first terminal and the second terminal of the switch 1204 (i.e., the on/off state of the transistor 1214) is selected by the control signal RD input to a gate of the transistor 1214.

One of a source and a drain of the transistor 1209 is electrically connected to one of a pair of electrodes of the capacitor 1208 and a gate of the transistor 1210. Here, the connection portion is referred to as a node M2. One of a source and a drain of the transistor 1210 is electrically connected to a wiring that can supply a low power supply potential (e.g., a GND line), and the other thereof is electrically connected to the first terminal of the switch 1203 (the one of the source and the drain of the transistor 1213). The second terminal of the switch 1203 (the other of the source and the drain of the transistor 1213) is electrically connected to the first terminal of the switch 1204 (the one of the source and the drain of the transistor 1214). The second terminal of the switch 1204 (the other of the source and the drain of the transistor 1214) is electrically connected to a wiring that can supply a power supply potential VDD. The second terminal of the switch 1203 (the other of the source and the drain of the transistor 1213), the first terminal of the switch 1204 (the one of the source and the drain of the transistor 1214), an input terminal of the logic element 1206, and one of a pair of electrodes of the capacitor 1207 are electrically connected to each other. Here, the connection portion is referred to as a node M1. The other of the pair of electrodes of the capacitor 1207 can be supplied with a constant potential. For example, the other of the pair of electrodes of the capacitor 1207 can be supplied with a low power supply potential (e.g., GND) or a high power supply potential (e.g., VDD). The other of the pair of electrodes of the capacitor 1207 is electrically connected to the wiring that can supply a low power supply potential (e.g., a GND line). The other of the pair of electrodes of the capacitor 1208 can be supplied with a constant potential. For example, the other of the pair of electrodes of the capacitor 1208 can be supplied with a low power supply potential (e.g., GND) or a high power supply potential (e.g., VDD). The other of the pair of electrodes of the capacitor 1208 is electrically connected to the wiring that can supply a low power supply potential (e.g., a GND line).

The capacitor 1207 and the capacitor 1208 are not necessarily provided as long as the parasitic capacitance of the transistor, the wiring, or the like is actively utilized.

A control signal WE is input to a first gate (first gate electrode) of the transistor 1209. As for each of the switch 1203 and the switch 1204, a conduction state or a non-conduction state between the first terminal and the second terminal is selected by the control signal RD that is different from the control signal WE. When the first terminal and the second terminal of one of the switches are in the conduction state, the first terminal and the second terminal of the other of the switches are in the non-conduction state.

A signal corresponding to data retained in the circuit 1201 is input to the other of the source and the drain of the transistor 1209. FIG. 17 illustrates an example in which a signal output from the circuit 1201 is input to the other of the source and the drain of the transistor 1209. The logic value of a signal output from the second terminal of the switch 1203 (the other of the source and the drain of the transistor 1213) is inverted by the logic element 1206, and the inverted signal is input to the circuit 1201 through the circuit 1220.

In the example of FIG. 17, a signal output from the second terminal of the switch 1203 (the other of the source and the drain of the transistor 1213) is input to the circuit 1201 through the logic element 1206 and the circuit 1220; however, one embodiment of the present invention is not limited thereto. The signal output from the second terminal of the switch 1203 (the other of the source and the drain of the transistor 1213) may be input to the circuit 1201 without its logic value being inverted. For example, in the case where the circuit 1201 includes a node in which a signal obtained by inversion of the logic value of a signal input from the input terminal is retained, the signal output from the second terminal of the switch 1203 (the other of the source and the drain of the transistor 1213) can be input to the node.

In FIG. 17, the transistors included in the memory element 1200 except for the transistor 1209 can each be a transistor in which a channel is formed in a layer formed using a semiconductor other than an oxide semiconductor or in the substrate 1190. For example, the transistor can be a transistor whose channel is formed in a silicon layer or a silicon substrate. Alternatively, a transistor in which a channel is formed in an oxide semiconductor film can be used for all the transistors in the memory element 1200. Further alternatively, in the memory element 1200, a transistor in which a channel is formed in an oxide semiconductor film can be included besides the transistor 1209, and a transistor in which a channel is formed in a layer formed using a semiconductor other than an oxide semiconductor or the substrate 1190 can be used for the rest of the transistors.

As the circuit 1201 in FIG. 17, for example, a flip-flop circuit can be used. As the logic element 1206, for example, an inverter or a clocked inverter can be used.

In a period during which the memory element 1200 is not supplied with the power supply voltage, the semiconductor device described in this embodiment can retain data stored in the circuit 1201 by the capacitor 1208 that is provided in the circuit 1202.

The off-state current of a transistor in which a channel is formed in an oxide semiconductor film is extremely small. For example, the off-state current of a transistor in which a channel is formed in an oxide semiconductor film is significantly smaller than that of a transistor in which a channel is formed in silicon having crystallinity. Thus, when the transistor in which a channel is formed in an oxide semiconductor film is used as the transistor 1209, a signal is retained in the capacitor 1208 for a long time also in a period during which the power supply voltage is not supplied to the memory element 1200. The memory element 1200 can accordingly retain the stored content (data) also in a period during which the supply of the power supply voltage is stopped.

Since the memory element performs pre-charge operation with the switch 1203 and the switch 1204, the time required for the circuit 1201 to retain original data again after the supply of the power supply voltage is restarted can be shortened.

In the circuit 1202, a signal retained by the capacitor 1208 is input to the gate of the transistor 1210. Thus, after supply of the power supply voltage to the memory element 1200 is restarted, the state (the on state or the off state) of the transistor 1210 is determined in accordance with the signal retained by the capacitor 1208 and can be read from the circuit 1202. Consequently, an original signal can be accurately read even when a potential corresponding to the signal retained by the capacitor 1208 changes to some degree.

By using the above-described memory element 1200 in a memory device such as a register or a cache memory included in a processor, data in the memory device can be prevented from being lost owing to the stop of the supply of the power supply voltage. Furthermore, shortly after the supply of the power supply voltage is restarted, the memory device can be returned to the same state as that before the power supply is stopped. Thus, the power supply can be stopped even for a short time in the processor or one or a plurality of logic circuits included in the processor, resulting in lower power consumption.

Although the memory element 1200 is used in a CPU in this embodiment, the memory element 1200 can also be used in an LSI such as a digital signal processor (DSP), a custom LSI, or a programmable logic device (PLD), and a radio frequency identification (RF-ID) tag.

At least part of this embodiment can be implemented in combination with any of the other embodiments described in this specification as appropriate.

Embodiment 9

In this embodiment, a display module and electronic devices that include an information processing device of one embodiment of the present invention are described with reference to FIGS. 18A to 18H.

FIGS. 18A to 18G illustrate electronic devices. These electronic devices can include a housing 5000, a display portion 5001, a speaker 5003, an LED lamp 5004, operation keys 5005 (including a power switch and an operation switch), a connection terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared ray), a microphone 5008, and the like.

FIG. 18A illustrates a mobile computer that can include a switch 5009, an infrared port 5010, and the like in addition to the above components. FIG. 18B illustrates a portable image reproducing device (e.g., a DVD reproducing device) provided with a recording medium, and the portable image reproducing device can include a second display portion 5002, a recording medium reading portion 5011, and the like in addition to the above components. FIG. 18C illustrates a goggle-type display that can include the second display portion 5002, a support portion 5012, an earphone 5013, and the like in addition to the above components. FIG. 18D illustrates a portable game console that can include the recording medium reading portion 5011 and the like in addition to the above components. FIG. 18E illustrates a digital camera with a television reception function, and the digital camera can include an antenna 5014, a shutter button 5015, an image receiving portion 5016, and the like in addition to the above components. FIG. 18F illustrates a portable game console that can include the second display portion 5002, the recording medium reading portion 5011, and the like in addition to the above components. FIG. 18G illustrates a portable television receiver that can include a charger 5017 capable of transmitting and receiving signals, and the like in addition to the above components.

The electronic devices in FIGS. 18A to 18G can have a variety of functions such as a function of displaying a variety of data (e.g., a still image, a moving image, and a text image) on the display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data stored in a recording medium and displaying it on the display portion. Furthermore, the electronic device including a plurality of display portions can have a function of displaying image data mainly on one display portion while displaying text data mainly on another display portion, a function of displaying a three-dimensional image by displaying images on a plurality of display portions with a parallax taken into account, or the like. Furthermore, the electronic device including an image receiving portion can have a function of shooting a still image, a function of taking moving images, a function of automatically or manually correcting a shot image, a function of storing a shot image in a recording medium (an external recording medium or a recording medium incorporated in the camera), a function of displaying a shot image on the display portion, or the like. Note that functions of the electronic devices in FIGS. 18A to 18G are not limited thereto, and the electronic devices can have a variety of functions.

FIG. 18H illustrates a smart watch, which includes a housing 7302, a display panel 7304, operation buttons 7311 and 7312, a connection terminal 7313, a band 7321, a clasp 7322, and the like.

The display panel 7304 mounted in the housing 7302 serving as a bezel includes a non-rectangular display region. The display panel 7304 may have a rectangular display region. The display panel 7304 can display an icon 7305 indicating time, another icon 7306, and the like.

The smart watch in FIG. 18H can have a variety of functions such as a function of displaying a variety of data (e.g., a still image, a moving image, and a text image) on the display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data stored in a recording medium and displaying it on the display portion.

The housing 7302 can include a speaker, a sensor (a sensor having a function of measuring force, displacement, position, speed, acceleration, angular velocity, rotational frequency, distance, sound, light, liquid, magnetism, temperature, chemical substance, sound, time, hardness, electric field, current, voltage, electric power, radiation, flow rate, humidity, gradient, oscillation, odor, or infrared rays), a microphone, and the like. Note that the smart watch can be manufactured using the light-emitting element for the display panel 7304.

This embodiment can be combined with any of the other embodiments in this specification as appropriate.

In this specification and the like, an explicit description "X and Y are connected" means that X and Y are electrically connected, X and Y are functionally connected, and X and Y are directly connected. Accordingly, without being limited to a predetermined connection relationship, for example, a connection relationship shown in drawings or texts, another connection relationship is included in the drawings or the texts.

Here, X and Y each denote an object (e.g., a device, an element, a circuit, a wiring, an electrode, a terminal, a conductive film, or a layer).

Examples of the case where X and Y are directly connected include the case where an element that allows an electrical connection between X and Y (e.g., a switch, a transistor, a capacitor, an inductor, a resistor, a diode, a display element, a light-emitting element, or a load) is not connected between X and Y, and the case where X and Y are connected without the element that allows the electrical connection between X and Y provided therebetween.

For example, in the case where X and Y are electrically connected, one or more elements that enable an electrical connection between X and Y (e.g., a switch, a transistor, a capacitor, an inductor, a resistor, a diode, a display element, a light-emitting element, or a load) can be connected between X and Y. Note that the switch is controlled to be turned on or off. That is, the switch is conducting or not conducting (is turned on or off) to determine whether current flows therethrough or not. Alternatively, the switch has a function of selecting and changing a current path. Note that the case where X and Y are electrically connected includes the case where X and Y are directly connected.

For example, in the case where X and Y are functionally connected, one or more circuits that enable a functional connection between X and Y (e.g., a logic circuit such as an inverter, a NAND circuit, or a NOR circuit; a signal converter circuit such as a D/A converter circuit, an A/D converter circuit, or a gamma correction circuit; a potential level converter circuit such as a power supply circuit (e.g., a step-up circuit or a step-down circuit) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, and a buffer circuit; a signal generation circuit; a memory circuit; or a control circuit) can be connected between X and Y. For example, even when another circuit is interposed between X and Y, X and Y are functionally connected if a signal output from X is transmitted to Y. Note that the case where X and Y are functionally connected includes the case where X and Y are directly connected and the case where X and Y are electrically connected.

Note that in this specification and the like, an explicit description "X and Y are electrically connected" means that X and Y are electrically connected (i.e., the case where X and Y are connected with another element or another circuit provided therebetween), X and Y are functionally connected (i.e., the case where X and Y are functionally connected with another circuit provided therebetween), and X and Y are directly connected (i.e., the case where X and Y are connected without another element or another circuit provided therebetween). That is, in this specification and the like, the explicit description "X and Y are electrically connected" is the same as the description "X and Y are connected".

For example, any of the following expressions can be used for the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y.

Examples of the expressions include, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order". When the connection order in a circuit configuration is defined by an expression similar to the above examples, a source (or a first terminal or the like) and a drain (or a second terminal or the like) of a transistor can be distinguished from each other to specify the technical scope.

Other examples of the expressions include, "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path" and "a source (or a first terminal or the like) of a transistor is electrically connected to X at least with a first connection path through Z1, the first connection path does not include a second connection path, the second connection path includes a connection path through which the transistor is provided, a drain (or a second terminal or the like) of the transistor is electrically connected to Y at least with a third connection path through Z2, and the third connection path does not include the second connection path." Still another example of the expression is "a source (or a first terminal or the like) of a transistor is electrically connected to X through at least Z1 on a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through at least Z2 on a third electrical path, the third electrical path does not include a fourth electrical path, and the fourth electrical path is an electrical path from the drain (or the second terminal or the like) of the transistor to the source (or the first terminal or the like) of the transistor". When the connection path in a circuit structure is defined by an expression similar to the above examples, a source (or a first terminal or the like) and a drain (or a second terminal or the like) of a transistor can be distinguished from each other to specify the technical scope.

Note that these expressions are examples and there is no limitation on the expressions. Here, X, Y, Z1, and Z2 each denote an object (e.g., a device, an element, a circuit, a wiring, an electrode, a terminal, a conductive film, and a layer).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

EXPLANATION OF REFERENCE

AF1: alignment film, AF2: alignment film, ANO: wiring, C1: capacitor, C2: capacitor, CF1: coloring film, CSCOM: wiring, G1: scan line, G2: scan line, GD: driver circuit, GDA: driver circuit, GDB: driver circuit, KB1: structure body, M: transistor, MD: transistor, M1: node, M2: node, P1: input position coordinate data, P2: sensing data, S1: signal line, S2: signal line, SD: driver circuit, SD1: driver circuit, SD2: driver circuit, sel0: signal line, sel1: signal line, SS: control data, SS1: control data, SS2: control data, SS3: control data, SW1: switch, SW1B: switch, SW2: switch, V0: potential, V00: background data, V1: image data, V11: data, V12: data, VCOM1: wiring, VCOM2: wiring, 100: transistor, 102: substrate, 104: conductive film, 106: insulating film, 107: insulating film, 108: oxide semiconductor film, 108a: oxide semiconductor film, 108b: oxide semiconductor film, 108c: oxide semiconductor film, 112a: conductive film, 112b: conductive film, 114: insulating film, 116: insulating film, 118: insulating film, 120a: conductive film, 120b: conductive film, 200: information processing device, 210: arithmetic device, 211: arithmetic portion, 212: memory portion, 214: transmission path, 215: input/output interface, 220: input/output device, 230: display portion, 230B: display portion, 231: display region, 232: pixel, 233: region, 235A: display element, 235B: display element, 239: selection circuit, 240: input portion, 250: sensor portion, 290: communication portion, 501C: insulating film, 504: conductive film, 505: bonding layer, 506: insulating film, 508: semiconductor film, 508A: region, 508B: region, 508C: region, 511B: conductive film, 511C: conductive film, 512A: conductive film, 512B: conductive film, 516: insulating film, 518: insulating film, 519B: terminal, 519C: terminal, 520: functional layer, 521: insulating film, 522: contact portion, 524: conductive film, 528: insulating film, 530: pixel circuit, 550: display element, 551: electrode, 552: electrode, 553: layer, 570: substrate, 591A: opening, 591B: opening, 591C: opening, 700: display panel, 700B: display panel, 702: pixel, 705: sealant, 750: display element, 751: electrode, 751H: opening, 752: electrode, 753: layer, 770: substrate, 770P: functional film, 771: insulating film, 800: input/output device, 801: upper cover, 802: lower cover, 803: FPC, 804: touch sensor, 805: FPC, 806: display panel, 809: frame, 810: driver circuit, 811: battery, 1189: ROM interface, 1190:

substrate, 1191: ALU, 1192: ALU controller, 1193: instruction decoder, 1194: interrupt controller, 1195: timing controller, 1196: register, 1197: register controller, 1198: bus interface, 1199: ROM, 1200: memory element, 1201: circuit, 1202: circuit, 1203: switch, 1204: switch, 1206: logic element, 1207: capacitor, 1208: capacitor, 1209: transistor, 1210: transistor, 1213: transistor, 1214: transistor, 1220: circuit, 3001: wiring, 3002: wiring, 3003: wiring, 3004: wiring, 3005: wiring, 3200: transistor, 3300: transistor, 3400: capacitor, 5000: housing, 5001: display portion, 5002: display portion, 5003: speaker, 5004: LED lamp, 5005: operation key, 5006: connection terminal, 5007: sensor, 5008: microphone, 5009: switch, 5010: infrared port, 5011: recording medium reading portion, 5012: support portion, 5013: earphone, 5014: antenna, 5015: shutter button, 5016: image receiving portion, 5017: charger, 7302: housing, 7304: display panel, 7305: icon, 7306: icon, 7312: operation button, 7313: connection terminal, 7321: band, 7322: clasp.

This application is based on Japanese Patent Application serial no. 2016-018553 filed with Japan Patent Office on Feb. 3, 2016, the entire contents of which are hereby incorporated by reference.

The invention claimed is:

1. An information processing device comprising:
   an input/output device; and
   an arithmetic device,
   wherein the input/output device is configured to supply input position coordinate data and sensing data,
   wherein the input/output device is configured to receive image data and control data,
   wherein the arithmetic device is configured to receive the input position coordinate data and the sensing data,
   wherein the arithmetic device is configured to supply the image data and the control data,
   wherein the input/output device comprises a display portion, an input portion, and a sensor portion,
   wherein the input portion is configured to supply the input position coordinate data,
   wherein the sensor portion is configured to supply the sensing data,
   wherein the display portion is configured to display the image data,
   wherein the display portion comprises a selection circuit, a first driver circuit, a second driver circuit, and a display panel,
   wherein the arithmetic device is configured to generate the image data,
   wherein the arithmetic device is configured to generate the control data on the basis of the input position coordinate data, the sensing data, and the image data,
   wherein the control data is any of a first-status control data, a second-status control data, and a third-status control data,
   wherein the selection circuit is configured to supply the image data to the first driver circuit and background data to the second driver circuit in the case where the first-status control data is supplied,
   wherein the selection circuit is configured to supply background data to the first driver circuit and the image data to the second driver circuit in the case where the second-status control data is supplied, and
   wherein the selection circuit is configured to supply the image data to the first driver circuit and the second driver circuit in the case where the third-status control data is supplied.

2. The information processing device according to claim 1,
   wherein the display panel comprises a first signal line, a second signal line, and a group of pixels,
   wherein the group of pixels are arranged in a column direction,
   wherein the first signal line is electrically connected to the group of pixels arranged in the column direction,
   wherein the first signal line is electrically connected to the first driver circuit,
   wherein the second signal line is electrically connected to the group of pixels arranged in the column direction, and
   wherein the second signal line is electrically connected to the second driver circuit.

3. The information processing device according to claim 2,
   wherein the group of pixels each comprise a first display element and a second display element,
   wherein the first display element comprises a reflective display element,
   wherein the first display element is electrically connected to the first signal line,
   wherein the second display element comprises a light-emitting element, and
   wherein the second display element is electrically connected to the second signal line.

4. The information processing device according to claim 3,
   wherein the first display element comprises a reflective film that reflects external light in a display direction and is configured to control intensity of the reflected light,
   wherein the reflective film comprises an opening, and
   wherein the second display element comprises a region overlapping with the opening and a layer containing a light-emitting organic compound and is configured to emit light toward the opening.

5. The information processing device according to claim 1,
   wherein the arithmetic device is configured to, when an icon is selected, supply the third-status control data in accordance with coordinates of a region where the icon is displayed.

6. The information processing device according to claim 1,
   wherein the arithmetic device is configured to determine a particular icon on the basis of a selection history of the icon and supply the third-status control data toward coordinates of a region where the particular icon is displayed.

7. The information processing device according to claim 1,
   wherein the arithmetic device is configured to supply the third-status control data toward a pointer display region until a certain period of time has passed from the last input from the input portion, and
   wherein the arithmetic device is configured to supply the first-status control data or the second-status control data toward the pointer display region after the certain period of time has passed from the last input from the input portion.

8. The information processing device according to claim 1,
   wherein the sensor portion comprises an illuminance sensor, and
   wherein the illuminance sensor is configured to supply the sensing data comprising illuminance data on an environment where the information processing device is used.

9. The information processing device according to claim 1,
wherein the input portion comprises at least one of a keyboard, a hardware button, a pointing device, a touch sensor, an illuminance sensor, an imaging device, an audio input device, a viewpoint input device, and an attitude determination device.

10. An information processing device comprising:
an input/output device; and
an arithmetic device,
wherein the input/output device is configured to supply input position coordinate data and sensing data,
wherein the input/output device is configured to receive image data and control data,
wherein the arithmetic device is configured to receive the input position coordinate data and the sensing data,
wherein the arithmetic device is configured to supply the image data and the control data,
wherein the input/output device comprises a display portion, an input portion, and a sensor portion,
wherein the input portion is configured to supply the input position coordinate data,
wherein the sensor portion is configured to supply the sensing data,
wherein the display portion is configured to display the image data,
wherein the display portion comprises a selection circuit, a first driver circuit, a second driver circuit, and a display panel,
wherein the arithmetic device is configured to generate the image data,
wherein the arithmetic device is configured to generate the control data on the basis of the input position coordinate data, the sensing data, and the image data,
wherein the control data is any of a first-status control data, a second-status control data, and a third-status control data,
wherein the selection circuit is configured to supply the image data to the first driver circuit and black display data to the second driver circuit in the case where the first-status control data is supplied,
wherein the selection circuit is configured to supply black display data to the first driver circuit and the image data to the second driver circuit in the case where the second-status control data is supplied, and
wherein the selection circuit is configured to supply the image data to the first driver circuit and the second driver circuit in the case where the third-status control data is supplied.

11. The information processing device according to claim 10,
wherein the display panel comprises a first signal line, a second signal line, and a group of pixels,
wherein the group of pixels are arranged in a column direction,
wherein the first signal line is electrically connected to the group of pixels arranged in the column direction,
wherein the first signal line is electrically connected to the first driver circuit,
wherein the second signal line is electrically connected to the group of pixels arranged in the column direction, and
wherein the second signal line is electrically connected to the second driver circuit.

12. The information processing device according to claim 11,
wherein the group of pixels each comprise a first display element and a second display element,
wherein the first display element comprises a reflective display element,
wherein the first display element is electrically connected to the first signal line,
wherein the second display element comprises a light-emitting element, and
wherein the second display element is electrically connected to the second signal line.

13. The information processing device according to claim 12,
wherein the first display element comprises a reflective film that reflects external light in a display direction and is configured to control the intensity of the reflected light,
wherein the reflective film comprises an opening, and
wherein the second display element comprises a region overlapping with the opening and a layer containing a light-emitting organic compound and is configured to emit light toward the opening.

14. The information processing device according to claim 10,
wherein the arithmetic device is configured to, when an icon is selected, supply the third-status control data in accordance with coordinates of a region where the icon is displayed.

15. The information processing device according to claim 10,
wherein the arithmetic device is configured to determine a particular icon on the basis of a selection history of the icon and supply the third-status control data toward coordinates of a region where the particular icon is displayed.

16. The information processing device according to claim 10,
wherein the arithmetic device is configured to supply the third-status control data toward a pointer display region until a certain period of time has passed from the last input from the input portion, and
wherein the arithmetic device is configured to supply the first-status control data or the second-status control data toward the pointer display region after the certain period of time has passed from the last input from the input portion.

17. The information processing device according to claim 10,
wherein the sensor portion comprises an illuminance sensor, and
wherein the illuminance sensor is configured to supply the sensing data comprising illuminance data on an environment where the information processing device is used.

18. The information processing device according to claim 10,
wherein the input portion comprises at least one of a keyboard, a hardware button, a pointing device, a touch sensor, an illuminance sensor, an imaging device, an audio input device, a viewpoint input device, and an attitude determination device.

* * * * *